(12) United States Patent
Lauginiger

(10) Patent No.: US 11,378,650 B1
(45) Date of Patent: Jul. 5, 2022

(54) RADAR SIGNAL PROCESSING TECHNIQUES AND RADAR SYSTEM

(71) Applicant: Frank Lauginiger, Lyndeborough, NH (US)

(72) Inventor: Frank Lauginiger, Lyndeborough, NH (US)

(*) Notice: Subject to any disclaimer, the term of this patent is extended or adjusted under 35 U.S.C. 154(b) by 0 days.

(21) Appl. No.: 17/487,429

(22) Filed: Sep. 28, 2021

Related U.S. Application Data

(63) Continuation-in-part of application No. 17/030,638, filed on Sep. 24, 2020, now abandoned.

(60) Provisional application No. 62/905,667, filed on Sep. 25, 2019.

(51) Int. Cl.
*G01S 7/35* (2006.01)
*G06F 17/14* (2006.01)

(52) U.S. Cl.
CPC .......... *G01S 7/356* (2021.05); *G06F 17/142* (2013.01)

(58) Field of Classification Search
CPC .......... G06F 17/14; G06F 17/142; G06F 7/49; G06F 7/768; G01S 7/356
See application file for complete search history.

(56) References Cited

U.S. PATENT DOCUMENTS

| 6,609,140 B1 | 8/2003 | Greene |
| 2001/0051967 A1 | 12/2001 | Jaber |
| 2005/0102342 A1 | 5/2005 | Greene |

OTHER PUBLICATIONS

Merriam-Webster, definition of "involve", https://www.merriam-webster.com/dictionary/involves, 2021 (Year: 2021).*
Dooley and Tukey, "An Algorithm for the Machine Calculation of Complex Fourier Series," Math. Computation, vol. 19, pp. 297-301, Apr. 1965.
Smith, "The Scientist and Engineer's Guide to Digital Signal Processing," Chapter 12: The Fast Fourier Transform, Cal. Tech. Pub., pp. 225-242, 1997.
Temperton, "Self-Sorting In-Place Fast Fourier Transforms," Siam J. Sci. Stat. Comput., vol. 12, No. 4, pp. 808-823, Jul. 1991.
Teymourzadeh, "Novel Architecture of Smart FFT Processor", Lambert Academic Publishing, 2014, 229 pages.
Stimson, "Introduction to Airborne Radar, Second Edition", Scitech Publishing, Inc., 1998, 5 pages.
Patterson & Hennessy, "Computer Organization and Design The Hardware / Software Interface", Elsevier, 2005, 118 pages.

(Continued)

*Primary Examiner* — Emily E Larocque
(74) *Attorney, Agent, or Firm* — Hayes Soloway PC

(57) ABSTRACT

Radar signal processing techniques and a radar system are disclosed. The disclosed techniques include producing normally ordered Fourier coefficients via fusion of in-place fast Fourier transform (FFT) and multi-pass reordering algorithms for bit reversal. The fusion of an in-place, decimation-in-time (DIT) FFT with a collection of vector reordering algorithms results in a new group of algorithms capable of producing normally ordered Fourier coefficients. Techniques disclosed herein are utilizable, for example, in simultaneous FFT butterfly computations and self-sorting or reordering bit reversal. Techniques disclosed herein are utilizable, for example, in the context of compute resource usage for a given compute platform.

15 Claims, 59 Drawing Sheets

(56) References Cited

OTHER PUBLICATIONS

Qian et al., "Self-sorting In-Place FFT Algorithm with Minimum Working Space", IEE Transactions of Signal Processing, 1994, vol. 42, Issue 10, 2 pages.

Lobeiras Blanco, Jacobo, "Towards efficient exploitation of jGPUs : a methodology for mapping index-digit algorithms", Universidade da Coruña. Departamento de Electrónica e Sistemas, 2014, 222 pages.

* cited by examiner $M = 4; \Delta M = F(B0, B1)$ $M = 8; \Delta M = 2F(B0, B1)$ $M = 16; \Delta M = 4F(B0, B1)$

```
Alignment: b₀ = r_l
radix4_read( B0, B1, idx, a_00, a_01, a_02, a_03 )
radix4_read( B0, B1, idx + ih, a_10, a_11, a_12, a_13 )

radix4_weighted_butterfly ( W, a_00, a_01, a_02, a_03 )
radix4_weighted_butterfly ( W, a_10, a_11, a_12, a_13 )

c_00 = a_00, c_01 = a_10, c_02 = a_01, c_03 = a_11
c_10 = a_02, c_11 = a_12, c_12 = a_03, c_13 = a_13 radix4_write( B0, B1, idx, c_00, c_01, c_02, c_03 )
radix4_write( B0, B1, idx + ih, c_10, c_11, c_12, c_13 )
```

Two reordering Radix-4 butterflies, b0 = r

```
Alignment: b₁ = r₁
radix4_read( B0, B1, idx, a₀₀, a₀₁, a₀₂, a₀₃ )
radix4_read( B0, B1, idx + ih, a₁₀, a₁₁, a₁₂, a₁₃ )
radix4_weighted_butterfly ( W, a₀₀, a₀₁, a₀₂, a₀₃ )
radix4_weighted_butterfly ( W, a₁₀, a₁₁, a₁₂, a₁₃ )
c₀₀ = a₀₀, c₀₁ = a₀₂, c₀₂ = a₁₀, c₀₃ = a₁₂
c₁₀ = a₀₁, c₁₁ = a₀₃, c₁₂ = a₁₁, c₁₃ = a₁₃
radix4_write( B0, B1, idx, c₀₀, c₀₁, c₀₂, c₀₃ )
radix4_write( B0, B1, idx + ih, c₁₀, c₁₁, c₁₂, c₁₃ )
```
FIG. 17
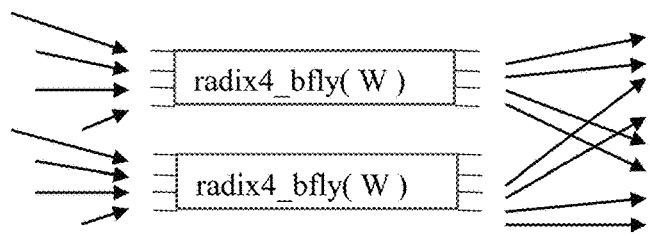
Two reordering Radix-4 Butterflies, b1 = r
FIG. 18
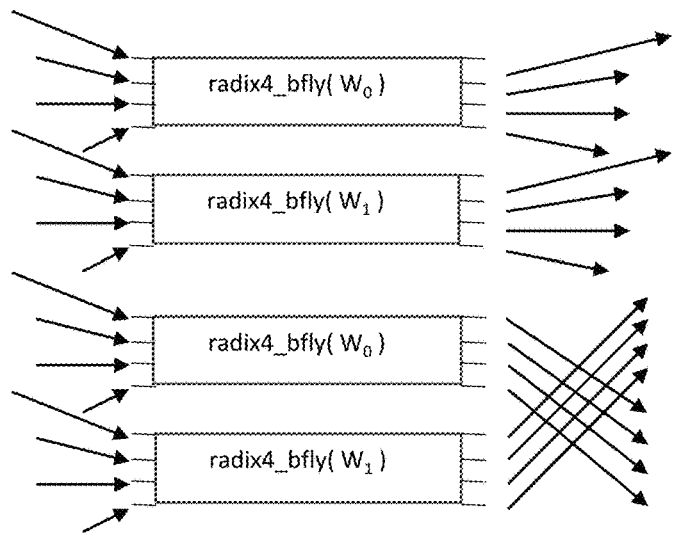
FIG. 19

```
Swap: b₀ = rᵣ
radix4_read( B0, B1, idx, a₀₀, a₀₁, a₀₂, a₀₃ )
radix4_read( B0, B1, idx + io, a₁₀, a₁₁, a₁₂, a₁₃ )

radix4_weighted_butterfly( W₀₁, W₀₂, W₀₃, a₀₀, a₀₁, a₀₂, a₀₃ )
radix4_weighted_butterfly( W₁₁, W₁₂, W₁₃, a₁₀, a₁₁, a₁₂, a₁₃ )

c₀₀ = a₀₀, c₀₁ = a₁₀, c₀₂ = a₀₂, c₀₃ = a₁₂
c₁₀ = a₀₁, c₁₁ = a₁₁, c₁₂ = a₀₃, c₁₃ = a₁₃ radix4_write( B0, B1, idx, c₀₀, c₀₁, c₀₂, c₀₃ )
radix4_write( B0, B1, idx + io, c₁₀, c₁₁, c₁₂, c₁₃ )
```

FIG. 20

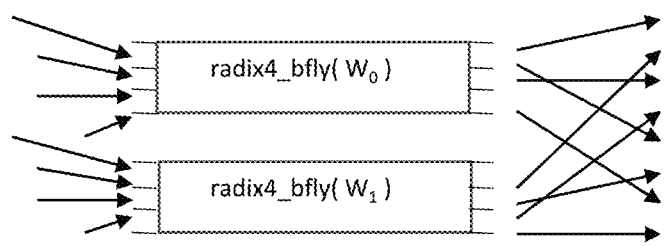

Two reordering radix4 butterflies, b0 = rᵣ

FIG. 21

Alignment: $b_0 = r_j$
radix4_read( B0, B1, idx, $a_{00}$, $a_{01}$, $a_{02}$, $a_{03}$ )
radix4_read( B0, B1, idx + ih, $a_{10}$, $a_{11}$, $a_{12}$, $a_{13}$ )

radix4_weighted_butterfly( $W_1$, $W_2$, $W_3$, $a_{00}$, $a_{01}$, $a_{02}$, $a_{03}$ )
radix4_weighted_butterfly( $W_1$, $W_2$, $W_3$, $a_{10}$, $a_{11}$, $a_{12}$, $a_{13}$ )

$c_{00} = a_{00}$, $c_{01} = a_{10}$, $c_{02} = a_{02}$, $c_{03} = a_{12}$
$c_{10} = a_{01}$, $c_{11} = a_{11}$, $c_{12} = a_{03}$, $c_{13} = a_{13}$ radix4_write( B0, B1, idx, $c_{00}$, $c_{01}$, $c_{02}$, $c_{03}$ )
radix4_write( B0, B1, idx + ih, $c_{10}$, $c_{11}$, $c_{12}$, $c_{13}$ )

Alignment: $b_1 = r_1$
radix4_read( B0, B1, idx, $a_{00}$, $a_{01}$, $a_{02}$, $a_{03}$ )
radix4_read( B0, B1, idx + ih, $a_{10}$, $a_{11}$, $a_{12}$, $a_{13}$ )

radix4_weighted_butterfly( $W_1$, $W_2$, $W_3$, $a_{00}$, $a_{01}$, $a_{02}$, $a_{03}$ )
radix4_weighted_butterfly( $W_1$, $W_2$, $W_3$, $a_{10}$, $a_{11}$, $a_{12}$, $a_{13}$ )

$c_{00} = a_{00}$, $c_{01} = a_{01}$, $c_{02} = a_{10}$, $c_{03} = a_{11}$
$c_{10} = a_{02}$, $c_{11} = a_{03}$, $c_{12} = a_{12}$, $c_{13} = a_{13}$ radix4_write( B0, B1, idx, $c_{00}$, $c_{01}$, $c_{02}$, $c_{03}$ )
radix4_write( B0, B1, idx + ih, $c_{10}$, $c_{11}$, $c_{12}$, $c_{13}$ )

```
radix4_read( B0, B1, idx, a_0, a_1, a_2, a_3 )
radix4_weighted_butterfly( W_1, W_2, W_3, a_0, a_1, a_2, a_3 )
c_0 = a_0;  c_1 = a_2;  c_2 = a_1;  c_3 = a_3
radix4_write( B0, B1, idx, c_0, c_1, c_2, c_3 )
```

```
Alignment: b₀ = rᵣ
radix4_read( B0, B1, idx, a₀₀, a₀₁, a₀₂, a₀₃ )
radix4_read( B0, B1, idx + io, a₁₀, a₁₁, a₁₂, a₁₃ )

radix4_weighted_butterfly( W₀₁, W₀₂, W₀₃, a₀₀, a₀₁, a₀₂, a₀₃ )
radix4_weighted_butterfly( W₁₁, W₁₂, W₁₃, a₁₀, a₁₁, a₁₂, a₁₃ )

c₀₀ = a₀₀, c₀₁ = a₁₀, c₀₂ = a₀₂, c₀₃ = a₁₂
c₁₀ = a₀₁, c₁₁ = a₁₁, c₁₂ = a₀₃, c₁₃ = a₁₃ radix4_write( B0, B1, idx, c₀₀, c₀₁, c₀₂, c₀₃ )
radix4_write( B0, B1, idx + io, c₁₀, c₁₁, c₁₂, c₁₃ )
```

```
Alignment: b₀ = rᵣ
radix4_read( B0, B1, idx, a₀₀ , a₀₁, a₀₂, a₀₃ )
radix4_read( B0, B1, idx + io, a₁₀ , a₁₁, a₁₂, a₁₃ )

radix4_weighted_butterfly( W₀₁ , W₀₂ , W₀₃ , a₀₀ , a₀₁, a₀₂, a₀₃ )
radix4_weighted_butterfly( W₁₁ , W₁₂ , W₁₃ , a₁₀ , a₁₁, a₁₂, a₁₃ )

c₀₀ = a₀₀ , c₀₁ = a₁₀, c₀₂ = a₀₂, c₀₃ = a₁₂
c₁₀ = a₀₁ , c₁₁ = a₁₁, c₁₂ = a₀₃, c₁₃ = a₁₃ radix4_write( B0, B1, idx, c₀₀ , c₀₁, c₀₂, c₀₃ )
radix4_write( B0, B1, idx + io, c₁₀ , c₁₁, c₁₂, c₁₃ )
```

```
radix4_read( b₀, b₁, idx, a₀₀, a₀₁, a₀₂, a₀₃ )
radix4_read( b₀, b₁, idx + c2_inc, a₁₀, a₁₁, a₁₂, a₁₃ )
radix4_read( b₀, b₁, idx + 2c2_inc, a₂₀, a₂₁, a₂₂, a₂₃ )
radix4_read( b₀, b₁, idx + 3c2_inc, a₃₀, a₃₁, a₃₂, a₃₃ )

radix4_weighted_butterfly( W₀₁, W₀₂, W₀₃, a₀₀, a₀₁, a₀₂, a₀₃ )
radix4_weighted_butterfly( W₁₁, W₁₂, W₁₃, a₁₀, a₁₁, a₁₂, a₁₃ )
radix4_weighted_butterfly( W₂₁, W₂₂, W₂₃, a₂₀, a₂₁, a₂₂, a₂₃ )
radix4_weighted_butterfly( W₃₁, W₃₂, W₃₃, a₃₀, a₃₁, a₃₂, a₃₃ )

c₀₀ = a₀₀, c₀₁ = a₂₀, c₀₂ = a₁₀, c₀₃ = a₃₀
c₁₀ = a₀₂, c₁₁ = a₂₂, c₁₂ = a₁₂, c₁₃ = a₃₂
c₂₀ = a₀₁, c₂₁ = a₂₁, c₂₂ = a₁₁, c₂₃ = a₃₁
c₃₀ = a₀₃, c₃₁ = a₂₃, c₃₂ = a₁₃, c₃₃ = a₃₃ radix4_write( b₀, b₁, idx, c₀₀, c₀₁, c₀₂, c₀₃ )
radix4_write( b₀, b₁, idx + c2_inc, c₁₀, c₁₁, c₁₂, c₁₃ )
radix4_write( b₀, b₁, idx + 2c2_inc, c₂₀, c₂₁, c₂₂, c₂₃ )
radix4_write( b₀, b₁, idx + 3c2_inc, c₃₀, c₃₁, c₃₂, c₃₃ )
```

FIG. 38

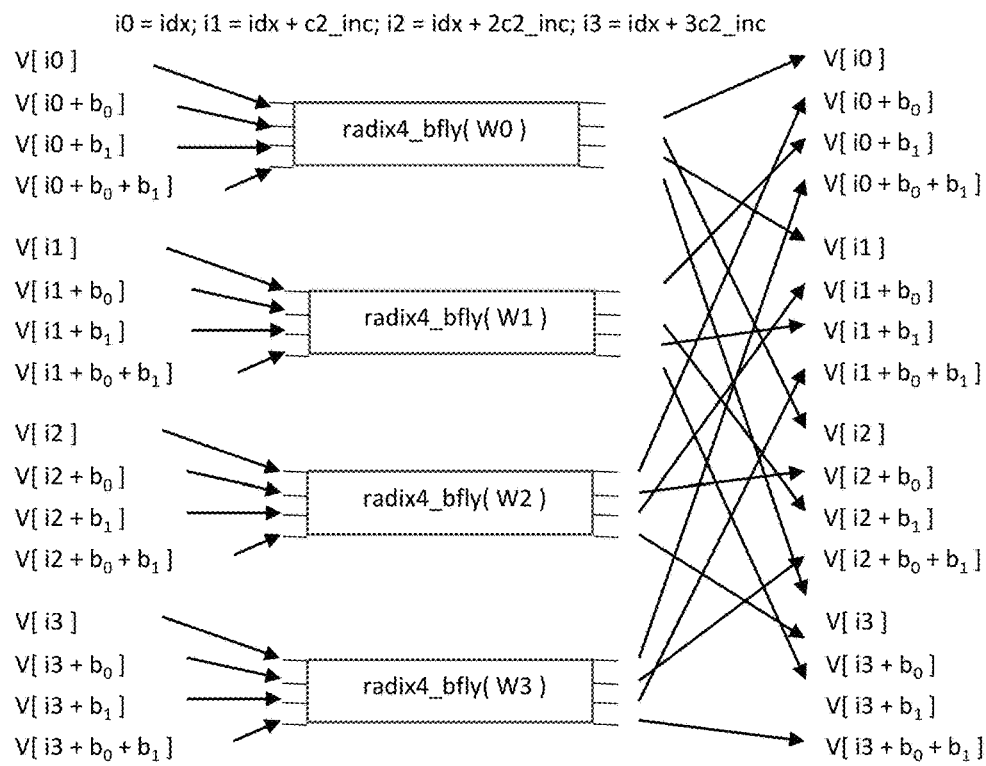

FIG. 39

LUT Bit-Reversal Function, given Ln, base b

Three-Point Butterfly

Nine-Point Butterfly

```
No swap:
nine_point_read( B0, B1, idx, $a_{00}, a_{01}, a_{02}, a_{03}, a_{04}, a_{05}, a_{06}, a_{07}, a_{08}$ )
nine_point_read( B0, B1, idx + ih + io, $a_{10}, a_{11}, a_{12}, a_{13}, a_{14}, a_{15}, a_{16}, a_{17}, a_{18}$ )
nine_point_read( B0, B1, 2(idx + ih + io), $a_{20}, a_{21}, a_{22}, a_{23}, a_{24}, a_{25}, a_{26}, a_{27}, a_{28}$ )

nine_point_butterfly( W[0-8], $a_{00}, a_{01}, a_{02}, a_{03}, a_{04}, a_{05}, a_{06}, a_{07}, a_{08}$ )
nine_point_butterfly( W[0-8], $a_{10}, a_{11}, a_{12}, a_{13}, a_{14}, a_{15}, a_{16}, a_{17}, a_{18}$ )
nine_point_butterfly(W[0-8], $a_{20}, a_{21}, a_{22}, a_{23}, a_{24}, a_{25}, a_{26}, a_{27}, a_{28}$ )

nine_point_write( B0, B1, idx, $a_{00}, a_{01}, a_{02}, a_{03}, a_{04}, a_{05}, a_{06}, a_{07}, a_{08}$ )
nine_point_write( B0, B1, idx + ih + io, $a_{10}, a_{11}, a_{12}, a_{13}, a_{14}, a_{15}, a_{16}, a_{17}, a_{18}$ )
nine_point_write( B0, B1, 2(idx + ih + io), $a_{20}, a_{21}, a_{22}, a_{23}, a_{24}, a_{25}, a_{26}, a_{27}, a_{28}$ )
```

```
Swap:
nine_point_read( B0, B1, idx + ih, $a_{00}, a_{01}, a_{02}, a_{03}, a_{04}, a_{05}, a_{06}, a_{07}, a_{08}$ )
nine_point_read( B0, B1, idx + io, $a_{10}, a_{11}, a_{12}, a_{13}, a_{14}, a_{15}, a_{16}, a_{17}, a_{18}$ )

nine_point_butterfly(W[0-8], $a_{00}, a_{01}, a_{02}, a_{03}, a_{04}, a_{05}, a_{06}, a_{07}, a_{08}$ )
nine_point_butterfly(W[0-8], $a_{10}, a_{11}, a_{12}, a_{13}, a_{14}, a_{15}, a_{16}, a_{17}, a_{18}$ )

nine_point_write( B0, B1, idx + ih, $a_{10}, a_{11}, a_{12}, a_{13}, a_{14}, a_{15}, a_{16}, a_{17}, a_{18}$ )
nine_point_write( B0, B1, idx + io, $a_{00}, a_{01}, a_{02}, a_{03}, a_{04}, a_{05}, a_{06}, a_{07}, a_{08}$ )

nine_point_read( B0, B1, idx + 2ih, $a_{00}, a_{01}, a_{02}, a_{03}, a_{04}, a_{05}, a_{06}, a_{07}, a_{08}$ )
nine_point_read( B0, B1, idx + 2io, $a_{10}, a_{11}, a_{12}, a_{13}, a_{14}, a_{15}, a_{16}, a_{17}, a_{18}$ )

nine_point_butterfly(W[0-8], $a_{00}, a_{01}, a_{02}, a_{03}, a_{04}, a_{05}, a_{06}, a_{07}, a_{08}$ )
nine_point_butterfly(W[0-8], $a_{10}, a_{11}, a_{12}, a_{13}, a_{14}, a_{15}, a_{16}, a_{17}, a_{18}$ )

nine_point_write( B0, B1, idx + 2ih, $a_{10}, a_{11}, a_{12}, a_{13}, a_{14}, a_{15}, a_{16}, a_{17}, a_{18}$ )
nine_point_write( B0, B1, idx + 2io, $a_{00}, a_{01}, a_{02}, a_{03}, a_{04}, a_{05}, a_{06}, a_{07}, a_{08}$ )

nine_point_read( B0, B1, idx + io + 2ih, $a_{00}, a_{01}, a_{02}, a_{03}, a_{04}, a_{05}, a_{06}, a_{07}, a_{08}$ )
nine_point_read( B0, B1, idx + 2io + ih, $a_{10}, a_{11}, a_{12}, a_{13}, a_{14}, a_{15}, a_{16}, a_{17}, a_{18}$ )

nine_point_butterfly(W[0-8], $a_{00}, a_{01}, a_{02}, a_{03}, a_{04}, a_{05}, a_{06}, a_{07}, a_{08}$ )
nine_point_butterfly(W[0-8], $a_{10}, a_{11}, a_{12}, a_{13}, a_{14}, a_{15}, a_{16}, a_{17}, a_{18}$ )

nine_point_write( B0, B1, idx + io + 2ih, $a_{10}, a_{11}, a_{12}, a_{13}, a_{14}, a_{15}, a_{16}, a_{17}, a_{18}$ )
nine_point_write( B0, B1, idx + 2io + ih, $a_{00}, a_{01}, a_{02}, a_{03}, a_{04}, a_{05}, a_{06}, a_{07}, a_{08}$ )
```

FIG. 53

```
Alignment: b₀ = r₁ , B0 = 3^(Ln_B0) , B1 = 3^(Ln_B1)

nine-point_read( B0, B1, idx, a₀ )
nine-point_read( B0, B1, idx + ih, a₁ )
nine-point_read( B0, B1, idx + 2ih, a₂ )

nine-point_bfly (W₀ , a₀ )
nine-point_bfly (W₀ , a₁ )
nine-point_bfly (W₀ , a₂ )
```

$c_{00} = a_{00}$, $c_{01} = a_{10}$, $c_{02} = a_{20}$, $c_{03} = a_{03}$, $c_{04} = a_{13}$, $c_{05} = a_{23}$, $c_{06} = a_{06}$, $c_{07} = a_{16}$, $c_{08} = a_{26}$
$c_{10} = a_{01}$, $c_{11} = a_{11}$, $c_{12} = a_{21}$, $c_{13} = a_{04}$, $c_{14} = a_{14}$, $c_{15} = a_{24}$, $c_{16} = a_{07}$, $c_{17} = a_{17}$, $c_{18} = a_{27}$
$c_{20} = a_{02}$, $c_{21} = a_{12}$, $c_{22} = a_{22}$, $c_{23} = a_{05}$, $c_{24} = a_{15}$, $c_{25} = a_{25}$, $c_{26} = a_{08}$, $c_{27} = a_{18}$, $c_{28} = a_{28}$

```
nine-point_write( B0, B1, idx, c₀ )
nine-point_write( B0, B1, idx + ih, c₁ )
nine-point_write( B0, B1, idx + 2ih, c₂ )
```

FIG. 55

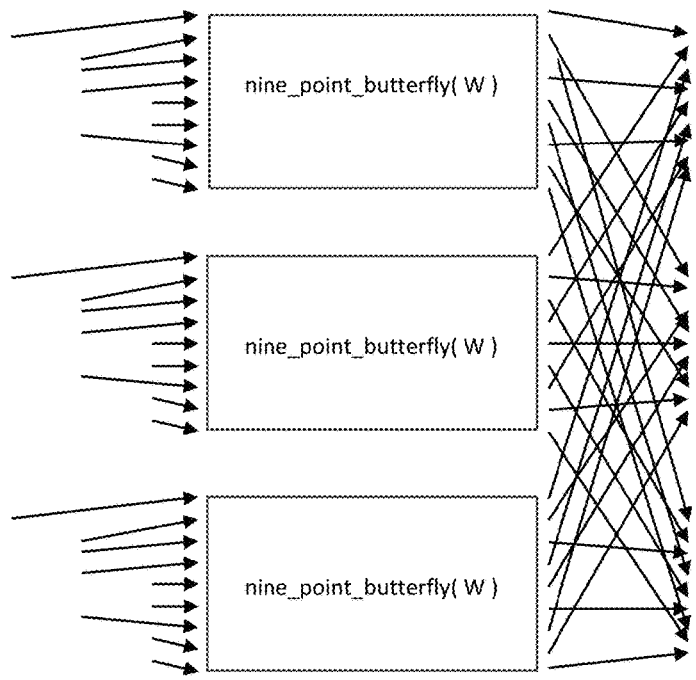

Three_reordering_radix9_butterflys_b0eqrl

FIG. 56

Alignment: $b_1 = r_1$, $B0 = 3^{Ln\_B0}$, $B1 = 3^{Ln\_B1}$ nine-point_read( B0, B1, idx, $a_0$ )
nine-point_read( B0, B1, idx + ih, $a_1$ )
nine-point_read( B0, B1, idx + 2ih, $a_2$ )

nine-point_bfly ($W_0$, $a_0$)
nine-point_bfly ($W_0$, $a_1$)
nine-point_bfly ($W_0$, $a_2$)

$c_{00} = a_{00}$, $c_{01} = a_{01}$, $c_{02} = a_{02}$, $c_{03} = a_{10}$, $c_{04} = a_{11}$, $c_{05} = a_{12}$, $c_{06} = a_{20}$, $c_{07} = a_{21}$, $c_{08} = a_{22}$
$c_{10} = a_{03}$, $c_{11} = a_{04}$, $c_{12} = a_{05}$, $c_{13} = a_{13}$, $c_{14} = a_{14}$, $c_{15} = a_{15}$, $c_{16} = a_{23}$, $c_{17} = a_{24}$, $c_{18} = a_{25}$
$c_{20} = a_{06}$, $c_{21} = a_{07}$, $c_{22} = a_{08}$, $c_{23} = a_{16}$, $c_{24} = a_{17}$, $c_{25} = a_{18}$, $c_{26} = a_{26}$, $c_{27} = a_{27}$, $c_{28} = a_{28}$ nine-point_write( B0, B1, idx, $c_0$ )
nine-point_write( B0, B1, idx + ih, $c_1$ )
nine-point_write( B0, B1, idx + 2ih, $c_2$ )

FIG. 57

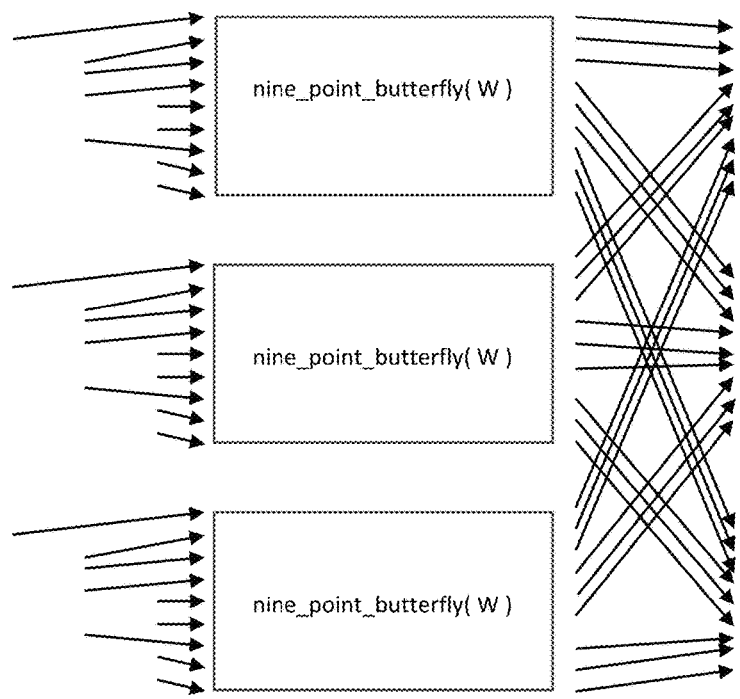

Three_reordering_radix9_butterflys_b1eqrl

FIG. 58

Three_reordering_radix9_butterflys_b0eqrr

```
sum12 = sum_binary_ctr( binary_ctr1, ss12, se12, 0, 2, 1 )
sum11 = sum_binary_ctr( binary_ctr1, ss11, se11, sn11, 2, -1 )
sum10 = sum_binary_ctr( binary_ctr1, ss10, se10, 0, 2, 1 )
                                                                    α
sum = sum20 + ( (sum10 + sum11 + sum12) * ( 2 ^ ln_n2_cnt ) )
iw0 = sum * ( 2 ^ ( Ln - 2 - Nw ) );

sum = sum21 + ( (sum10 + sum11 + sum12) * ( 2 ^ ln_n2_cnt ) )
iw1 = sum * ( 2 ^ ( Ln - 2 - Nw ) };
inc_binary_ctr( binary_ctr1, ln_n1_cnt, 2 )

wr1 = cos( iw0 * 2 * pi / N )
wi1 = sin( iw0 * 2 * pi / N )

wr2 = cos( iw0 * 4 * pi / N )
wi2 = sin( iw0 * 4 * pi / N )

wr3 = cos( iw0 * 6 * pi / N )
wi3 = sin( iw0 * 6 * pi / N )

W0(0) = wr1,wi1
W0(1) = wr2,wi2
W0(2) = wr3,wi3
                                        α wr1 = cos( iw1 * 2 * pi / N )
wi1 = sin( iw1 * 2 * pi / N )

wr2 = cos( iw1 * 4 * pi / N )
wi2 = sin( iw1 * 4 * pi / N )

wr3 = cos( iw1 * 6 * pi / N )
wi3 = sin( iw1 * 6 * pi / N )

```
s20 = sum_binary_ctr( binary_ctr1, 0, np2-2, 0, 2, 1 );
s21 = sum_binary_ctr( binary_ctr1, np2-1, se21, sn21, 2, -1 );
s22 = sum_binary_ctr( binary_ctr1, se21+1, ln_n1_cnt-1, 0, 2, 1 );
s20 = s20 + s21 + s22;
inc_binary_ctr( binary_ctr1, ln_n1_cnt, 2 )
                                                         α
iw0 = s01 + ( s20 * ( 2^(ln_n2_cnt) ) );
iw1 = s11 + ( s20 * ( 2^(ln_n2_cnt) ) );

wr1 = cos( iw0 * 2 * pi / N )
wi1 = sin( iw0 * 2 * pi / N )
wr2 = cos( iw0 * 4 * pi / N )
wi2 = sin( iw0 * 4 * pi / N )
wr3 = cos( iw0 * 6 * pi / N )
wi3 = sin( iw0 * 6 * pi / N )

W0(0) = wr1,wi1
W0(1) = wr2,wi2
W0(2) = wr3,wi3 wr1 = cos( iw1 * 2 * pi / N )
wi1 = sin( iw1 * 2 * pi / N )
wr2 = cos( iw1 * 4 * pi / N )
wi2 = sin( iw1 * 4 * pi / N )
wr3 = cos( iw1 * 6 * pi / N )
wi3 = sin( iw1 * 6 * pi / N )

Binary counter summing function, parameters: ss, se, sn, b, F radix4_bfly( W )

One radix4 butterfly, no reordering

Butterfly Group 1

Butterfly Group 2

Butterfly Group 3

Fused four-bit reordering radix4 butterflies

Two Radix-2 butterflies, table-based reordering

Four Radix-4 butterflies, table-based reordering

Three-Point Butterfly

Nine-Point Butterfly

Group 2

Group 3

$(R4_p\ B2_{p+Ln/2})$ Product Term $RN/16\ (R16\ B4_{Ln/2-1})$ Product Term

RG4 (RL4 B4) Product Term

RG4 (RL4 B4) Product Term

(R16 B4) Product Term

US 11,378,650 B1

RADAR SIGNAL PROCESSING TECHNIQUES AND RADAR SYSTEM

CROSS-REFERENCE TO RELATED APPLICATIONS

This patent application is a Continuation-in-Part of U.S. patent application Ser. No. 17/030,638, filed on Sep. 24, 2020, which claims the benefit of U.S. Provisional Patent Application No. 62/905,667, filed on Sep. 25, 2019. Each of these patent applications is herein incorporated by reference in its entirety.

FIELD OF THE DISCLOSURE

The present disclosure relates to fast Fourier transforms (FFTs) and, more particularly, to techniques for producing normally ordered Fourier coefficients via fusion of in-place FFT and multi-pass reordering algorithms for bit reversal.

BACKGROUND

Fast Fourier transforms (FFTs) are a computationally efficient technique for computing the discrete Fourier transform (DFT) of a mathematical function. Functionally, an FFT decomposes a data set to be transformed into a series of smaller data sets to be transformed. The resultant smaller data sets, in turn, are transformed into a series of even smaller data sets to be transformed, and this transformation pattern repeats to completion. FFTs may be characterized as being either "decimation-in-time" (DIT) or "decimation-in-frequency" (DIF) FFTs. Also, an FFT may be performed "in place," meaning the FFT is calculated entirely within its original sample memory; that is, an in place FFT does not require additional buffer memory. The "radix" of a given FFT refers to the size of the FFT decomposition. FFTs which are Radix-2 are most common, though other radices (e.g., Radix-3, Radix-4, etc.) may be utilized, as desired for a given situation. The coefficients used to combine results from a previous stage in an FFT to form inputs for a next stage of the FFT are known as "twiddle factors." An FFT "butterfly," which is the basic calculation element in an FFT, takes two complex points and converts them into two other complex points in a particular manner.

SUMMARY

The subject matter of this application may involve, in some cases, interrelated products, alternative solutions to a particular problem, and/or a plurality of different uses of a single system or article.

One example embodiment provides a method of processing a radar signal. The method includes receiving a radar signal via a receiver or transceiver. The method further includes processing the radar signal via a processor of a computing system communicatively coupled with the receiver or transceiver, wherein the processing involves: a two-bit reordering approach defined as a first multi-pass binary index representation; a standard in-place fast Fourier transform (FFT) approach defined as a second multi-pass binary index representation; a third multi-pass binary index representation including a fusion of the two-bit reordering approach and a Radix-4 FFT representation; and a multi-level loop structure configured utilizing the third multi-pass binary index representation, wherein the multi-level loop structure is configured to control execution of a computational group including: two Radix-4 butterflies; and self-sorting or reordering output logic for bit reversal. The method further includes providing an output signal including data obtained from processing the radar signal, the data pertaining to at least one characteristic of the radar signal. In some cases, processing the radar signal further involves: a FFT approach with a fourth multi-pass binary index representation produced from fusion of an odd-even reordering pattern with the Radix-4 FFT representation. In some cases, a radar system configured to perform the method is provided. The radar system includes the receiver or transceiver. The radar system further includes the computing system communicatively coupled with the receiver or transceiver and including: the processor; and memory communicatively coupled with the processor.

Another example embodiment provides a method of processing a radar signal. The method includes receiving a radar signal via a receiver or transceiver. The method further includes processing the radar signal via a processor of a computing system communicatively coupled with the receiver or transceiver, wherein the processing involves: a four-bit reordering approach defined as a first multi-pass binary index representation; a second multi-pass binary index representation including a fusion of the four-bit reordering approach and a first Radix-4 fast Fourier transform (FFT) representation; a multi-level loop structure configured utilizing the second multi-pass binary index representation, wherein the multi-level loop structure is configured to control a computational group including: four Radix-4 butterflies; and self-sorting or reordering output logic for bit reversal; and a hybrid reordering FFT defined as a third multi-pass binary index representation. The method further includes providing an output signal including data obtained from processing the radar signal, the data pertaining to at least one characteristic of the radar signal. In some cases, in the hybrid reordering FFT defined as the third multi-pass binary index representation, the processing further involves: a standard in-place FFT defined as a fourth multi-pass binary index representation; and execution of the standard in-place FFT with no reordering. In some cases, in the hybrid reordering FFT defined as the third multi-pass binary index representation, the processing further involves: a two-bit reordering approach defined as a fourth multi-pass binary index representation; a standard in-place FFT approach defined as a fifth multi-pass binary index representation; and a sixth multi-pass binary index representation including a fusion of the two-bit reordering approach and a second Radix-4 FFT representation. In some cases, in the hybrid reordering FFT defined as the third multi-pass binary index representation, the processing further involves: execution of a four-bit reordering butterfly group of the multi-level loop structure. In some cases, a radar system configured to perform the method is provided. The radar system includes the receiver or transceiver. The radar system further includes the computing system communicatively coupled with the receiver or transceiver and including: the processor; and memory communicatively coupled with the processor.

Another example embodiment provides a method of processing a radar signal. The method includes receiving a radar signal via a receiver or transceiver. The method further includes processing the radar signal via a processor of a computing system communicatively coupled with the receiver or transceiver, wherein the processing involves: a hybrid reordering tile-based fast Fourier transform (FFT) approach defined as a first multi-pass binary index representation; and execution of residual reordering via a tile-based table-driven last pass butterfly function. The method further includes providing an output signal including data obtained from processing the radar signal, the data pertaining to at least one characteristic of the radar signal. In some cases, in the hybrid reordering tile-based FFT defined as the first multi-pass binary index representation, the processing further involves: a standard in-place FFT defined as a second multi-pass binary index representation; and execution of the standard in-place FFT with no reordering. In some cases, in the hybrid reordering tile-based FFT defined as the first multi-pass binary index representation, the processing further involves: a four-bit reordering approach defined as a second multi-pass binary index representation; a third multi-pass binary index representation including a fusion of the four-bit reordering approach and a Radix-4 FFT representation; a multi-level loop structure configured utilizing the third multi-pass binary index representation, wherein the multi-level loop structure is configured to control a computational group including: four Radix-4 butterflies; and self-sorting or reordering output logic for bit reversal; and execution of a four-bit reordering butterfly group of the multi-level loop structure. In some cases, a radar system configured to perform the method is provided. The radar system includes the receiver or transceiver. The radar system further includes the computing system communicatively coupled with the receiver or transceiver and including: the processor; and memory communicatively coupled with the processor.

Another example embodiment provides a method. The method includes defining a two-bit reordering approach as a first multi-pass binary index representation. The method further includes defining a standard in-place fast Fourier transform (FFT) approach as a second multi-pass binary index representation. The method further includes fusing the two-bit reordering approach and a Radix-4 FFT representation into a third multi-pass binary index representation. The method further includes configuring a multi-level loop structure utilizing the third multi-pass binary index representation, wherein the multi-level loop structure is configured to control execution of a computational group including: (a) two Radix-4 butterflies; and (b) self-sorting or reordering output logic for bit reversal. In some cases, the method further includes producing a FFT approach with a fourth multi-pass binary index representation from the fusion of an odd-even reordering pattern with the Radix-4 FFT representation. Another example embodiment provides a module or system configured to perform the method. Another example embodiment provides a non-transitory computer program product encoded with instructions that, when executed by one or more processors, causes a process to be carried out, the process including the method. The computer program product may include one or more computer-readable mediums, such as, for example, a hard drive, compact disk, memory stick, server, cache memory, register memory, random-access memory (RAM), read-only memory (ROM), flash memory, or any suitable non-transitory memory that is encoded with instructions that can be executed by one or more processors, or a plurality or combination of such memories.

Another example embodiment provides a method. The method includes defining a four-bit reordering approach as a first multi-pass binary index representation. The method further includes fusing the four-bit reordering approach and a Radix-4 fast Fourier transform (FFT) representation into a second multi-pass binary index representation. The method further includes configuring a multi-level loop structure utilizing the second multi-pass binary index representation, wherein the multi-level loop structure is configured to control a computational group including: (a) four Radix-4 butterflies; and (b) self-sorting or reordering output logic for bit reversal. The method further includes defining a hybrid reordering FFT as a third multi-pass binary index representation. In some cases, in defining the hybrid reordering FFT as the third multi-pass binary index representation, the method further includes: defining a standard in-place FFT as a third multi-pass binary index representation; and executing the standard in-place FFT with no reordering. In some cases, in defining the hybrid reordering FFT as the third multi-pass binary index representation, the method further includes: defining a two-bit reordering approach as a fourth multi-pass binary index representation; defining a standard in-place fast Fourier transform (FFT) approach as a fifth multi-pass binary index representation; and fusing the two-bit reordering approach and a Radix-4 FFT representation into a sixth multi-pass binary index representation. In some cases, in defining the hybrid reordering FFT as the third multi-pass binary index representation, the method further includes: executing a four-bit reordering butterfly group of the multi-level loop structure. Another example embodiment provides a module or system configured to perform the method. Another example embodiment provides a non-transitory computer program product encoded with instructions that, when executed by one or more processors, causes a process to be carried out, the process including the method. The computer program product may include one or more computer-readable mediums, such as, for example, a hard drive, compact disk, memory stick, server, cache memory, register memory, random-access memory (RAM), read-only memory (ROM), flash memory, or any suitable non-transitory memory that is encoded with instructions that can be executed by one or more processors, or a plurality or combination of such memories.

Another example embodiment provides a method. The method includes defining a hybrid reordering tile-based fast Fourier transform (FFT) approach as a first multi-pass binary index representation. The method further includes executing residual reordering via a tile-based table-driven last pass butterfly function. In some cases, in defining the hybrid reordering tile-based FFT as the first multi-pass binary index representation, the method further includes: defining a standard in-place FFT as a second multi-pass binary index representation; and executing the standard in-place FFT with no reordering. In some cases, in defining the hybrid reordering tile-based FFT as the first multi-pass binary index representation, the method further includes: defining a four-bit reordering approach as a second multi-pass binary index representation; fusing the four-bit reordering approach and a Radix-4 FFT representation into a third multi-pass binary index representation; configuring a multi-level loop structure utilizing the third multi-pass binary index representation, wherein the multi-level loop structure is configured to control a computational group including: (a) four Radix-4 butterflies; and (b) self-sorting or reordering output logic for bit reversal; and executing a four-bit reordering butterfly group of the multi-level loop structure. Another example embodiment provides a module or system configured to perform the method. Another example embodiment provides a non-transitory computer program product encoded with instructions that, when executed by one or more processors, causes a process to be carried out, the process including the method. The computer program product may include one or more computer-readable mediums, such as, for example, a hard drive, compact disk, memory stick, server, cache memory, register memory, random-access memory (RAM), read-only memory (ROM), flash memory, or any suitable non-transitory memory that is encoded with instructions that can be executed by one or more processors, or a plurality or combination of such memories.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 17 is a block diagram illustrating a function, in accordance with an embodiment of the present disclosure.

FIG. 18 is a butterfly diagram illustrating two reordering Radix-4 butterflies, in accordance with an embodiment of the present disclosure.

FIG. 19 is a butterfly diagram illustrating four Radix-4 butterflies, in accordance with an embodiment of the present disclosure.

FIG. 20 is a block diagram illustrating a function, in accordance with an embodiment of the present disclosure.

FIG. 21 is a butterfly diagram illustrating two reordering Raxid-4 butterflies, in accordance with an embodiment of the present disclosure.

FIG. 38 is a block diagram illustrating a function sequence, in accordance with an embodiment of the present disclosure.

FIG. 39 is a butterfly diagram illustrating four Radix-4 butterflies, in accordance with an embodiment of the present disclosure.

FIG. 53 is a block diagram illustrating swap/no swap logic, in accordance with an embodiment of the present disclosure.

FIG. 55 is a block diagram illustrating a function sequence, in accordance with an embodiment of the present disclosure.

FIG. 56 is a butterfly diagram illustrating three reordering Radix-9 butterflies, in accordance with an embodiment of the present disclosure.

FIG. 57 is a block diagram illustrating a function sequence, in accordance with an embodiment of the present disclosure.

FIG. 58 is a butterfly diagram illustrating three reordering Radix-9 butterflies, in accordance with an embodiment of the present disclosure.

FIG. 63 is a block diagram illustrating weights computation for FIG. 62, in accordance with an embodiment of the present disclosure.

FIG. 65 is a block diagram illustrating weights computation for FIG. 64, in accordance with an embodiment of the present disclosure.

Figure 1:
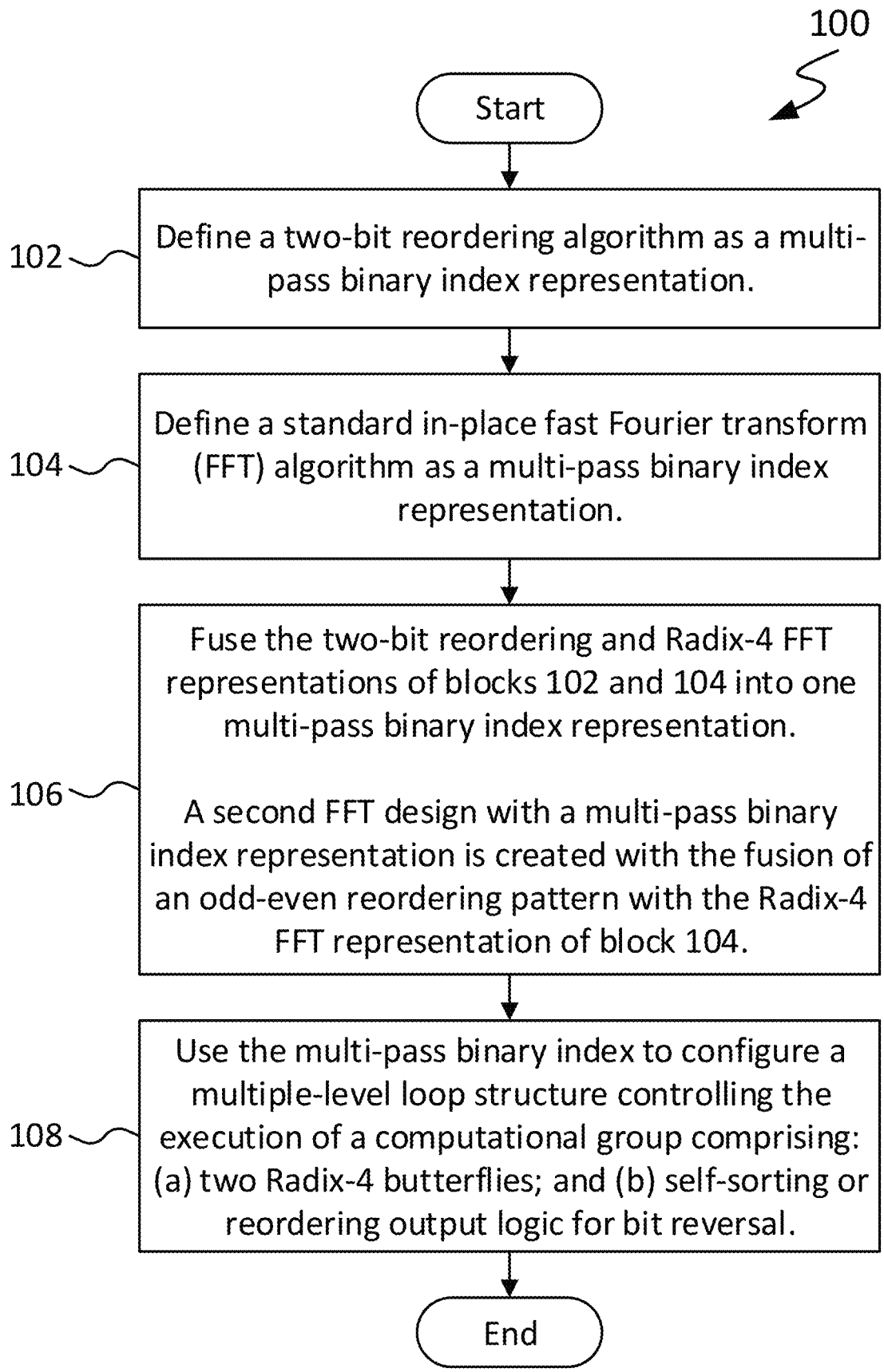
FIG. 1 is a flow diagram illustrating a method 100 in accordance with an embodiment of the present disclosure.

These and other features of the present embodiments will be understood better by reading the following detailed description, taken together with the figures herein described.

In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

Radar signal processing techniques and a radar system are disclosed. In accordance with some embodiments, the disclosed techniques may include producing normally ordered Fourier coefficients via fusion of in-place fast Fourier transform (FFT) and multi-pass reordering algorithms for bit reversal. In accordance with some embodiments, the fusion of an in-place, decimation-in-time (DIT) FFT with a collection of vector reordering algorithms may result in a new group of algorithms capable of producing normally ordered Fourier coefficients. Techniques disclosed herein may be utilized, for example, in simultaneous FFT butterfly computations and self-sorting or reordering bit reversal. Techniques disclosed herein may be utilized, for example, in optimizing (or otherwise improving) compute resource usage for a given compute platform. Techniques disclosed herein may be utilized, for example, in reducing the total amount of memory (M) and/or the total amount of data transfer activity ($\Delta M$) required to perform multi-pass computations in radar signal processing and related systems. Numerous configurations and variations will be apparent in light of this disclosure.

General Overview

Modern military radar receivers are streaming, real-time, embedded, digital computer systems constructed subject to rigid battlefield and environmental requirements, based on numerous specifications for performance, including: (i) computational rate (ops/sec); (ii) power load (watts); and (iii) heat dissipation (watts). As memory density increases (bytes/m$^2$), quantum mechanical junction leakage current makes a significant contribution to the performance of the receiver. As the digital memory of the receiver grows, it impacts both the power load and heat dissipation of the receiver.

Thus, and in accordance with some embodiments of the present disclosure, radar signal processing techniques and a radar system are disclosed. In accordance with some embodiments, the disclosed techniques may include producing normally ordered Fourier coefficients via fusion of in-place fast Fourier transform (FFT) and multi-pass reordering algorithms for bit reversal. In accordance with some embodiments, the fusion of an in-place, decimation-in-time (DIT) FFT with a collection of vector reordering algorithms may result in a new group of algorithms capable of producing normally ordered Fourier coefficients.

In accordance with some embodiments, techniques disclosed herein may be utilized, for example, in simultaneous FFT butterfly computations and self-sorting or reordering bit reversal. In accordance with some embodiments, techniques disclosed herein may be utilized, for example, in optimizing (or otherwise improving) compute resource usage for a given compute platform. In accordance with some embodiments, techniques disclosed herein may be utilized, for example, in reducing the total amount of memory (M) and/or the total amount of data transfer activity ($\Delta M$) required to perform multi-pass computations in radar signal processing and related systems. In accordance with some embodiments, techniques disclosed herein may be implemented, for example, with an x86 multicore shared memory compute platform (e.g., such as those typically utilized by defense agencies/departments). Numerous suitable uses and applications will be apparent in light of this disclosure.

In accordance with some embodiments, a design principle for fast Fourier transform (FFT) algorithms, as variously disclosed herein, which target streaming, real-time, embedded, digital computer systems in the modern age may include:

Maximize computational rate< >Minimize memory requirements

Maximize computational rate (e.g., four-point DFT)
Compute/IO ratio (base-2): n log(n)/2n=4*2/2*4=1
Computational activity and streaming data I/O are balanced Minimize memory requirements—Two-dimensional memory model FFT design tradeoff:
Vector Memory required (M): Computational Kernel Complexity (m):
N complex elements High
2*N complex elements low Methodologies FIG. 1 is a flow diagram illustrating a method 100 in accordance with an embodiment of the present disclosure. As can be seen, method 100 may begin as in block 102 with defining a two-bit reordering algorithm as a multi-pass binary index representation. Method 100 may continue as in block 104 with defining a standard in-place FFT algorithm as a multi-pass binary index representation. Method 100 may continue as in block 106 with fusing the two-bit reordering (block 102) and Radix-4 FFT (block 104) representations into one multi-pass binary index representation. In accordance with some embodiments, a second FFT design with a multi-pass binary index representation may be created with the fusion of an odd-even reordering pattern with the Radix-4 FFT representation of block 104. Method 100 may continue as in block 108 with using the multi-pass binary index to configure a multiple-level loop structure controlling the execution of a computational group including: (a) two Radix-4 butterflies; and (b) self-sorting or reordering output logic for bit reversal.

Figure 2:
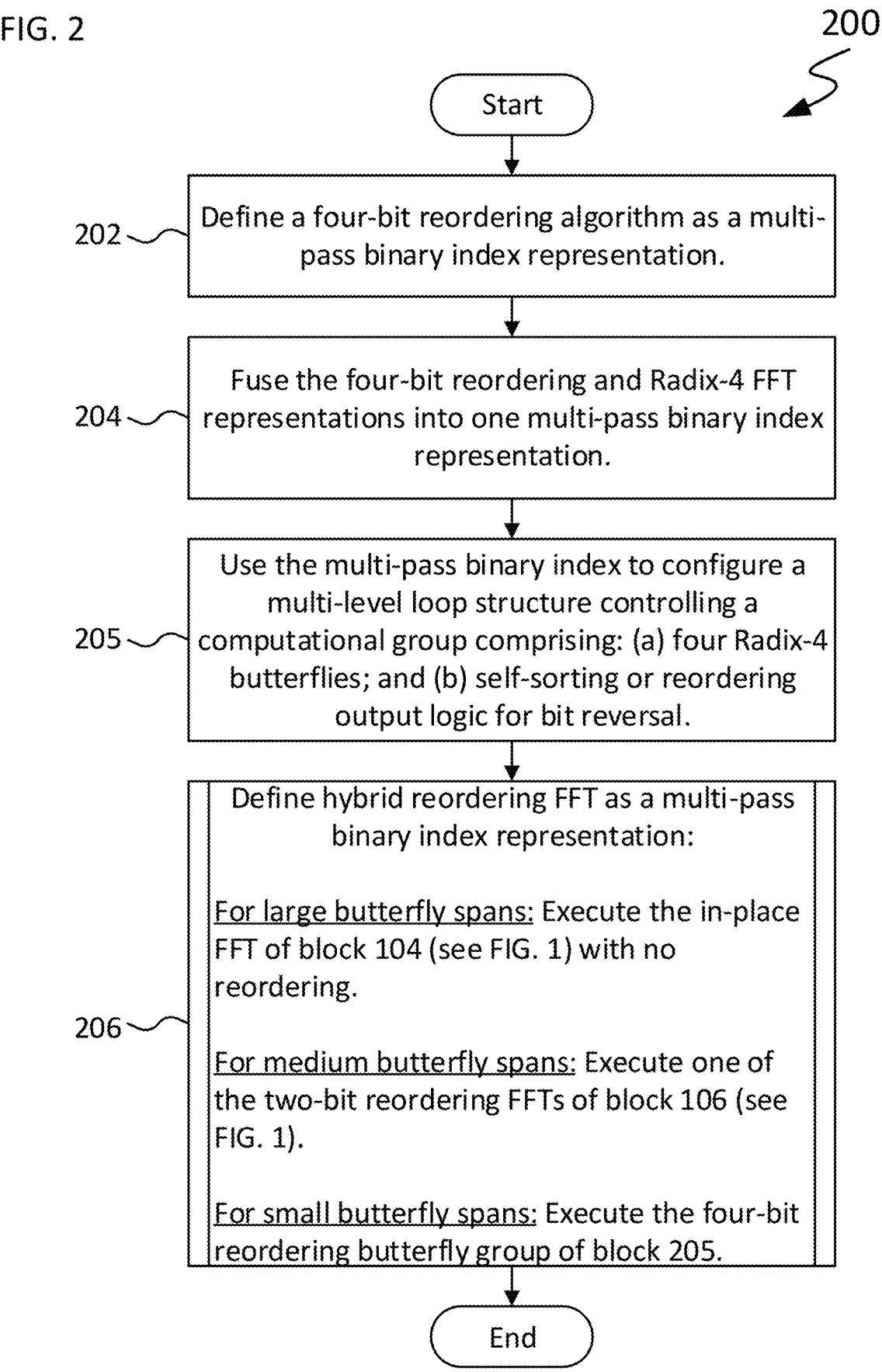
FIG. 2 is a flow diagram illustrating a method 200 in accordance with an embodiment of the present disclosure.

FIG. 2 is a flow diagram illustrating a method 200 in accordance with an embodiment of the present disclosure. As can be seen, method 200 may begin as in block 202 with defining a four-bit reordering algorithm as a multi-pass binary index representation. Method 200 may continue as in block 204 with fusing the four-bit reordering and Radix-4 FFT representations into one multi-pass binary index representation. Method 200 may continue as in block 205 with using the multi-pass binary index to configure a multi-level loop structure controlling a computational group including: (a) four Radix-4 butterflies; and (b) self-sorting or reordering output logic for bit reversal. Method 200 may continue as in block 206 with defining a hybrid reordering FFT as a multi-pass binary index representation. For large butterfly spans, this may include executing the in-place FFT of block 104 (see FIG. 1) with no reordering, in accordance with some embodiments. For medium butterfly spans, this alternatively may include executing one of the two-bit reordering FFTs of block 106, in accordance with some embodiments. For small butterfly spans, this alternatively may include executing the four-bit reordering butterfly group of block 205, in accordance with some embodiments.

Figure 3:
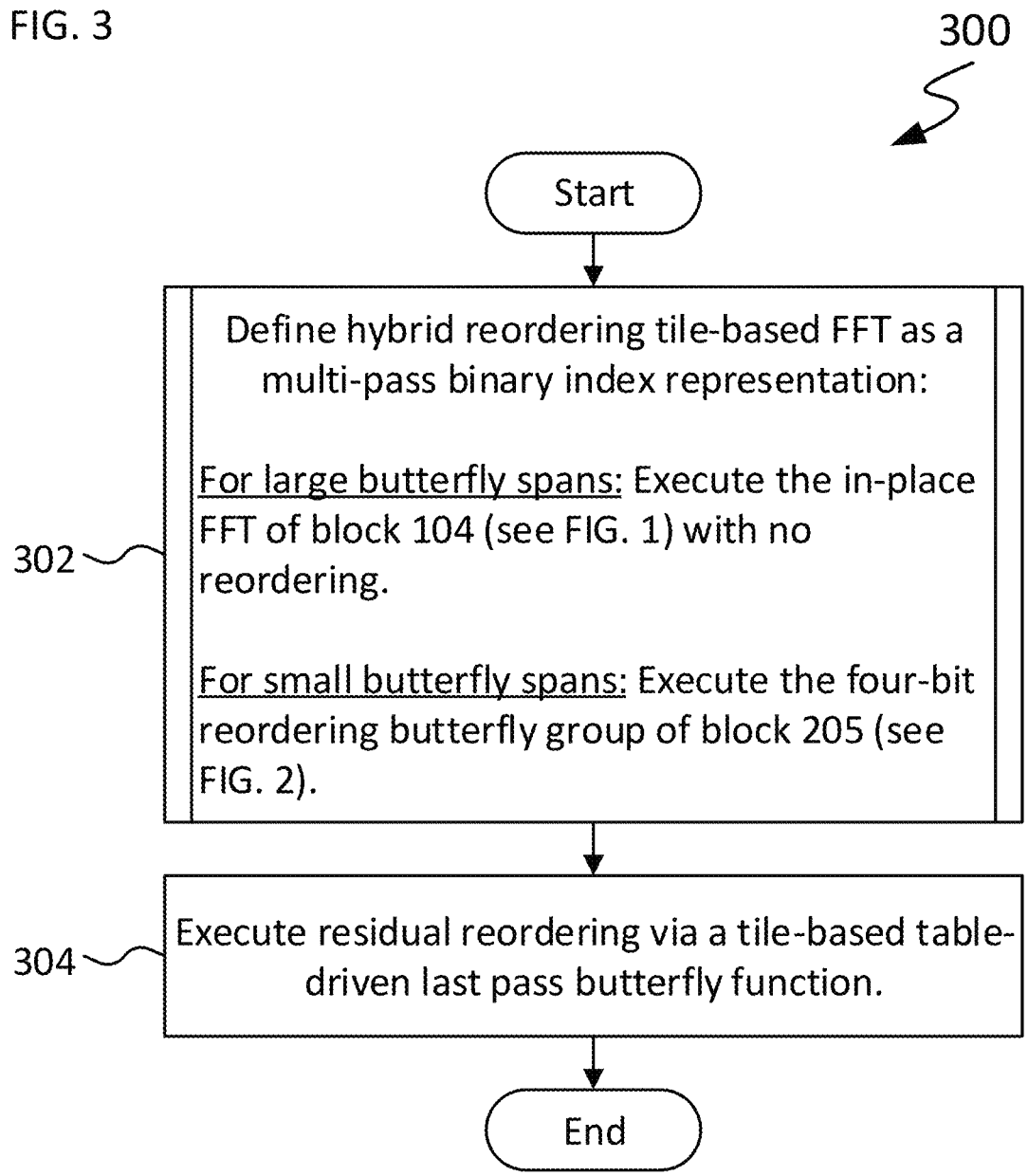
FIG. 3 is a flow diagram illustrating a method 300 in accordance with an embodiment of the present disclosure.

FIG. 3 is a flow diagram illustrating a method 300 in accordance with an embodiment of the present disclosure. As can be seen, method 300 may begin as in block 302 with defining a hybrid reordering tile-based FFT as a multi-pass binary index representation. For large butterfly spans, this may include executing the in-place FFT of block 104 (see FIG. 1) with no reordering, in accordance with some embodiments. For small butterfly spans, this alternatively may include executing the four-bit reordering butterfly group of block 205 (see FIG. 2), in accordance with some embodiments. Method 300 may continue as in block 304 with executing residual reordering via a tile-based table-driven last pass butterfly function.

Figure 4A:
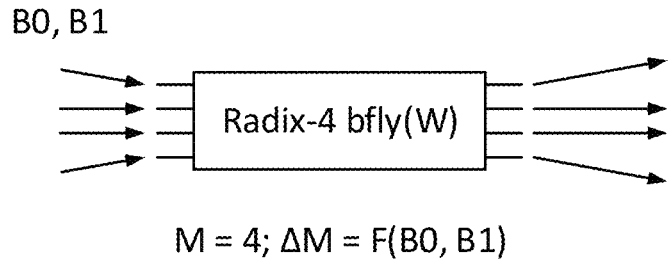
FIG. 4A is an example case employing one Radix-4 butterfly with no reordering in accordance with an embodiment of the present disclosure.
Figure 4B:
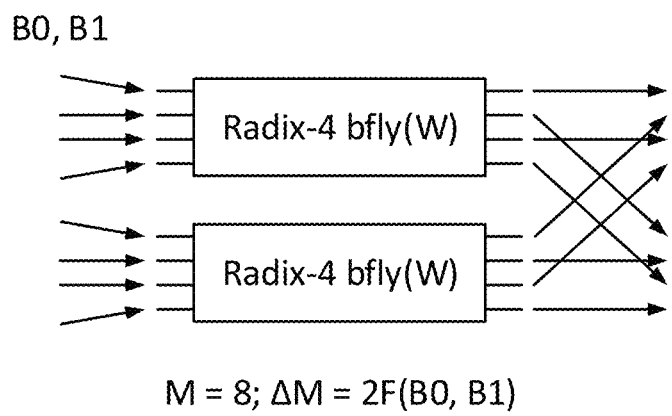
FIG. 4B is an example case employing two-bit reordering Radix-4 butterflies in accordance with an embodiment of the present disclosure.
Figure 4C:
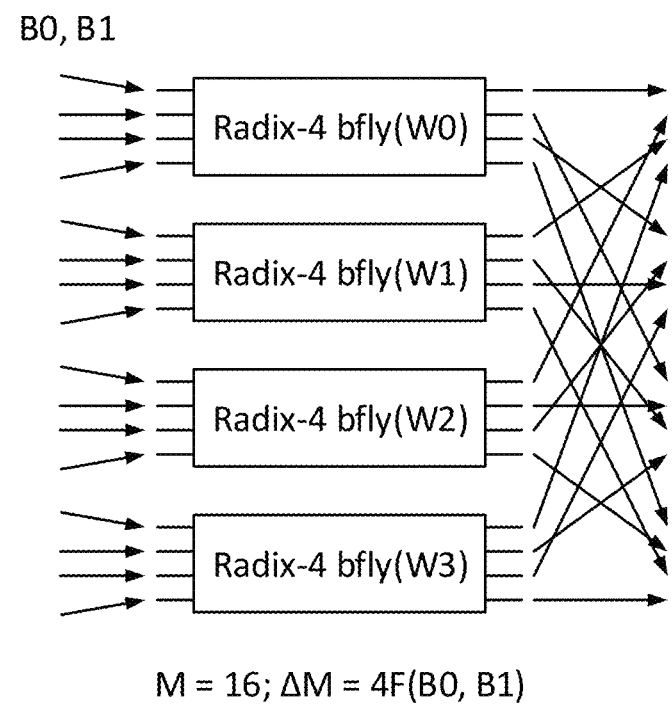
FIG. 4C is an example case employing four-bit reordering Radix-4 butterflies in accordance with an embodiment of the present disclosure.

In accordance with some embodiments, techniques disclosed herein may be utilized, for example, in minimizing (or otherwise reducing) the total amount of memory (M) required to perform the multi-pass computation and/or the total amount of data transfer activity (ΔM) required to perform the multi-pass computation. FIG. 4A is an example case employing one Radix-4 butterfly with no reordering in accordance with an embodiment of the present disclosure. Here, in this first example, M=4 and ΔM=F(B0, B1). FIG. 4B is an example case employing two-bit reordering Radix-4 butterflies in accordance with an embodiment of the present disclosure. Here, in this second example, M=8 and ΔM=2F(B0, B1). FIG. 4C is an example case employing four-bit reordering Radix-4 butterflies in accordance with an embodiment of the present disclosure. Here, in this third example, M=16 and ΔM=4F(B0, B1).

As will be appreciated in light of this disclosure, any of the various methods 100, 200, 300, etc., described herein may be implemented in any one, or combination, of suitable programming languages, such as C, C++, objective C, JavaScript, or custom or proprietary instruction sets, to name a few options. In accordance with some embodiments, any of the various methods 100, 200, 300, etc., described herein may be encoded, in part or in whole, on a computer-readable medium that, when executed by a processor, carries out any one or more of the functions described herein, in part or in whole. The computer-readable medium may be, for example, a hard drive, a compact disk, a memory stick, a server, or any other suitable non-transitory computer or computing device memory that includes executable instructions, or a plurality or combination of such memories. Other embodiments can be implemented, for instance, with gate-level logic or an application-specific integrated circuit (ASIC) or chip set, or other such purpose-built logic. Some embodiments can be implemented with a microcontroller having input/output (I/O) capability (e.g., inputs for receiving user inputs; outputs for directing other components) and one or more embedded routines for carrying out device functionality. In a more general sense, any of the various techniques described herein may be implemented in hardware, software, firmware, or a combination thereof, as desired for a given target application or end-use.

As will be further appreciated in light of this disclosure, the FFT techniques disclosed herein may be implemented in any manner in which the logic can be carried out practically. Any of the various methods disclosed herein may be embodied, in accordance with some embodiments, in software that can run on any of a wide variety of computers, including but not limited to, for example, personal computers, generalized computers, specialized computers, workstation computers, supercomputers, and so on. In accordance with some embodiments, the logic of a given disclosed FFT method may be implemented in a special purpose circuit, such as a circuit including one or more ASICs having the specific logic employed herein deployed within the circuit and/or in a system that combines such special purpose circuit(s) with a general purpose computer with software.

As will be further appreciated in light of this disclosure, although the example methodologies of FIGS. 1-3 are described for a Radix-4 DIT decomposition, techniques disclosed herein may be applied to other than these specific calculations. For example, techniques disclosed herein may be employed for other radix values (e.g., Radix-3).

Section 1: Introduction (Base-2)

The Radix-4, in-place DIT FFT utilizes a minimum amount of memory to compute the vector of Fourier coefficients. This characteristic can be an asset with respect to an application design. However, the ordering of the vector elements produced is "scrambled" compared to the normal ordering as defined by the Discrete Fourier Transform. This disclosure presents a number of techniques that produce normally ordered Fourier coefficients with the same minimum memory requirements as the standard Radix-4 in-place DIT FFT.

Define a vector as an ordered set of N complex values with N a power of two:

$$V[k], k=0,1,2,\ldots N-1, N=2^{Ln}, Ln=0,1,2,\ldots.$$

Any element of this vector can be represented by a binary index:

$i_{Ln-1}\ i_{Ln-2}\ i_{Ln-3}\ \ldots\ i_2\ i_1\ i_0$, where each i=0 or 1.

For example, V[3] is represented by $i_0=1$, $i_1=1$ and all other i's are zero:

$$V[3]=V[2^1+2^0]=V[0xb\ 0\ 0\ 0\ \ldots\ 0\ 1\ 1].$$

The least significant bits (LSBs) of the binary index are on the right (i.e., indexing is represented as low to high going right to left).

The ordering of scrambled vector S[ ], produced by the standard In-place DIT FFT is called bit-reversed because an index for the same element resident in this vector can be represented as:

$i_0\ i_1\ i_2\ \ldots\ i_{Ln-3}\ i_{Ln-2}\ i_{Ln-1}$, where each i=0 or 1 with the LSB's of the normally ordered binary index on the left. To access the value V[3] in the scrambled vector, S[ ], the correct index is 3N/4, which also corresponds to $i_0=1$, $i_1=1$ and all other i's are zero in the bit-reversed index:

$$S[3N/4]=S[2^{Ln-1}+2^{Ln-2}]=S[0xb\ 1\ 1\ 0\ \ldots\ 0\ 0\ 0]=V[3].$$

To locate any element of the normally ordered vector V[ ] in the scrambled vector S[ ], the corresponding index for V[ ] is bit-reversed:

$$S[LUT(i)]=V[i],$$

where LUT( ) is a function which produces the bit-reversed index of its input argument.

The standard In-place DIT FFT produces the correct Fourier coefficients but in a bit-reversed order. This disclosure describes techniques designed to produce normally ordered Fourier coefficients with the same minimum memory requirements.

Section 2: Multi-Pass Reordering (Base-2)

Define a pass over a vector as a complete access of all vector elements. A multi-pass method utilizes access of all vector elements multiple times (i.e., over and over again). Start with a binary index representation of the scrambled vector of Section 1 of this disclosure. Reverse the middle two bits, located at index pair: Ln/2, Ln/2−1, through a sequence of vector swaps of length 2ln/2−1.

reorder indices

| |
$i_0\ i_1\ i_2\ \ldots\ i_{Ln/2-1}\ i_{Ln/2}\ \ldots\ i_{Ln-3}\ i_{ln-2}\ i_{ln-1}$ For the first vector swap executed on the first pass, this vector:

0 0 . . . 0 0 1 iLn/2−2 . . . iLn−3 iLn−2 iLn−1 is swapped with this vector:

0 0 . . . 0 1 0 iLn/2−2 . . . iLn−3 iLn−2 iLn−1.

For the second vector swap executed on the first pass, this vector:

0 0 . . . 1 0 1 iLn/2−2 iLn−3 iLn−2 iLn−1 is swapped with this vector:

0 0 . . . 1 1 0 iLn/2−2 iLn−3 iLn−2 iLn−1.

After all of the 2Ln/2−1 vector-swap sequences are executed on pass 0, the middle two bits in the binary index representation of the scrambled vector are considered to be reordered (i.e., unscrambled) and the next two bits are processed: Ln/2+1, Ln/2−2 on pass 1. As the "reordering window" widens with each pass, the swap vectors are reduced in size by half, and the number swapped is doubled.

The binary loop index representation for multi-pass two-bit reordering is parameterized by the vector size Ln and pass p, L=Ln & 0x1:

reorder indices $r_l \; r_r$
| |
$i_0 \; i_1 \ldots i_{Ln/2-p-1} \; i_{Ln/2+p+L-1} \ldots i_{Ln/2-p} \; i_{Ln/2+p+L} \ldots i_{Ln-2} \; i_{Ln-1}$
| | reordered bit field
outer loop   inner loop

The notation iLn/2+p+L−1 . . . iLn/2−p means:

$$Ln/2+p+L-1 > Ln/2-p \ldots ,$$

which is an integer sequence starting with Ln/2−p incrementing by one, right to left ending with Ln/2+p+L−1.

Figure 5:
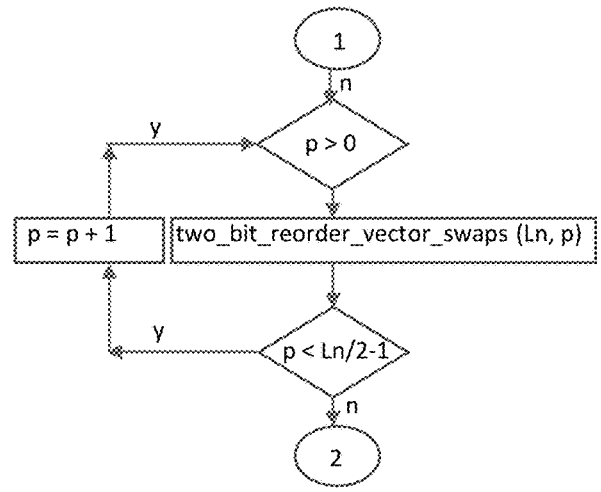
FIG. 5 is a flow diagram illustrating a multi-pass two-bit reordering algorithm, in accordance with an embodiment of the present disclosure.
Figure 6:
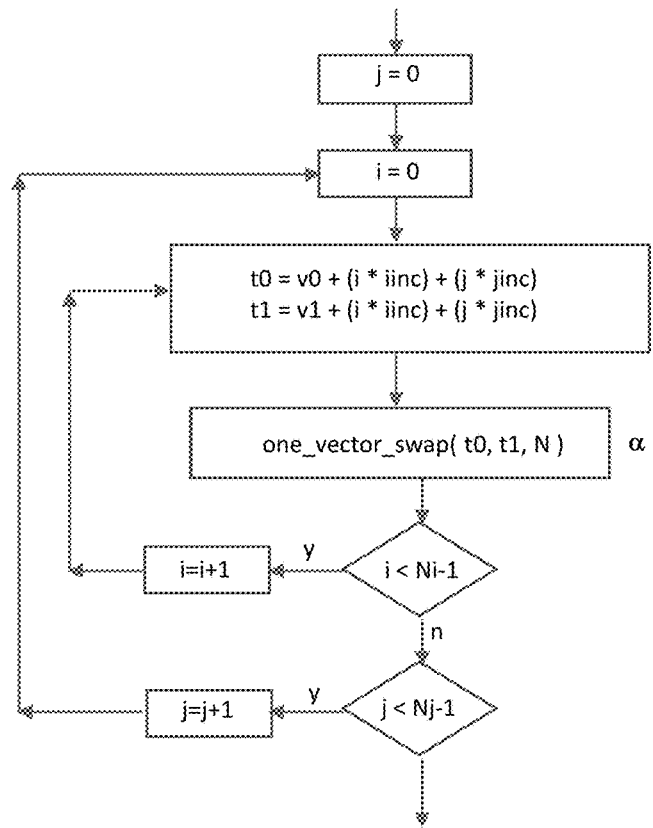
FIG. 6 is a flow diagram illustrating a function, in accordance with an embodiment of the present disclosure.

FIG. 5 is a flow chart representing a multi-pass two-bit reordering method, in accordance with an embodiment of the present disclosure. For two-bit reordering, 2 (bits per pass)*Ln/2 passes=Ln bits reordered. The conditional at the top indicates an input vector is acquired from 1 when p=0. The conditional at the bottom of the chart indicates an output vector is produced at 2 when p=Ln/2−1. Otherwise, p is incremented by one, and the data vector is modified on the next pass with the next execution of the function two_bit_reorder_vector_swaps(Ln, p), which function is represented in FIG. 6.

Referring to the binary loop index representation above, there are two loops controlling the swap vector sequence for any pass p. The outer loop is defined by the left bit field, while the inner loop is defined by the middle, reordered bit field.

two_bit_reorder_vector_swaps(Ln, p):

$$Ln\_rl = ln/2 + p + (Ln \; \& \; 0x1); Ln\_rr = ln/2 - p - 1;$$

$$v0 = 2^{ln\_rr}; v1 = 2^{ln\_rl};$$

$$N = 2^{ln\_rr}; Nj = 2^{ln\_rr}; Ni = 2^{ln\_rl - ln\_rr - 1}$$

$$iinc = 2^{ln\_rr+1}; jinc = 2^{ln\_rl+1}$$

Ln_rl, Ln_rr represent the position in the binary loop index representation of the "reorder indices" for pass p.

Figure 7:
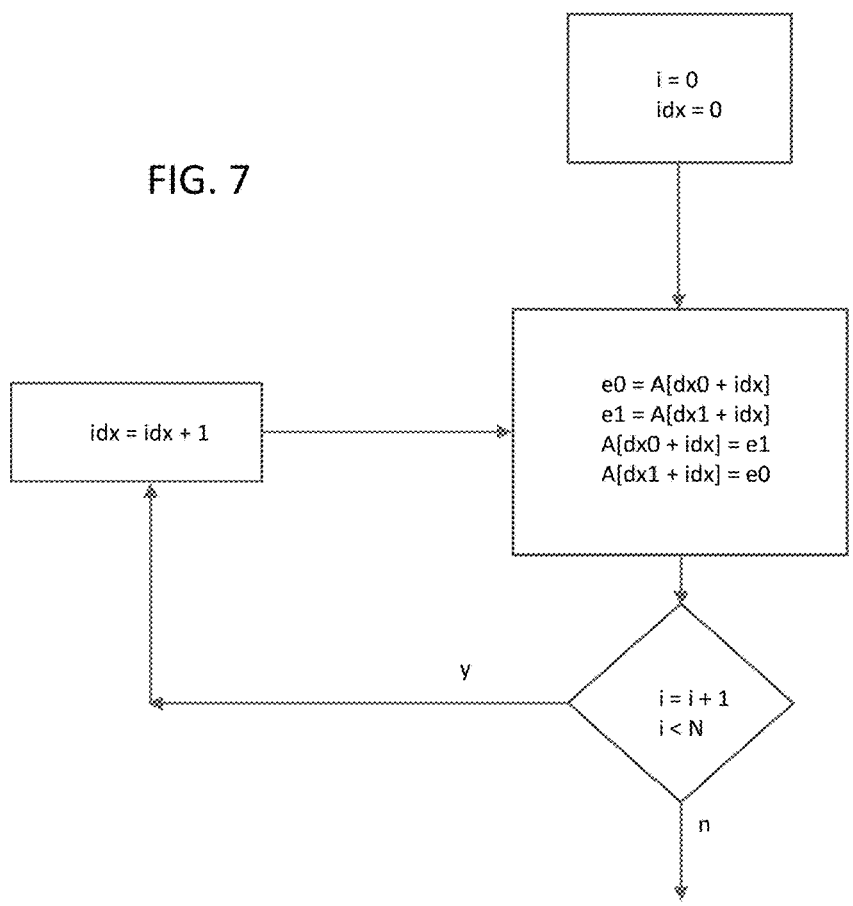
FIG. 7 is a flow diagram illustrating a function, in accordance with an embodiment of the present disclosure.

Given vector A[ ], one vector swap (dx0, dx1, N) is defined as shown in FIG. 7.

Returning to FIG. 6, the portion labeled α represents a function executing four-bit reordering, which utilizes six vector swap sequences per pass. In this case, the function one_vector_swap( ) is executed six times with arguments as listed below. Compared to the two-bit method, although six executions of the function one_vector_swap( ) are required per pass, only half the passes are required for complete multi-pass vector four-bit reordering.

The binary loop index representation for four-bit reordering is:

Pass p: p=0, ln/4−1; 4 (bits per pass)*Ln/4 passes=Ln
reorder indices $r_{ll} \; r_{lr} \; r_{rl} \; r_{rr}$
| | | |
$i_0 \; i_1 \ldots i_{ln/2-2p-2} \; i_{ln/2-2p-1} \; i_{ln/2+2p-1+L} \ldots i_{ln/2-2p} \; i_{ln/2+2p+L}$
$i_{ln/2+2p+1+L} \ldots i_{ln-2} \; i_{ln-1}$
| | reordered bit field
Swap pairs for four-bit reordering, pass p:
Params: "inner" two reorder bits
ln_lr=ln/2+2p±(Ln&0x1)
ln_rl=ln/2−2p−1

$v0 = 2ln\_rl - 1$
$v1 = 2^{ln\_lr+1}$
vector swap(v0, v1, N=$2^{ln-rr-1}$) 0001< >1000
$v0 = 2^{ln\_rl}$
$v1 = 2^{ln\_lr}$
vector swap(v0, v1, N=$2^{ln\_rr-1}$) 0010< >0100
$v0 = 2^{ln\_rl} - 2^{ln\_rl-1}$
$v1 = 2^{ln\_lr} + 2^{ln\_lr+1}$
vector swap(v0, v1, N=$2^{ln\_rr-1}$) 0011< >1100
$v0 = 2^{ln\_rl} + 2^{ln\_lr+1}$
$v1 = 2^{ln\_rl-1} + 2^{ln\_lr}$
vector swap(v0, v1, N=$2^{ln\_rr-1}$) 1010< >0101
$v0 = 2^{ln\_rl} + 2^{ln\_lr} + 2^{ln\_lr+1}$
$v1 = 2^{ln\_rl} + 2^{ln\_rl-1} + 2^{ln\_lr}$
vector swap(v0, v1, N=$2^{ln\_lr}$) 1110< >0111
$v0 = 2^{ln\_rl-1} + 2^{ln\_lr} + 2^{ln\_lr+1}$
$v1 = 2^{ln\_rl-1} + 2^{ln\_rl} + 2^{ln\_lr+1}$
vector swap(v0, v1, N=$2^{ln\_rr-1}$) 1101< >1011

Section 3: Standard In-Place DIT FFT (Base-2)

Figure 8:
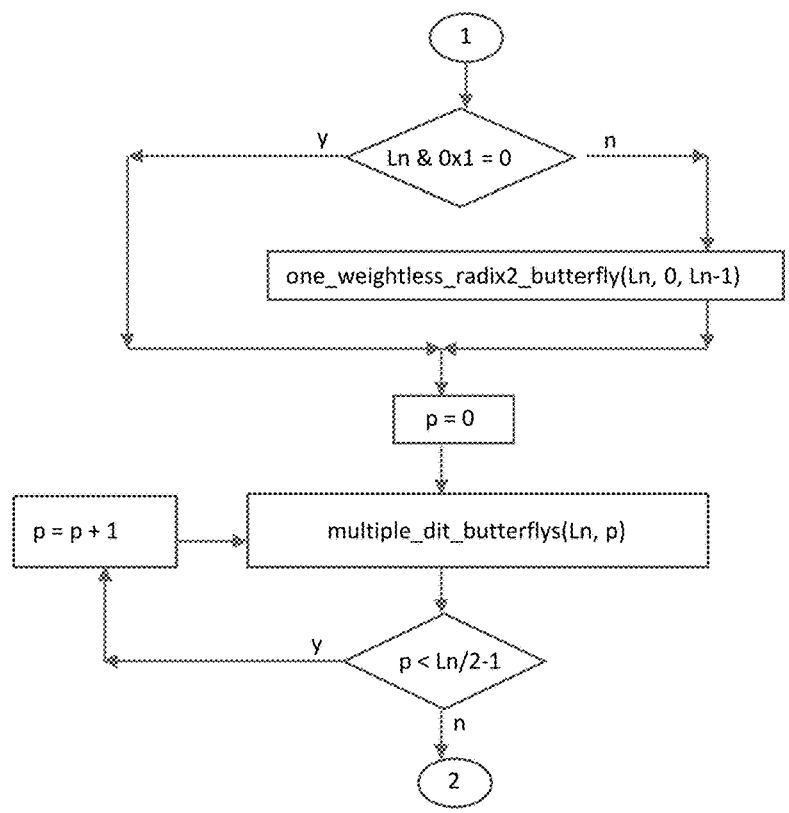
FIG. 8 is a flow diagram illustrating an in-place decimation-in-time (DIT) FFT, in accordance with an embodiment of the present disclosure.

The in-place DIT FFT is a multi-pass method which has the high-level flow chart representation shown in FIG. 8. As will be appreciated in light of this disclosure, the flow chart of FIG. 8 is similar in structure to the flow chart of FIG. 5 describing the multi-pass two-bit reordering method. The Radix-4 in-place DIT FFT has the following binary loop index representation, where k's, b's, and j's=0 or 1.

Figure 9:
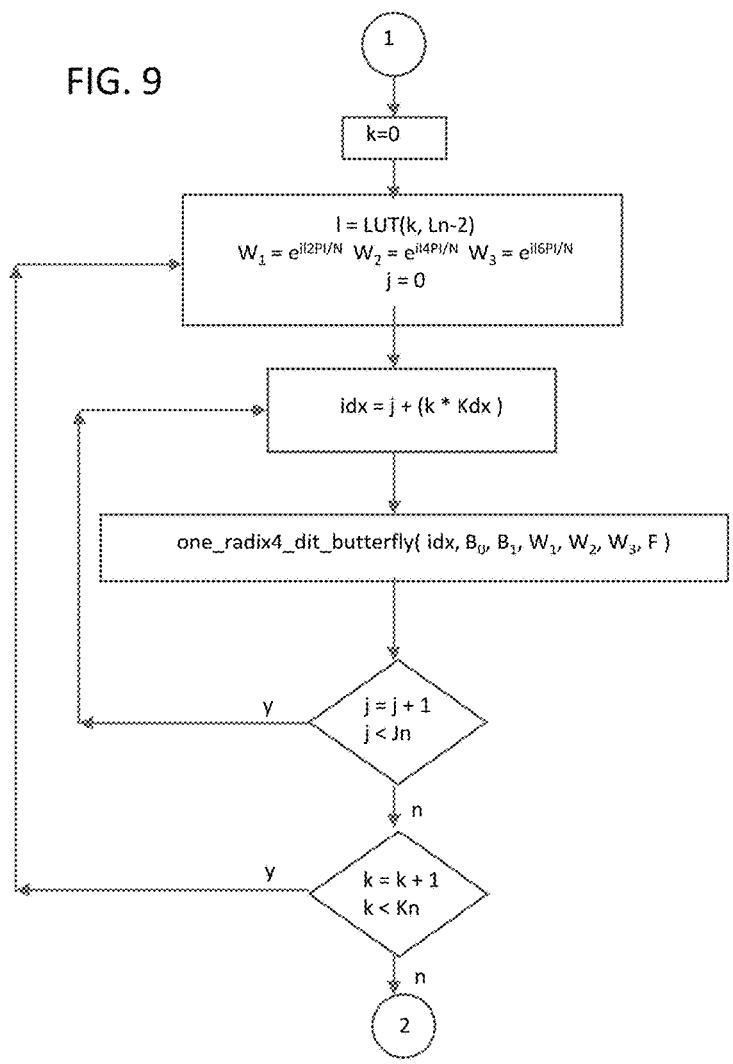
FIG. 9 is a flow diagram illustrating a function, in accordance with an embodiment of the present disclosure.

Ln & 0x1=1: Radix-2 butterfly is executed
$b_0 \; i_{Ln-2} \; i_{Ln-3} \ldots j_2 \; j_1 \; j_0$
For pass p: p=0:
Ln & 0x1=0:
$b_1 \; b_0 \; j_{Ln-3} \; j_{Ln-4} \ldots j_1 \; j_0$
Ln & 0x1=1:
$k_0 \; b_1 \; b_0 \; j_{Ln-4} \; j_{Ln-5} \; j_1 \; j_0$
For pass p: p=1, Ln/2−1:
Ln & 0x1=0:
$k_0 \; k_1 \ldots k_{2p-2} \; k_{2p-1} \; b_1 \; b_0 \; j_{Ln-2p-3} \; j_{Ln-2p-4} \ldots j_1 \; j_0$
Ln & 0x1=1:
$k_0 \; k_1 \ldots k_{2p-2} \; k_{2p-1} \; k_{2p} \; b_1 \; b_0 \; j_{Ln-2p-4} \; j_{Ln-2p-5} \ldots j_1 \; j_0$ The k and j index fields represent loop structures (i.e., loop counts and vector index values), as shown in FIG. 9. The field $b_1 \; b_0$ represents the vector indices of the Radix-4 butterfly. The Radix-2 butterfly has a 1-bit field $b_0$ representing the two vector indices required.

Returning to FIG. 8, if (Ln & 0x1) is true (i.e., odd power of two-sized vectors), then the first pass is executed with a "weightless" radix two butterfly. Subsequent passes are Radix-4-based butterfly stages for both even and odd powers of two-sized vectors.

Returning to FIG. 9, the k field in the butterfly binary index represents an integer counter used to assign the complex exponential roots of unity (Ws) required for the Radix-4 butterfly computations. This field is bit-reversed, and a LUT is required for the assignment of the Ws. The execution of Ln/2 passes of the function multiple_dit_butterflys (Ln, p) (FIG. 9) produces the correct Fourier coefficients but in the scrambled order described in Section 1. For multiple_dit_butterflys(Ln, p) vector size Ln, pass p, the loop parameter assignments are:

lnm1=Ln & 0x1
if p=0
   Ln_ng=0;
   Ln_nb=Ln-2-lnm1;
else
   Ln_ng=(2*p)+lnm1;
    Ln_nb=Ln-2-Ln_ng;
end
$B0=2^{Ln\_nb}$;
$B1=2^{(Ln\_nb+1)}$;
$N=2^{Ln}$;
$kn=2^{Ln\_ng}$;
$jn=2^{Ln\_nb}$;
$kdx=2^{(Ln\_nb+2)}$;
multiple_dit_butterflys(Ln, p)

The DIF FFT loop structure parameters are identical to the DIT variant. The differences are that one_radix4_dit_butterfly( ) is replaced by one_radix4_dif_butterfly( ), which executes the DIF butterfly computation defined below.

The weights index calculation utilizes the j index field in the butterfly binary index:

$$iw=j*2^{2p}.$$

No bit reversal is required because the j index field is normally ordered (i.e., increasing from right to left in the butterfly binary index). The DIF FFT is used for the hybrid design in Section 6 (discussed below).

The computational functions referenced in FIG. 9 are defined below.

Define radix2_weightless_butterfly($a_0$, $a_1$, F):

$y_0=a_0+a_1$;

$y_1=a_0-a_1$;

Define radix2_dit_butterfly($a_0$, $a_1$, $W_1$, F):

$aw_1=a_1*conj(W1)$;

$y_0=a_0+aw_1$;

$y_1=a_0-aw_1$;

Define radix2_dif_butterfly($a_0$, $a_1$, $W_1$, F):

$y_0=a_0+a_1$;

$y_1=(a_0-a_1)*conj(W_1)$

Define radix4_read(B0, B1, idx, $a_0$, $a_1$, $a_2$, $a_3$):

$a_0=A[idx]$ $a_1=A[B0+idx]$ $a_2=A[B1+idx]$ $a_3=A[B1+B0+idx]$

Define radix4_write(B0, B1, idx, $a_0$, $a_1$, $a_2$, $a_3$):

$A[idx]=a_0$ $A[B0+idx]=a_1$ $A[B1+idx]=a_2$ $A[B1+B0+idx]=a_3$

Define radix4_dit_butterfly($W_1$, $W_2$, $W_3$, $a_0$, $a_1$, $a_2$, $a_3$, F):

$aw_1=a_1*conj(W_1)$;

$aw_2=a_2*conj(W2)$;

$aw_3=a_3*conj(W3)$;

$b_0=a_0+aw_2$;

$b_2=a_0-aw_2$;

$b_1=aw_1+aw_3$;

if F=1

$br_3=imag(aw_1)-imag(aw_3)$;

$bi_3=real(aw_3)-real(aw_1)$;

else $br_3=imag(aw3)-imag(aw_1)$;

$bi3=real(aw_1)-real(aw_3)$;

end $b_3=complex(br_3,bi_3)$;

$y0=b_0+b_1$;

$y1=b2+b_3$;

$y2=b_0-b_1$;

$y3=b_2-b_3$;

Define radix4_dif_butterfly($W_1$, $W_2$, $W_3$, $a_0$, $a_1$, $a_2$, $a_3$, F):

$b0=a00+a02$;

$b1=a01+a03$;

$b2=a00-a02$;

$b3=a01-a03$;

if F=1

$bt3r=imag(b3)$;

$bt3i=real(b3)$;

else $bt3r=-imag(b3)$;

$bt3i=-real(b3)$;

end $bt3=complex(bt3r,bt3i)$;

$y0=b0+b1$;

$yt1=b2+bt3$;

$y2=b0-b1$;

$yt3=b2-bt3$;

$y1=complex(real(yt1),imag(yt3))$;

$y3=complex(real(yt3),imag(yt1))$;

$yw1=y2*conj(W2)$;

$yw2=y1*conj(W1)$;

$yw3=y3*\text{conj}(W3);$ $a00=y0;$ $a01=yw1;$ $a02=yw2;$ $a03=yw3;$ one_radix4_dit_butterfly(idx, $B_0$, $B_1$, $W_1$, $W_2$, $W_3$, F):
  radix4_read($B_0$, $B_1$, idx, $a_0$, $a_1$, $a_2$, $a_3$)
  radix4_dit_butterfly($W_1$, $W_2$, $W_3$, $a_0$, $a_1$, $a_2$, $a_3$, F)
  radix4_write($B_0$, $B_1$, idx, $a_0$, $a_1$, $a_2$, $a_3$)
where parameter (F) is used for forward or inverse transform calculations.

one_radix4_dif_butterfly(idx, $B_0$, $B_1$, $W_1$, $W_2$, $W_3$, F):
  radix4 read($B_0$, $B_1$, idx, $a_0$, $a_1$, $a_2$, $a_3$)
  radix4_dif_butterfly($W_1$, $W_2$, $W_3$, $a_0$, $a_1$, $a_2$, $a_3$, F)
  radix4 write($B_0$, $B_1$, idx, $a_0$, $a_1$, $a_2$, $a_3$)
where parameter (F) is used for forward or inverse transform calculations.

For the inverse FFT, the Radix-4 butterfly is executed assigning the function parameter F a value of −1. Also, all weight calculations are conjugated before they are used by the butterfly computation. This comes from the definition of the inverse FFT and applies to techniques presented in this disclosure.

Section 4: Fusion of Two-Bit Reordering and Radix-4 In-Place DIT FFT (Base-2)

Generally, the concept behind this portion of the disclosure is to "fuse" the binary loop indices of the multi-pass reordering techniques of Section 2 with the standard in-place FFT techniques of Section 3 for each pass p of the execution. The result of this "fusion" is a modified binary loop index, which describes a loop structure for reconfigured butterfly computational sequences. The reconfiguring of the butterfly computational sequences produces the correct output, given the partially reordered state of the input vector for any pass. Furthermore, the loop structure utilized to execute the reconfigured butterfly sequences makes it possible to simultaneously execute, via a loop-unrolling mechanism, the vector swap sequences of the reordering techniques described in Section 2.

The following example shows how the various binary loop indices are modified each pass. Note that additional symbols are added to indicate that two-bit reordering is executed on each pass.

Example: N=1024
Binary index: Ln(1024)=10 bits
Number of passes required for Radix-4 butterfly computations (FIG. 8): Ln/2=5
Number of passes required for two-bit reordering (FIG. 5): Ln/2=5

Each pass, three binary loop index representations are listed: (1) Binary loop index representing the standard radix4 In-place DIT FFT butterfly; (2) Binary index of the partially reordered vector annotated with parentheses representing a "reordered bit field" and r's representing "reorder indices"; and (3) Modified butterfly binary loop index used to specify a loop structure for reconfigured butterfly computations.

Pass0:
$b_1 \, b_0 \, j_7 \, j_6 \, j_5 \, j_4 \, j_3 \, j_2 \, j_1 \, j_0$
$r_l \, r_r$
$i_0 \, i_1 \, i_2 \, i_3 \, i_4 \, i_5 \, i_6 \, i_7 \, i_8 \, i_9$; two-bit reordering on pass 0
$b_1 \, b_0 \, j_7 \, j_6 \, j_5 \, j_4 \, j_3 \, j_2 \, j_1 \, j_0$ Pass1:
$k_0 \, k_1 \, b_1 \, b_0 \, j_5 \, j_4 \, j_3 \, j_2 \, j_1 \, j_0$
$r_l \, r_r$
$i_0 \, i_1 \, i_2 \, i_3 \, (i_5 \, i_4) \, i_6 \, i_7 \, i_8 \, i_9$; partially reordered input vector
$k_0 \, k_1 \, b_1 \, b_0 \, (j_4 \, j_5) \, j_3 \, j_2 \, j_1 \, j_0$; for pass 1

Pass2:
$k_0 \, k_1 \, k_2 \, k_3 \, b_1 \, b_0 \, j_3 \, j_2 \, j_1 \, j_0$
$r_l \, r_r$
$i_0 \, i_1 \, i_2 \, (i_6 \, i_5 \, i_4 \, i_3) \, i_7 \, i_8 \, i_9$
$k_0 \, k_1 \, k_2 \, (j_3 \, b_0 \, b_1 \, k_3) \, j_2 \, j_1 \, j_0$ Pass3:
$k_0 \, k_2 \, k_3 \, k_4 \, k_5 \, b_0 \, j_1 \, j_0$; B field: 2, 3
$r_l \, r_r$
$i_0 \, i_1 \, (i_7 \, i_6 \, i_5 \, i_4 \, i_3 \, i_2) \, i_8 \, i_9$
$k_0 \, k_1 \, (b_0 \, b_1 \, k_5 \, k_4 \, k_3 \, k_2) \, j_1 \, j_0$; B field: 7, 6

Pass4:
$k_0 \, k_1 \, k_2 \, k_3 \, k_4 \, k_5 \, k_6 \, k_7 \, b_1 \, b_0$
rl $r_r$
$i_0 \, i_1 \, (i_7 \, i_6 \, i_5 \, i_4 \, i_3 \, i_2) \, i_8 \, i_9$
$k_0 \, (b_1 \, k_7 \, k_6 \, k_5 \, k_4 \, k_3 \, k_2 \, k_1) \, b_0$ Focusing on the loop structure for pass 3, the binary index representing the partially reordered input vector for pass 3 is:

$i_0 \, i_1 \, (i_7 \, i_6 \, i_5 \, i_4 \, i_3 \, i_2) \, i_8 \, i_9$.

The middle index segment inside the parentheses is unscrambled: indexing right to left, low to high. The two-bit segments on the left and right are still scrambled. The standard DIT FFT butterfly binary loop index for pass 3 is:

$k_0 \, k_1 \, k_2 \, k_3 \, k_4 \, k_5 \, b_1 \, b_0 \, j_1 \, j_0$.

The reconfigured butterfly binary loop index→$r_l,r_r$ are reorder indices:

$r_l \, r_r$
i0 i1 (i7 i6 i5 i4 i3 i2) i8 i9
k0 k1 (b0 b1 k5 k4 k3 k2) j1 j0.

The butterfly index values $b_1, b_0$ have been changed from the values 3, 2 for pass 3 in the Standard FFT butterfly binary loop index to the values 7, 6 in the reconfigured butterfly binary loop index. The reconfigured butterfly binary loop index for pass 3 defines a three-level loop structure:

outer loop: k0 k1; 4-pt loop count
middle loop: k5 k4 k3 k2; 16-pt loop count
inner loop: j1 j0; 4-pt loop count For this example, the loop structure is discerned by inspection of the reconfigured butterfly binary loop index for pass 3. In general, parameter assignment equations are derived which configure a general multi-level loop structure as a function of vector size Ln and pass p. Note that the k index is split on pass 3, with the segment on the right "unscrambled" (ascending order, right to left) or reordered. The k index segment on the left is still in "scrambled" order and requires a LUT. The two segments are combined in reverse order, producing an integer for the assignment of the complex roots of unity (Ws) used in the butterfly computations.

The outer loop and the inner loop are both unrolled once to execute the swapping logic required for two-bit reordering. Even-odd passes for the outer loop and high-low passes for the inner loop correspond to 0, 1 values for the left and right reorder indices, respectively. The loop unrolling results in the execution of four independent butterfly computations. Swapping the output of two of these butterfly computations will execute the two-bit reordering method of Section 2 producing a partially "unscrambled" input vector for the next pass.

The above-noted specific example is intended to introduce some basic concepts and mechanisms behind the structures described in this disclosure. The butterfly binary loop index representation is the primary object used to configure a computational structure for a given size Ln and a given pass p. The various "fused" loop index representations contain all the information needed to configure the loop structures required for the production of normally ordered Fourier coefficients.

Figure 10:
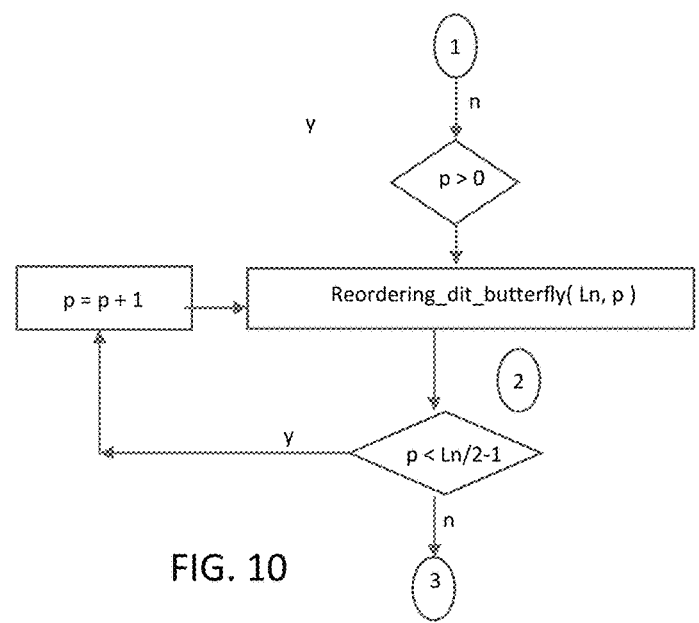
FIG. 10 is a flow diagram illustrating a control for a reordering FFT, in accordance with an embodiment of the present disclosure.

FIG. 10 represents the high-level control flow for the reordering FFT. When p=0, the input vector is acquired from 1, whereas when p=Ln/2−1, the output vector is supplied to 3. Node 2 is common to FIGS. 10-11 (discussed below). The internal structure of the function reordering_dit_butterfly (Ln,p) in FIG. 10 contains a conditional bank (see FIG. 11) with five possible computational paths. Each path has a unique set of parameters which configure the four-level loop structure represented in FIG. 12 (discussed below). This loop structure controls the execution of the reconfigured butterfly computations and vector reordering for each pass. Let:

$$b_0=(Ln-(2p)-2-(Ln\ \&\ 0x1))$$

$$b1=(Ln-(2p)-1-(Ln\ \&\ 0x1))$$

$$r_l=(Ln/2+(p-p0)+(Ln\ \&\ 0x1))$$

$$r_r=(Ln/2-(p-p0)-1)$$

The value p0 represents the first pass in which reordering begins. For two-bit reordering to be "fused synchronously" with the Radix-4 DIT FFT, p0 is set equal to zero. In this case, computation and two-bit reordering both finish on the last pass. In Section 5 below, p0 will be set equal to an integer value greater than zero for a hybrid design based on the combination of the standard FFT of Section 3 and the FFT reordering techniques described here in Section 4 and in Section 5 below.

Figure 11:
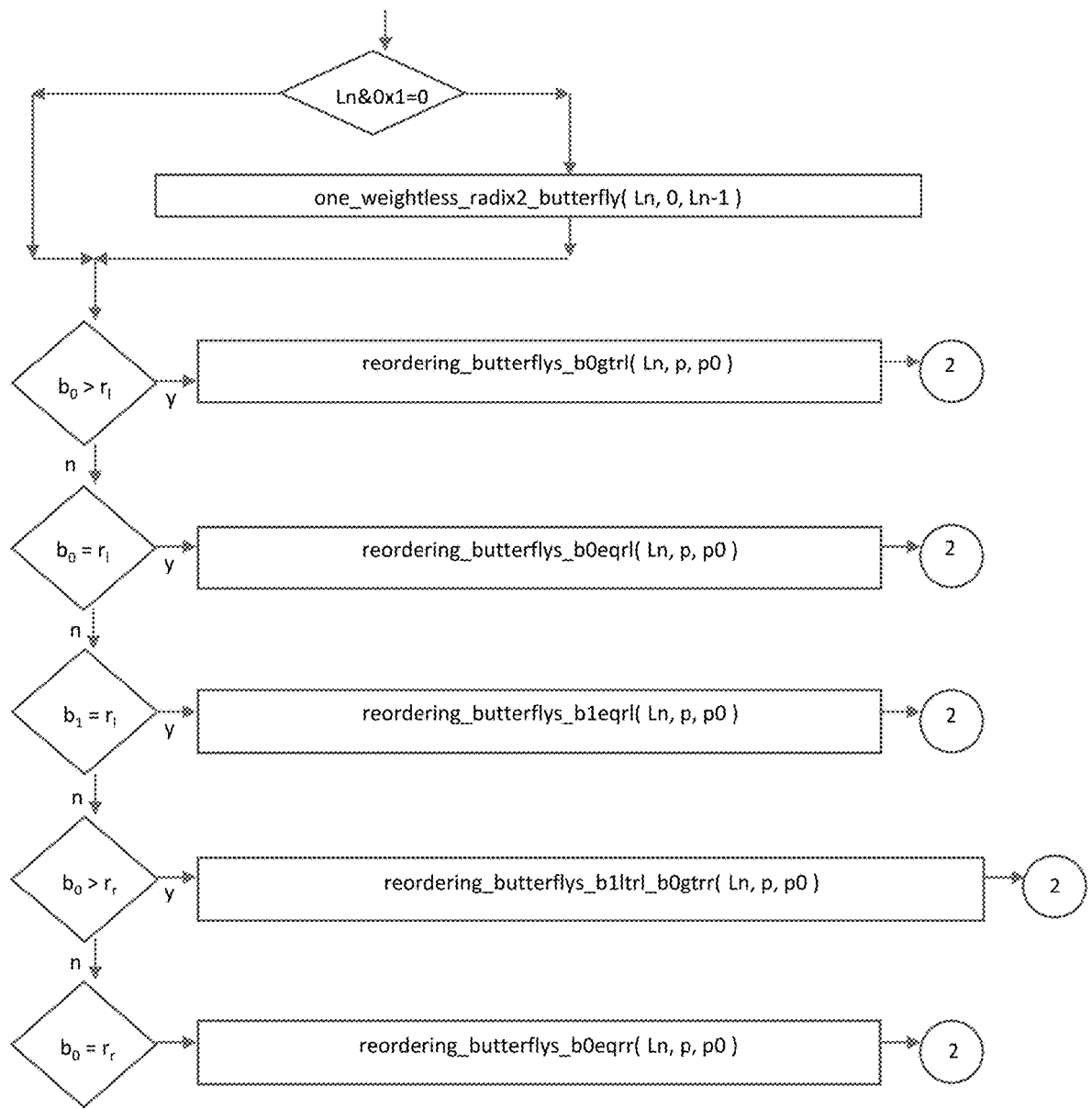
FIG. 11 is a flow diagram illustrating a conditional bank, in accordance with an embodiment of the present disclosure.
Figure 12:
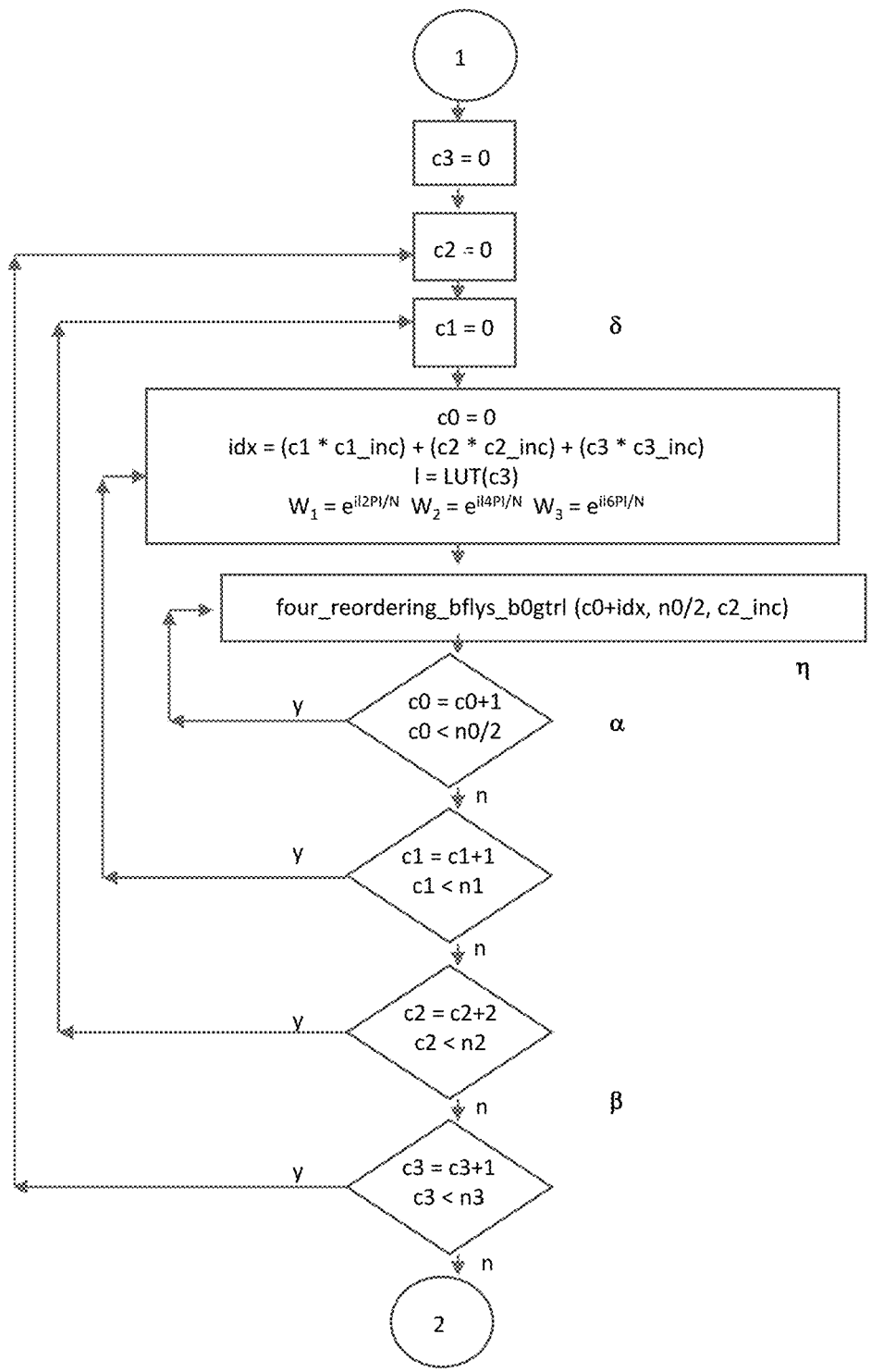
FIG. 12 is a flow diagram illustrating a four-level loop structure, in accordance with an embodiment of the present disclosure.

All computational paths in FIG. 11 represent the configuring and execution of the four-level loop of FIG. 12. The nodes labeled 2 represent the end of the specific computational path for pass p and a direct connection to the evaluation of the conditional (p<Ln/2−1) in FIG. 10. Only one path is taken for a given value of p, so there is no logical contention for point 2 within the conditional bank.

The execution of the four-level loop structure of FIG. 12 is common to all paths of the conditional bank of FIG. 11. In general, the loop structure of FIG. 12 is required for the fusion of the multi-pass reordering techniques of Section 2 and the FFT techniques described in Section 3. This loop structure is configured differently, depending on which path in the conditional bank is selected. Each path is represented by various states of alignment between the two reorder indices and the "b-field" of the reconfigured butterfly binary loop index. This alignment state is used to derive loop parameter assignment equations as a function of Ln and p. The last path in the conditional bank is the result of an alignment between $b_0$ and $r_r$ for fused two-bit reordering. As p increases, the path selected in FIG. 11 moves high to low on the conditional bank.

Turning now to FIG. 11, we examine every path represented therein. First, we list the parameter assignment equations needed for the configuration of the loop structure of FIG. 12. The parameter assignment equations are functions of vector size Ln and unique to a specific path in the bank. Second, we detail the reordering butterfly function executed for each path.

Execution begins with path ($b_0>rl$). Annotation is keyed in bold Greek letters. The path ($b_0>r_l$) is represented in FIG. 11 by the first diamond in the top section of the conditional bank. Note that $b_0$ is to the left of $r_l$ in the reconfigured butterfly binary loop index representation below, which is equivalent to $b_0$ having a greater value than $r_l$. The reconfigured butterfly binary loop index for this computational path defines a four-level loop structure, inner loop (loop0)→outer loop (loop3): L=Ln&0x1:

reorder indices $r_l\ r_r$
| |
$k_0\ \ldots\ k_{2p-1+L}\ b_1\ b_0\ j_{ln-2p-3-L}\ \cdots\ j_{ln/2+(p-p0)+L}\ j_{ln/2-(p-p0)}$
$j_{ln/2+(p-p0)-1+L}\ j_{ln/2-(p-p0)-1}\ \cdots\ j_0$
| | reordered bit field loop0: $j_{ln/2-(p-p0)-1}\ \cdots\ j_0$; right-most j sub-segment
loop1: $j_{ln/2+(p-p0)-1+L}\ \cdots\ j_{ln/2-(p-p0)}$; middle reordered bit field
loop2: $j_{ln/2+(p-p0)+L}\ \cdots\ j_{ln-2p-3-L}$; left-most j sub-segment
loop3: $k_0\ \ldots\ k_{2p-1+L}$; k field vanishes for p=0

Define:

$n3=2^{ln\_n3\_cnt}$ $c3\_inc=2^{ln\_c3\_inc}$
$n2=2^{ln\_n2\_cnt}$ $c2\_inc=2^{ln\_c2\_inc}$
$n1=2^{ln\_n1\_cnt}$ $c1\_inc=2^{ln\_c1\_inc}$
$n0=2^{ln\_n0\_cnt}$
$B0=2^{ln\_B0}$
$B1=2^{ln\_B1}$
$B2=2^{ln\_B2}$ Regarding FIG. 12, at portions α and β thereof, loops 0 and 2 are unrolled, loop0: high and low, loop2: even and odd: unrolling loop0 high ($r_r=1$) and low ($r_r=0$) toggles the right reorder index; unrolling loop2 even ($r_l=0$) and odd ($r_l=1$) toggles the left reorder index. Further regarding FIG. 12, at portion δ thereof, the value of the outer loop index c3 is reordered via a LUT and used in the equations assigning the Ws for the butterfly computations. For this computational path, only the value of c3 is used to assign the Ws. Other paths represented in FIG. 11 require the combination of several loop indices to assign the Ws as in the N=1024 example discussed above. Further regarding FIG. 12, at portion η thereof, the three parameters of the function four_reordering_butterflys_b0gtrl( ) are used to compute the vector indexing required for the four butterfly computations:

No Swap $$idx: \to r_l=0, r_r=0$$

$$idx+n0/2+c2\_inc \to r_l=1, r_r=1$$

Swap $$idx+n0/2 \to r_l=0, r_r=1$$

$$idx+c2\_inc \to r_l=1, r_r=0$$

Regarding parameter assignment equations, per FIG. 11, path: $b_0>r_l$, configuring the loop structure in FIG. 12:

$$b_0=(Ln-(2p)-2-(Ln\ \&\ 0x1);$$

$$r_l=(Ln/2+(p-p0)+(Ln\ \&\ 0x1);$$

$$Ln\_n3\_cnt=0$$

$$Ln\_c3\_inc=0$$

if p>0

$$Ln\_n3\_cnt=(2p)+(Ln\ \&\ 0x1)$$

$$Ln\_c3\_inc=Ln-(2p)-(Ln\ \&\ 0x1)$$

end if $$Ln\_n2\_cnt=Ln-(2p)-2-(Ln\ \&\ 0x1)-Ln/2-(p-p0)-\\(Ln\ \&\ 0x1);$$

Figure 13:
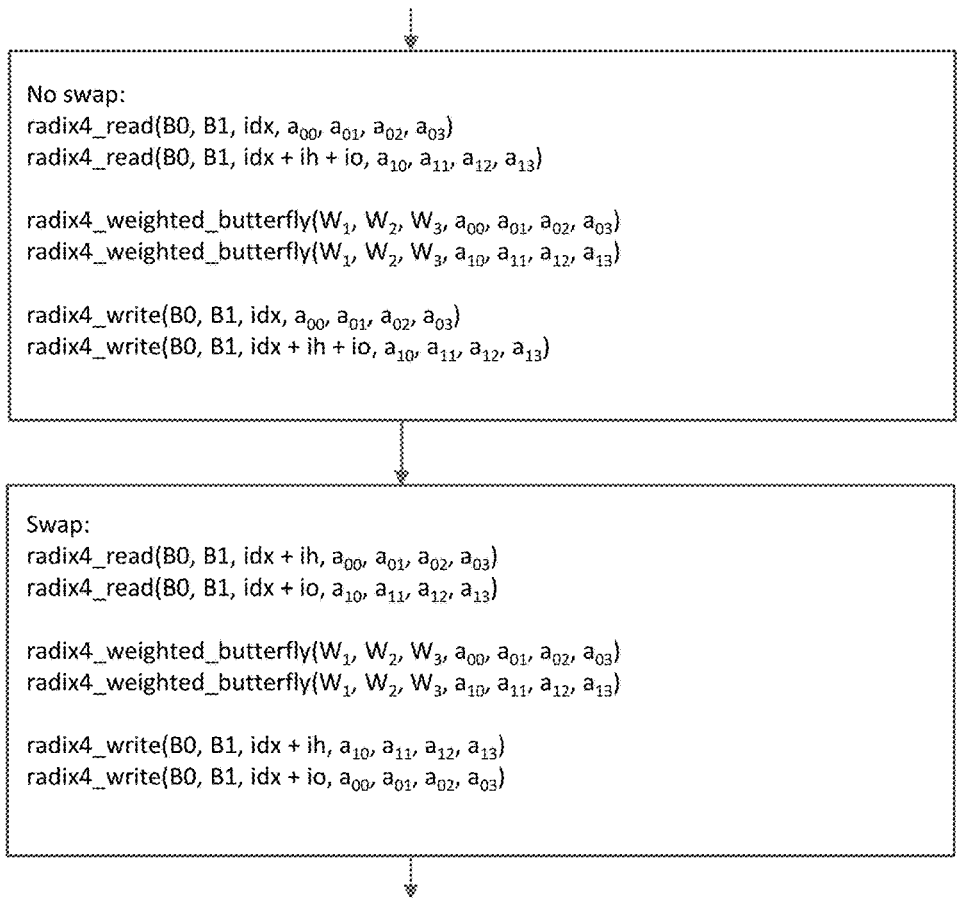
FIG. 13 is a block diagram illustrating swap/no swap logic, in accordance with an embodiment of the present disclosure.
Figure 14:
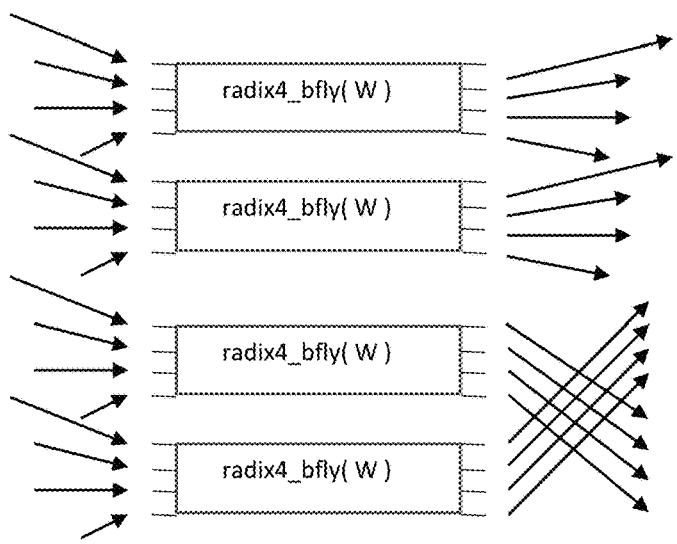
FIG. 14 is a butterfly diagram illustrating four Radix-4 butterflies, in accordance with an embodiment of the present disclosure.

$Ln\_c2\_inc=Ln/2+(p-p0)+(Ln \& 0x1);$ $Ln\_c1\_cnt=(2(p-p0))+(Ln \& 0x1);$ $Ln\_c1\_inc=Ln/2-(p-p0);$ $Ln\_n0\_cnt=Ln/2-(p-p0);$ $Ln\_B0=Ln-(2p)-2-(Ln \& 0x1);$ $Ln\_B1=Ln-(2p)-1-(Ln \& 0x1);$ $Ln\_B2=Ln-(2p)-1;$ Regarding FIG. 13, at portion γ thereof, the unrolled loop structure of FIG. 12 produces two pairs of (i.e., four) butterfly computations—the results of two of the computations are swapped on output and two are not. This "swap/no swap" logic embedded in the computational sequence is functionally identical to the two-bit reordering techniques described in Section 2. See FIG. 13 and FIG. 14 for the reordering butterfly function: four_reordering_butterflys_b0gtrl(c0+idx, ih, io). For path ($b_0=r_l$), the reconfigured butterfly binary loop index for the path: L=Ln&0x1 reorder indices $r_l$ $r_r$
| |
$k_0 \ldots k_{2p-1+L}$ $b_1$ $b_0$ $j_{Ln/2-(p-p0)} \cdots j_{Ln-2p-3-L}$ $j_{Ln/2-(p-p0)-1}$ $j_0$ reordered bit field Regarding FIG. 12, at portions α and β thereof, for the ($b_0=r_l$), ($b_1=r_l$) paths, configuring the four-level loop of FIG. 12 for two-bit reordering requires only the inner-most loop to be unrolled, resulting in two butterfly computations, instead of four. Also regarding FIG. 12, at portion η thereof, for the ($b_0=r_l$) alignment state, four_reordering_butterflys( ) is replaced with two_reordering_butterflys( ). The a→c transfer in FIG. 15 (discussed below) represents the swap/no swap logic required to execute two-bit reordering for the next pass.

Figures 15, 16:
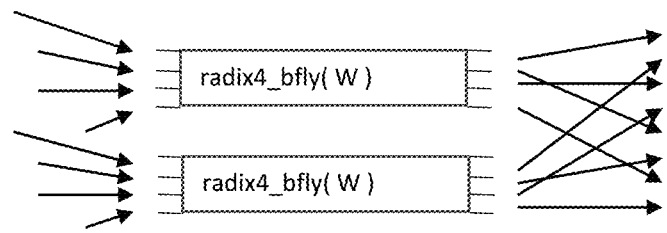
FIG. 15 is a block diagram illustrating a function, in accordance with an embodiment of the present disclosure.
FIG. 16 is a butterfly diagram illustrating two reordering Radix-4 butterflies, in accordance with an embodiment of the present disclosure.

Regarding parameter assignment equations, per FIG. 11, path: $b_0=r_l$, configuring the loop structure in FIG. 12:

$Ln\_n3\_cnt=(2p)+(Ln \& 0x1);$ $Ln\_c3\_inc=Ln-(2p)-(Ln \& 0x1);$ $Ln\_n2\_cnt=(2(p-p0))+(Ln \& 0x1);$ $Ln\_c2\_inc=Ln/2-(p-p0);$ $Ln\_n1\_cnt=0;$ $Ln\_c1\_inc=0;$ $Ln\_n0\_cnt=Ln/2-(p-p0);$ $Ln\_B0=Ln-(2p)-2-(Ln \& 0x1);$ $Ln\_B1=Ln-(2p)-1-(Ln \& 0x1);$ See FIG. 15 and FIG. 16 for the reordering butterfly function: two_reordering_radix4_butterflys_b0eqrl(idx+c0, n0/2, $b_0$, $b_1$, Wa, 1). For path ($b_1=r_l$):

reorder indices $r_l$ $r_r$
| |
$k_0$ $k_{2p-1+L}$ $b_1$ $j_{Ln/2-(p-p0)} \cdots j_{Ln-2p-3-L}$ $b_0$ $j_{Ln/2-(p-p0)-1}$ $j_0$
| |
reordered bit field For the ($b_1=r_l$) alignment state, there are two possibilities: State 1: (($b_1=r_l$) and ($b_0=r_r$)); State 2: ($b_1=r_l$) and ($b_0>r_r$) State 1: (($b_1=r_l$) and ($b_0=r_r$)); no explicit reordering is required in the conditional bank by the ($b_1=r_l$) diamond. Two butterfly computations are performed with swap/no swap logic displayed in FIG. 17 (discussed below). The differences between FIGS. 15 and 17 are in the reordering logic represented by the a→c transfer.

Regarding parameter assignment equations, per FIG. 11, where the path: $b_1$=configuring the loop structure in FIG. 12:

$Ln\_n3\_cnt=(2p)+(Ln \& 0x1);$ $Ln\_c3\_inc=Ln-(2p)-(Ln \& 0x1);$ $Ln\_n2\_cnt=(2(p-p0))-1+(Ln \& 0x1);$ $Ln\_c2\_inc=Ln/2-(p-p0)+1;$ $Ln\_n1\_cnt=0;$ $Ln\_c1\_inc=0;$ $Ln\_n0\_cnt=Ln/2-(p-p0);$ $Ln\_B0=Ln/2-(p-p0);$ $Ln\_B1=Ln-(2p)-1-(Ln \& 0x1);$ For the reordering butterfly function (see FIGS. 17 and 18):

Two_reordering_radix4_butterflys_b1eqrl(idx+c0, n0/2, $b_0$, $b_1$, Wa, 1).

For the path ($b_1<r_l$) and ($b_0>r_r$), the reconfigured butterfly binary loop index for this alignment state of the reorder index $r_l$, shows that the k field is split into two segments: L=Ln & 0x1.

$r_l$ reorder indices $r_r$
| |
$k_0$ $k_{Ln/2-(p-p0)-1-L}$ $j_{Ln/2-(p-p0)} \cdots j_{Ln-2p-3-L}$ $b_0$ $b_1$ $k_{2p-l+L}$
$k_{Ln/2-(p-p0)-L}$ $j_{Ln/2-(p-p0)-1} \cdots j_0$
| reordered field |

Returning to FIG. 12, at portions α and β thereof, the configuration of the four-level loop structure requires loop3 (rather than loop2) as the even-odd unrolled outer loop, which is combined with the low-high unrolled innermost loop. Regarding parameter assignment equations, per FIG. 11, for the path: $b_0>rr$, configuring the loop structure in FIG. 12:

$Ln\_n3\_cnt=Ln/2-(p-p0);$ $Ln\_c3\_inc=Ln/2+(p-p0)+(Ln \& 0x1);$ $Ln\_n2\_cnt=(Ln-2p-3-(Ln \& 0x1))-(Ln/2-(p-p0))+1;$ $Ln\_c2\_inc=2(p+1)+(Ln \& 0x1);$ $Ln\_n1\_cnt=(2p)+(Ln \& 0x1)-(Ln/2-(p-p0));$ $Ln\_c1\_inc=Ln/2-(p-p0);$ $Ln\_n0\_cnt=Ln/2-(p-p0);$ $Ln\_B0=(2p)+1+(Ln \& 0x1);$ $Ln\_B1=(2p)+(Ln \& 0x1);$ For the reordering butterfly function:

Four reordering_radix4_butterflys_b1ltrl(idx+c0, n0/2, c3_inc, $b_0$, $b_1$, Wa0, Wa1, 1). This function has the same structure as the reordering butterfly function Four_reordering_radix4_butterflys_b0gtrl( ) with the following exceptions: the arguments for the reordering butterfly function executed: c3_inc replaces c2_inc, since loop3 rather than loop2 is unrolled (see FIG. 12 at portion η thereof):

$b_0 > r_l$ path: four_reordering_butterflys_b0gtrl (idx, n0/2, c2_inc);

$b_0 > r_r$ path: four_reordering_butterflys_b1ltrl (idx, n0/2, c3_inc).

See FIG. 19.

Returning to FIG. 12, at portion δ thereof, two segments are combined for the assignment of the Ws needed for the butterfly computation. The high-order scrambled segment is reordered with a LUT and combined with a lower-order unscrambled segment in reverse order. Also, two groups of Ws are needed since the outer c3 loop is unrolled. The equations for the weights index for this path are:

$l = (c1 << (Ln-2-Ln\_n1\_cnt)) + LUT(c3 << Ln\_n1\_cnt)$ $W_{01} = e^{i l 2PI/N}\ W_{02} = e^{i l 4PI/N}\ W_{03} = e^{i l 6PI/N}$; sqrt(-1), PI=3.141526 . . .

$l = (c1 << (Ln-2-Ln\_n1\_cnt)) + LUT((c3+1) << Ln\_n1\_cnt)$ $W_{11} = e^{i l 2PI/N}\ W_{12} = e^{i l 4PI/N}\ W_{13} = e^{i l 6PI/N}$ Returning to FIG. 13, at portion γ thereof, there are four independent butterfly computations, with the identical swap/no swap logic as the kjjj_bfly4 path, but unique Ws for the two butterfly computations:

radix4 weighted butterfly($W_{01}$, $W_{02}$, $W_{03}$, $a_{00}$, $a_{01}$, $a_{02}$, $a_{03}$);

radix4 weighted butterfly($W_{11}$, $W_{12}$, $W_{13}$, $a_{10}$, $a_{11}$, $a_{12}$, $a_{13}$).

Because the outer c3 loop is unrolled (see FIG. 12 at portion δ thereof), for the path ($b_0 = r_r$), the reconfigured butterfly binary loop index: L=Ln&0x1:

$r_l\ r_r$

| reorder indices |

$k_0$ . . . $k_{ln/2-(p-p0)-1-L}$ $b_1$ $k_{2*p-1+L}$ . . . $k_{ln/2-(p-p0)-L}$ $b_0$ $j_{Ln-2p-3-L}$ . . . $j_0$ reordered field | | loop3 (n3) loop1 (n1) loop0(n0)

Regarding parameter assignment equations, per FIG. 11, for the path: $b_0 = r_r$, configuring the loop structure in FIG. 12:

$Ln\_n3\_cnt = Ln/2 - (p-p0);$ $Ln\_c3\_inc = Ln/2 + (p-p0) + (Ln\ \&\ 0x1);$ $Ln\_n2\_cnt = 0;$ $Ln\_c2\_inc = 0;$ $Ln\_n1\_cnt = 2(p-p0) - 1 + (Ln\ \&\ 0x1);$ $Ln\_c1\_inc = Ln/2 - (p-p0);$ $Ln\_n0\_cnt = Ln/2 - (p-p0) - 1;$ $Ln\_B0 = Ln/2 - (p-p0) - 1;$ $Ln\_B1 = Ln/2 + (p-p0) - 1 + (Ln\ \&\ 0x1);$ For the reordering butterfly function (see FIG. 20):

two_reordering_radix4_butterflys_b0eqrr(idx+c0, c3_inc, $b_0$, $b_1$, Wa0, Wa1, 1).

Returning to FIG. 12, at portion δ thereof, the value used to assign the butterfly weights is reassembled from two loop counters. The right segment (c1) is reordered, whereas the left segment (c3) requires a LUT. Each segment is reassembled in reverse order. In addition, the outer c3 loop is unrolled, which requires two groups of Ws (see FIG. 21):

$l = (c1 << (Ln-2-Ln\_n1\_cnt)) + LUT(c3 << Ln\_n1\_cnt)$ $W_{01} = e^{i l 2PI/N}\ W_{02} = e^{i l 4PI/N}\ W_{03} = e^{i l 6PI/N}$; sqrt(-1), PI=3.141526 . . .

$l = (c1 << (Ln-2-Ln\_n1\_cnt)) + LUT((c3+1) << Ln\_n1\_cnt)$ $W_{11} = e^{i l 2PI/N}\ W_{12} = e^{i l 4PI/N}\ W_{13} = e^{i l 6PI/N}$ Returning to FIG. 12, at portion η thereof, two butterflies are computed with the swap/no swap logic of FIG. 20 for the path ($b_0 = r_r$). Loop3 is unrolled (see FIG. 12 at portion β thereof) but not loop0 (see FIG. 12 at portion α thereof). The logic of FIG. 20 is identical to FIG. 15, except that each butterfly in FIG. 20 has a unique group of weights. The reordering for $b_0$ equals $r_r$ is identical to FIG. 15.

For p0=0, the last pass for the fusion of the two-bit reordering technique of Section 2 with the Radix-4 in-place DIT FFT of Section 3 is the b0eqrr_bfly path. This represents a synchronization of the reordering and the computation (i.e., the two processes complete on the same pass). For p0>0, a "hybrid" reordering technique is presented in Section 5.

There is, however, an alternate design based on maintaining alignment between the b-field and the reorder indices. In this case, the reordering pattern of Section 2 begins in the center of the vector index and spreads to either end from pass to pass. The interaction with this reordering pattern and the b-field of the butterfly loop index is processed by the conditional bank of FIG. 11. As will be appreciated in light of this disclosure, this reordering pattern may not be unique, as any sequence of reorder pairs may work. Choosing a pattern which maintains the alignment between the reorder indices and the b-field, from pass to pass, as represented by the butterfly binary loop index, eliminates the need for the conditional bank of FIG. 11 and reduces the order of the loop structure represented in FIG. 12.

The new reordering sequence will process the odd-indexed reorder pairs $(r_l\ r_r)_{odd} = (i_{Ln-2}\ i_1), (i_{Ln-4}\ i_3), (i_{Ln-6}\ i_5), \ldots$ during the first half of the multi-pass computation and the even indexed reorder pairs $(r_l\ r_r)_{even} = \ldots, (i_{Ln-5}\ i_4), (i_{Ln-3}\ i_2), (i_{Ln-1}\ i_0)$ on the second half. The switch from the odd-indexed reordering sequence to the even-indexed reordering sequence is scheduled for pass p=Ln/4.

This reordering sequence maintains the alignment between the b-field and the left-reorder index (rl) on the first half of the multi-pass computation and the b-field and the right-reorder index (rr) on the second half. The result eliminates the need for the conditional bank of FIG. 11 and reduces the order of the processing loop structure represented in FIG. 12. The transition between the (rl) alignment state processing the odd indices and the (rr) alignment state processing the even indices requires a special computational section for mod 4(Ln)=2 and 3.

Figure 22:
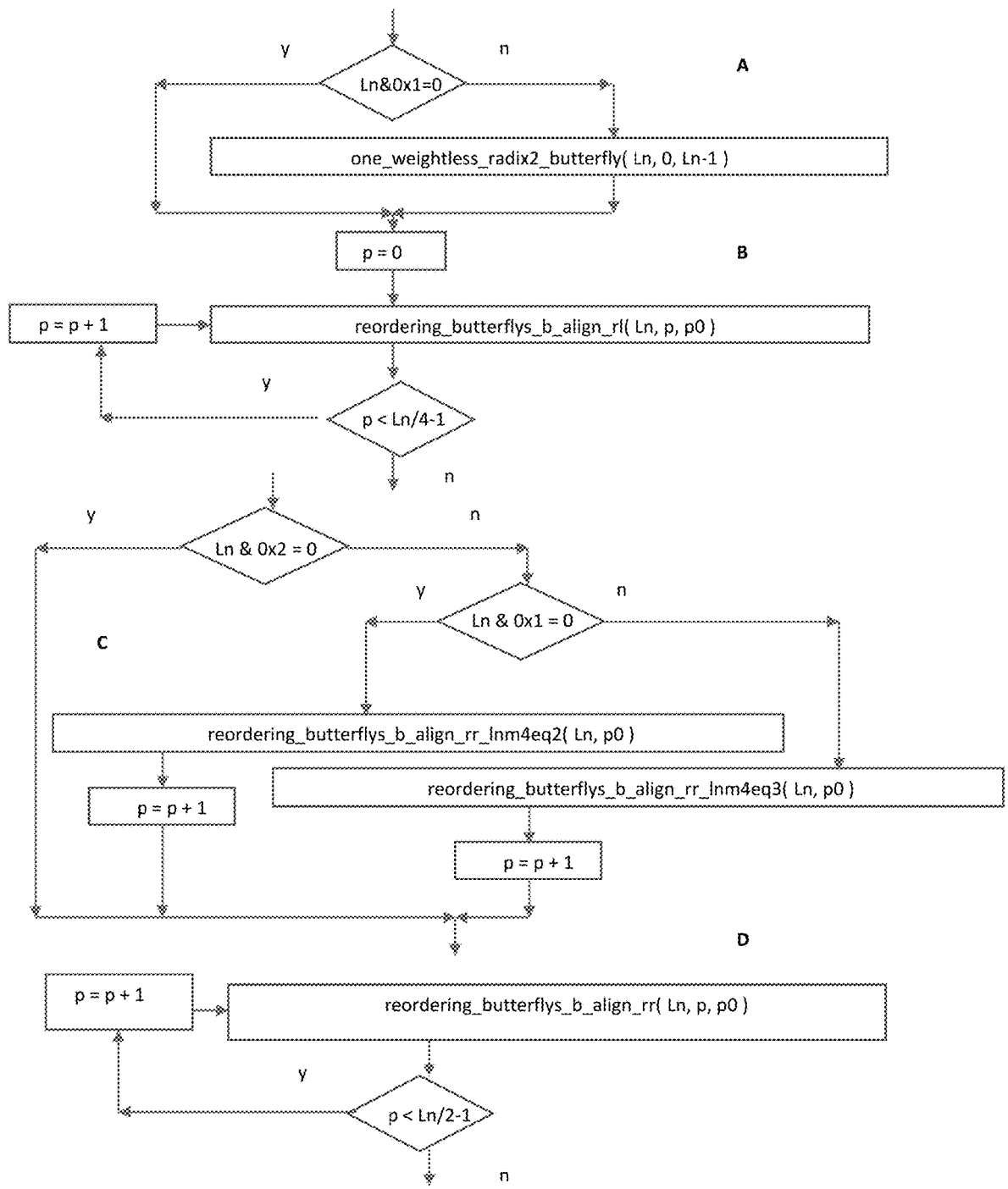
FIG. 22 is a flow diagram illustrating a loop structure for a multi-pass computation based on a reordering sequence, in accordance with an embodiment of the present disclosure.

The top-level loop structure for the multi-pass computation based on the new reordering sequence is displayed in FIG. 22. The first pass is computed with a special weightless butterfly, which begins the reordering at indices (iLn−2 i1). Index iLn−2 is aligned with b0 for the Radix-4 path and b1 for the Radix-8 path. This even-odd power of two alignment state is maintained until p=Ln/4.

In FIG. 22, at portion A thereof, a weightless Radix-2 butterfly is executed for odd powers of 2 only, with no reordering. In FIG. 22, at portion B thereof, reordering_butterflys_b_align_rl(Ln, p, p0), for pass p=1, Ln/4-1, the reconfigured butterfly binary loop index.

For Ln & 0x1=0:
$r_l r_r$
| |
$k_0 j_1 k_{2p-2} j_{2p-1} b_1 b_0 j_{Ln-2p-3} \ldots j_{2p+2} j_{2p+1} j_{2p} k_{2p-1} j_{2p-2} \ldots k_1 j_0$
loop0: $j_{2p+1} j_{2p} k_{2p-1} \ldots k_1 j_0$; right-most sub-index
loop1: $j_{Ln-2p-3} \ldots j_{2p+2}$; middle sub-index bit field
loop2: $k_0 j_1 \ldots k_{2p-2} j_{2p-1}$; left-most j sub-index For Ln & 0x1=1:
$r_l r_r$
| |
$k_0 j_1 k_{2p-2} j_{2p-1} k_{2p} b_1 b_0 j_{Ln-2p-4} \ldots j_{2p+2} j_{2p+1} j_{2p} k_{2p-1} j_{2p-2} \ldots k_1 j_0$
loop0: $j_{2p+1} j_{2p} k_{2p-1} \ldots k_1 j_0$; right-most sub-index
loop1: $j_{Ln-2p-3} \ldots j_{2p+2}$; middle sub-index bit field
loop2: $k_0 j_1 \ldots k_{2p-2} j_{2p-1} k_{2p}$; left-most j sub-index These loop indices define a three-level loop with a conditional path for the polarity of Ln (see FIG. 23). The loop parameter assignment for pass p is:

$$ln\_n2\_cnt=(2*p)+(Ln\ \&\ 0x1)$$

$$ln\_c2\_inc=(Ln-(Ln\ \&\ 0x1))-(2*p);$$

$$ln\_n1\_cnt=(Ln-4-(Ln\ \&\ 0x1))-(4*p);$$

$$ln\_c1\_inc=2+(2*p);$$

$$ln\_n0\_cnt=2+(2*p);$$

$$ln\_b0=Ln-2-(Ln\ \&\ 0x1)-(2*p);$$

$$ln\_b1=Ln-1-(Ln\ \&\ 0x1)-(2*p);$$

Returning to FIG. 23, at portion α thereof, the b-field alignment with the odd reorder indices is maintained, resulting in separate computational paths for even and odd powers of two. At portion β of FIG. 23, the inner loop is unrolled high and low. At portion χ of FIG. 23, the assignment of the weights index uses both the inner and outer loop indices. The two counters are first masked for even or odd index values and then added, with the sum multiplied by a power of two. The unrolled inner loop requires only one weight group per two butterflies.

Figures 24, 25:
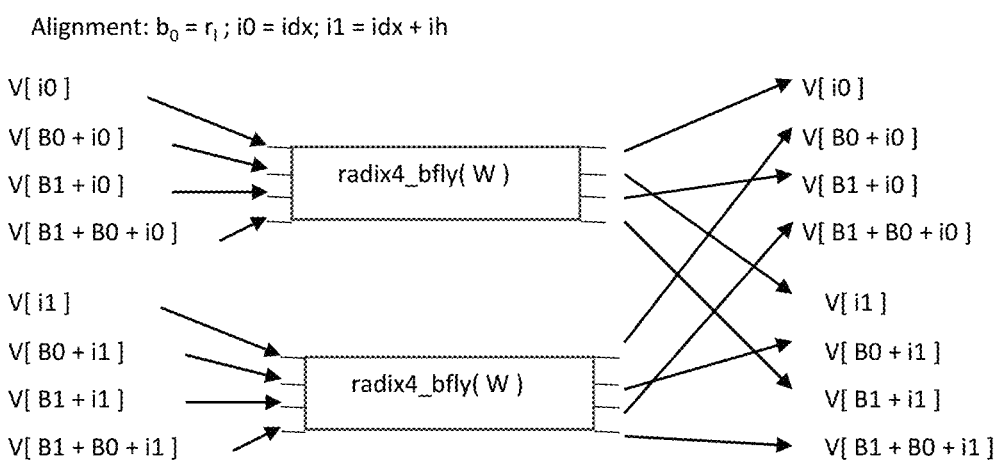
FIG. 24 is a block diagram illustrating a function sequence, in accordance with an embodiment of the present disclosure.
FIG. 25 is a butterfly diagram illustrating two Radix-4 butterflies, in accordance with an embodiment of the present disclosure.
Figures 26, 27:
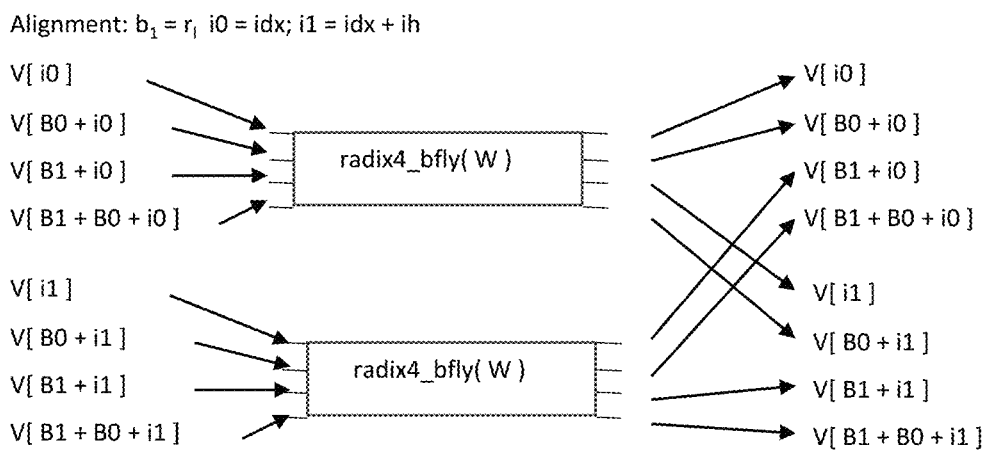
FIG. 26 is a block diagram illustrating a function sequence, in accordance with an embodiment of the present disclosure.
FIG. 27 is a butterfly diagram illustrating two Radix-4 butterflies, in accordance with an embodiment of the present disclosure.

For the loop counter mask, ln_n2_cnt=ln_n0_cnt:
Ln_n2_cnt/2
odd indexed bit field=$\sum_{i=0} 2^{2i}$ and
Ln_n2_cnt/2
even indexed bit field=$\sum_{i=0} 2^{2i+1}$ See FIG. 24 for the function sequence. See FIG. 25 for the butterflies. The function sequence for two_reordering_radix4_butterflys_b0eqrl is in FIG. 26. See FIG. 27 for the butterflys corresponding thereto.

Returning to FIG. 22, at portion C thereof, the transition section between reordering odd and even index pairs, for pass p=Ln/4, a separate computational path is executed for Ln & 0x3=2 or 3, each requiring a distinct loop structure. Reordering_butterflys_b_align_rr_lnm4eq2, the reconfigured butterfly binary loop index and associated loop structure for Pass p=Ln/4, (Ln & 0x3)=2 is:

$r_l r_r$
| |
$k_0 j_1 \ldots k_{Ln/2-2} j_{Ln/2-1} b_1 b_0 k_{Ln/2-1} j_{Ln/2-2} k_1 j_0$
loop0: $k_{Ln/2-1} j_{Ln/2-2} \ldots k_1 j_0$; right sub-index
loop1: $k_0 j_1 \ldots k_{Ln/2-2} j_{Ln/2-1}$; left sub-index See FIG. 28. For one_radix4_butterfly_lnm4eq2, see FIG. 29 for the function sequence and FIG. 30 for the butterflies.

Figure 28:
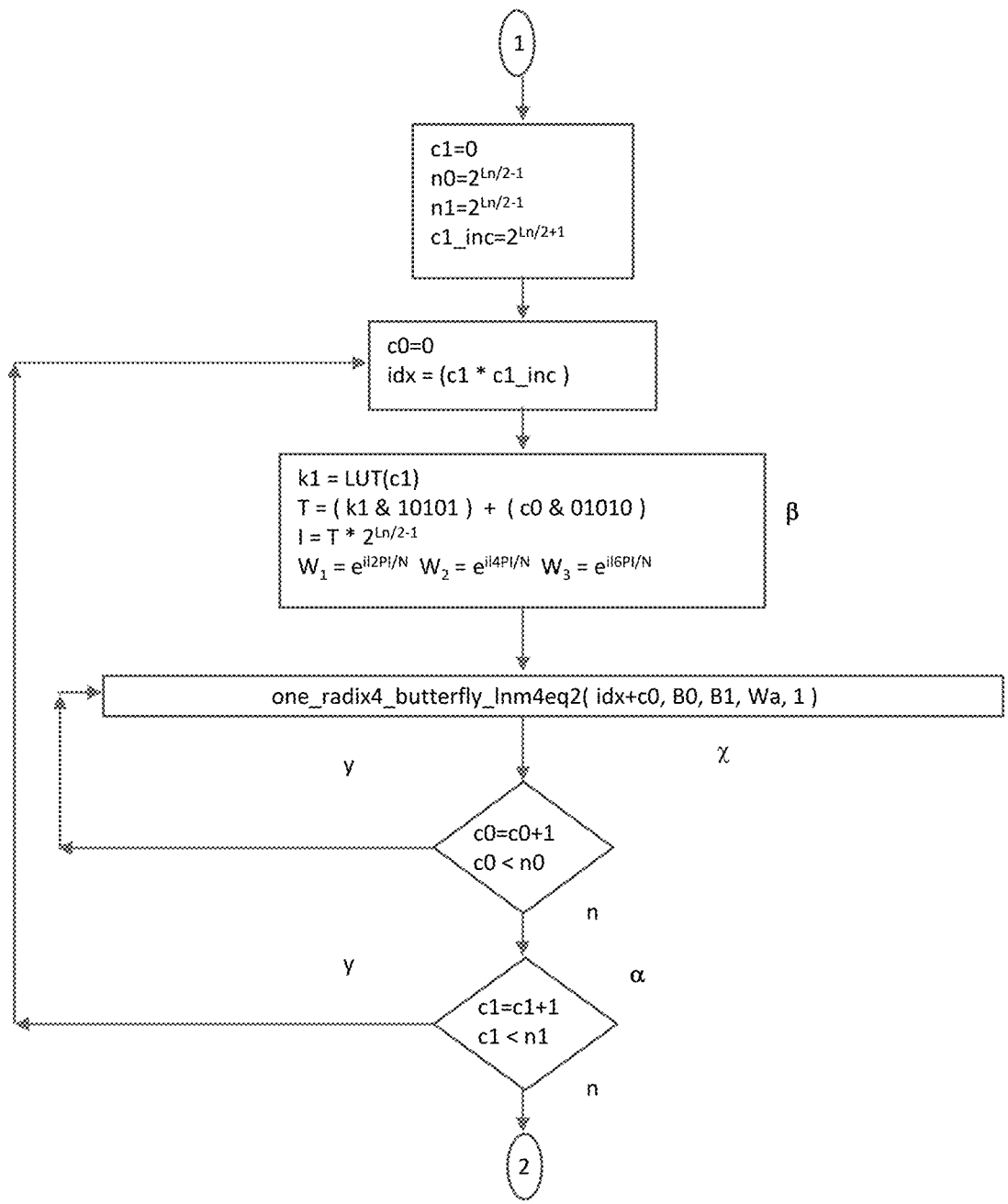
FIG. 28 is a flow diagram illustrating function, in accordance with an embodiment of the present disclosure.
Figures 29, 30:
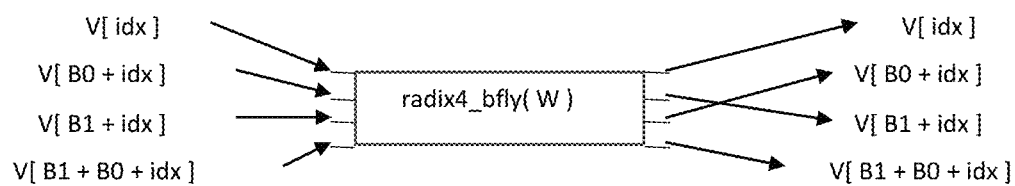
FIG. 29 is a block diagram illustrating a function sequence, in accordance with an embodiment of the present disclosure.
FIG. 30 is a butterfly diagram illustrating a Radix-4 butterfly, in accordance with an embodiment of the present disclosure.

In FIG. 28, at portion α thereof, no loop unrolling is required, as the b-field and reordering indices are aligned. In FIG. 28, at portion β thereof, the weights index is assigned using both inner and outer loop indices. In FIG. 28, at portion χ thereof, the butterfly offsets are: $B0=2^{Ln/2-1}$; $B1=2^{Ln/2}$.

The reconfigured butterfly binary loop index and associated loop structure for Pass p=Ln/4, (Ln & 0x3)=3. Two_reordering_Radix-4_butterflys_b0eqrr, for pass p=Ln/4, (Ln & 0x3)=3:

$r_l r_r$
| |
$k_0 j_1 \ldots k_{Ln/2-3} j_{Ln/2-2} k_{Ln/2-1} b_1 b_0 k_{Ln/2-2} j_{Ln/2-3} \ldots k_1 j_0$
loop0: $k_{Ln/2-1} j_{Ln/2-2} k_1 j_0$; right most sub-index
loop1: $k_0 j_1 \ldots k_{Ln/2-3} j_{Ln/2-2} k_{Ln/2-1}$; left most sub-index See FIG. 31. See FIG. 32 for the function sequence and FIG. 33 for the butterflies. The loop parameter assignments are:

$$ln\_n1\_cnt=Ln/2;$$

$$ln\_c1\_inc=Ln/2+1;$$

$$ln\_n0\_cnt=Ln/2-1;$$

$$ln\_b0=Ln/2-1;$$

$$ln\_b1=Ln/2.$$

Figure 31:
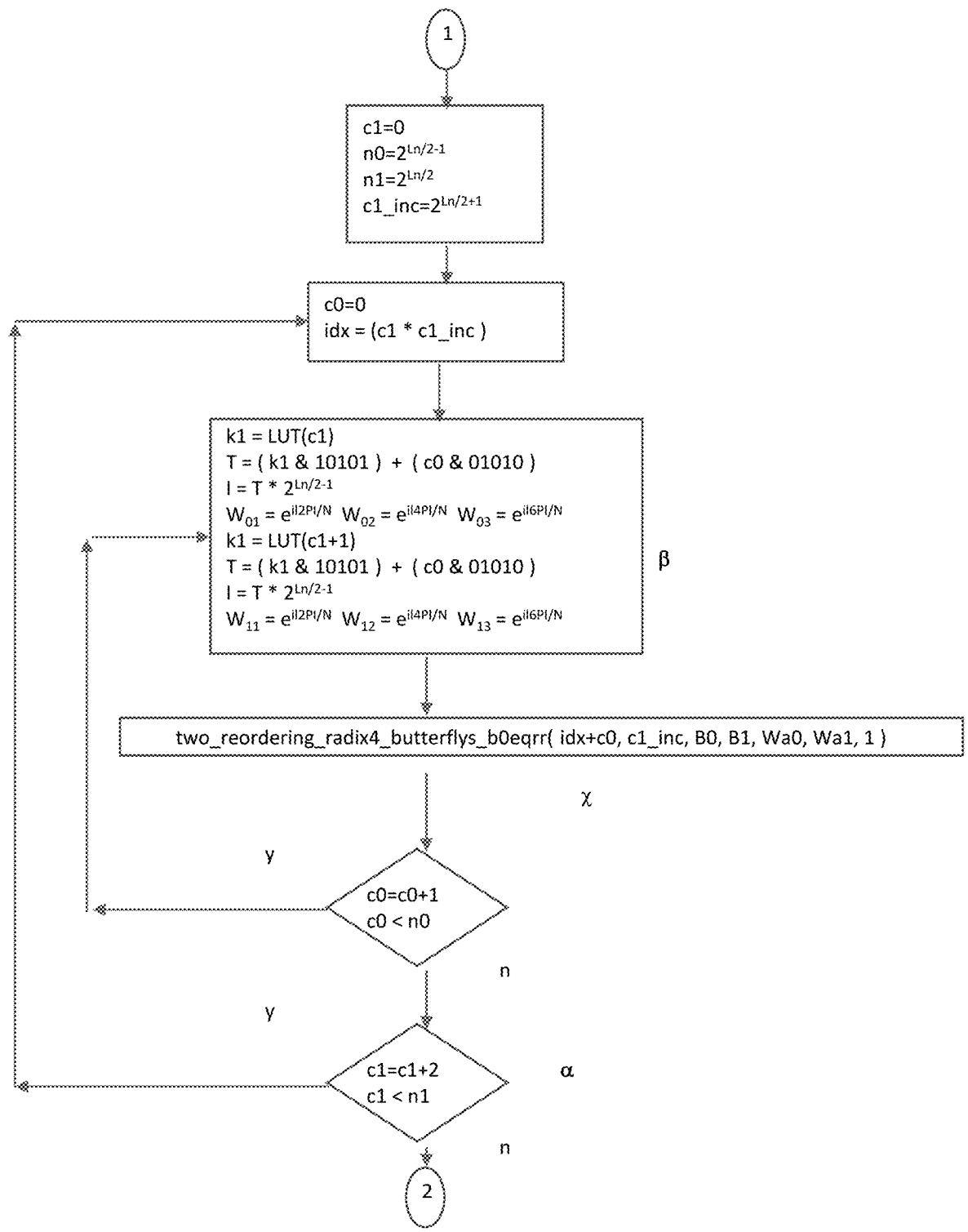
FIG. 31 is a flow diagram illustrating a function, in accordance with an embodiment of the present disclosure.
Figures 32, 33:
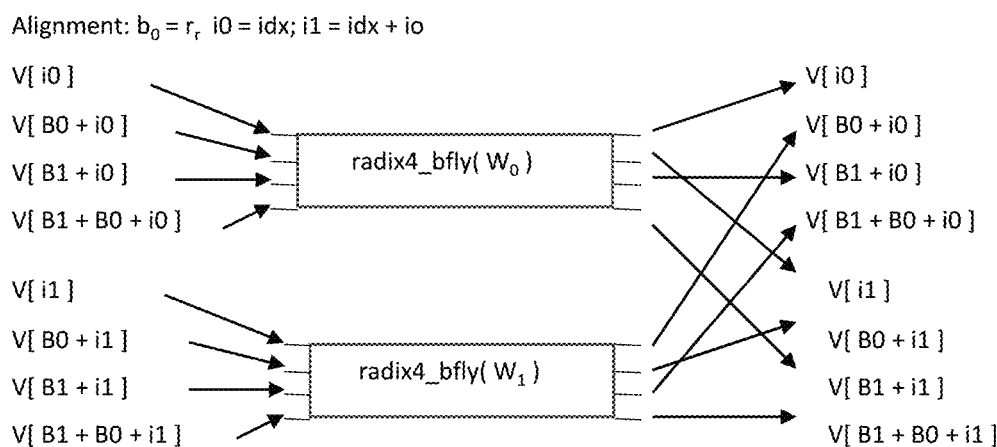
FIG. 32 is a block diagram illustrating a function sequence, in accordance with an embodiment of the present disclosure.
FIG. 33 is a butterfly diagram illustrating two Radix-4 butterflies, in accordance with an embodiment of the present disclosure.

In FIG. 31, at portion α thereof, the outer loop is unrolled. In FIG. 31, at portion β thereof, the inner and outer loop indices are used to assign the weights index. Two distinct weights groups are utilized. In FIG. 31, at portion χ thereof, the butterfly offsets are: b0=2Ln/2−1; b1=2Ln/2. The final stage of the multi-pass computation fused with the unscrambling of the even reorder index pairs is shown in FIG. 22, at portion D thereof, reordering butterflys b align rr(Ln, p, p0).

Figure 34:
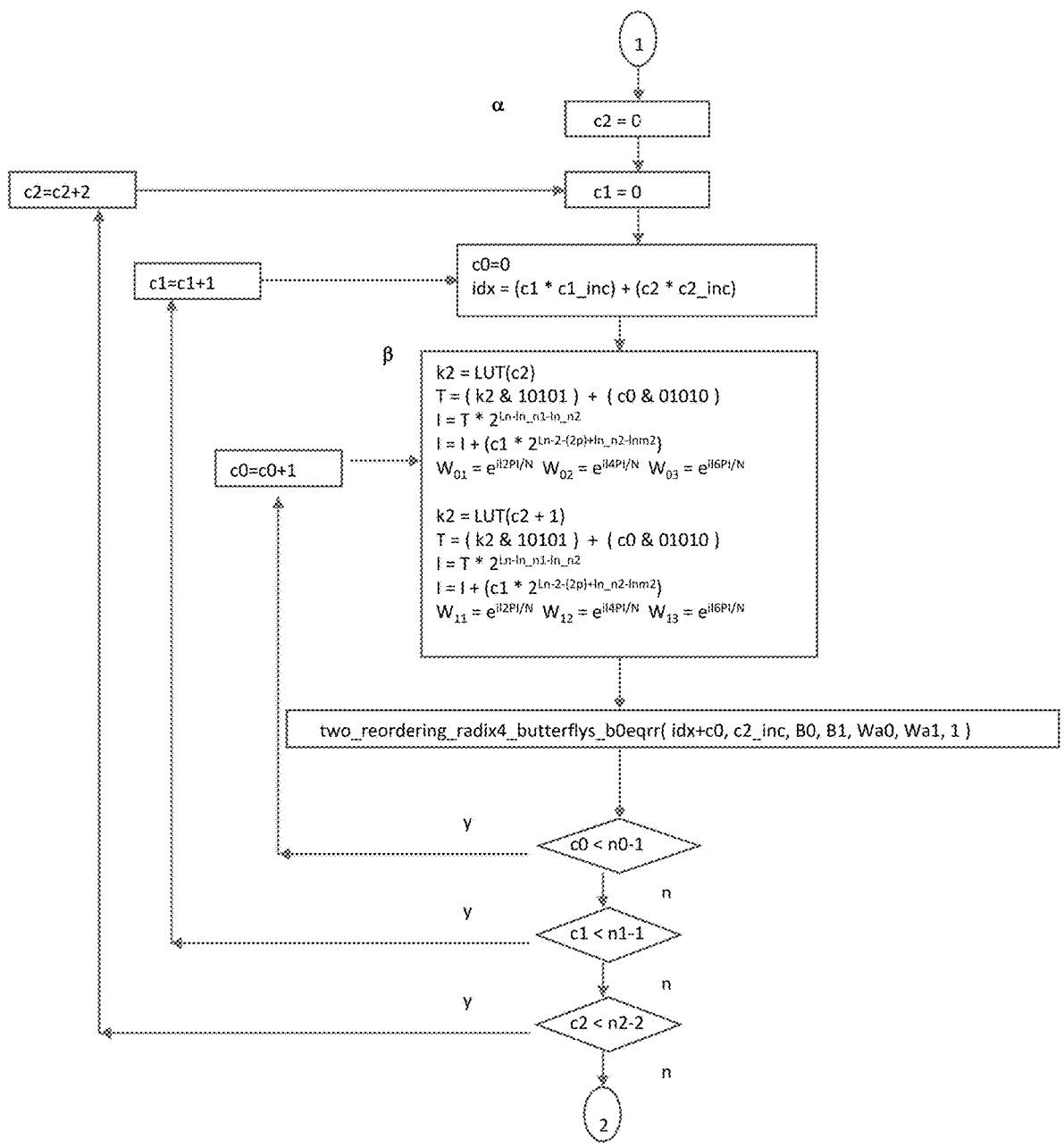
FIG. 34 is a flow diagram illustrating a three-level loop structure, in accordance with an embodiment of the present disclosure.
Figures 35, 36:
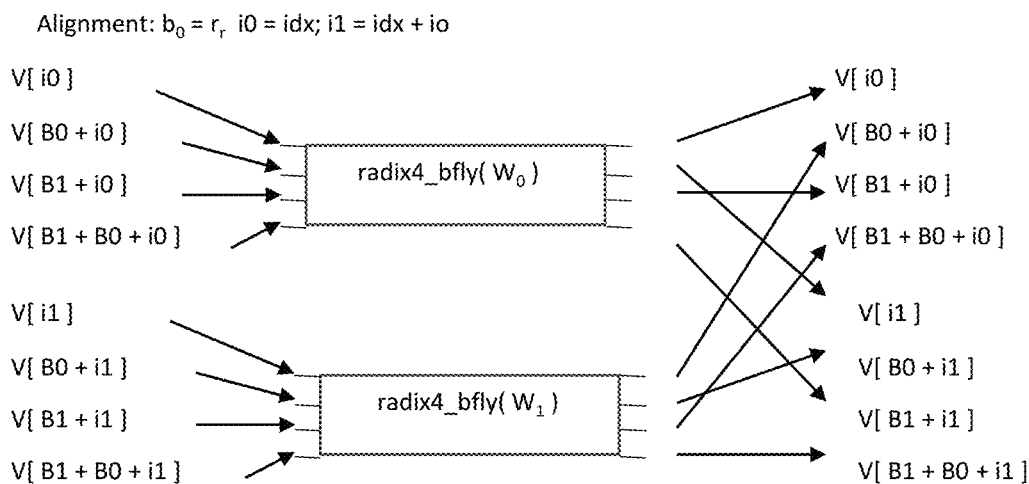
FIG. 35 is a block diagram illustrating a function sequence, in accordance with an embodiment of the present disclosure.
FIG. 36 is a butterfly diagram illustrating two Radix-4 butterflies, in accordance with an embodiment of the present disclosure.

For pass p=Ln/4, Ln/2−1, (Ln & 0x3)=0:
$r_l r_r$
| |
$k_0 j_1 \ldots k_{2p-4} j_{2p-3} k_{2p-2} b_1 k_{2p-1} b_0 k_{2p-3} j_{2p-4} \ldots k_1 j_0$
loop0: $k_{2p-3} j_{2p-4} \ldots k_1 j_0$; right most sub-index
loop1: $k_{2p-1}$; middle sub-index
loop2: $k_0 j_1 \ldots k_{2p-4} j_{2p-3} k_{2p-2}$; left most sub-index For pass p=Ln/4, Ln/2−1, (Ln & 0x3)=1:
$r_l r_r$
| |
$k_0 j_1 k_{2p-4} j_{2p-3} k_{2p-2} b_1 k_{2p} k_{2p-1} b_0 k_{2p-3} j_{2p-4} \ldots k_1 j_0$
loop0: $k_{2p-3} j_{2p-4} \ldots k_1 j_0$; right-most sub-index
loop1: $k_{2p} k_{2p-1}$; middle sub-index
loop2: $k_0 j_1 k_{2p-4} j_{2p-3} k_{2p-2}$; left-most sub-index For pass p=Ln/4+1, Ln/2−1, (Ln & 0x3)=2:
$r_l r_r$
| |
$k_0 j_1 \ldots k_{2p-6} j_{2p-5} k_{2p-4} b_1 k_{2p-1} k_{2p-2} k_{2p-3} b_0 k_{2p-5} j_{2p-6} \ldots k_1 j_0$
loop0: $k_{2p-5} j_{2p-6} \ldots k_1 j_0$; right-most sub-index
loop1: $k_{2p-1} k_{2p-2} k_{2p-3}$; middle sub-index
loop2: $k_0 j_1 \ldots k_{2p-6} j_{2p-5} k_{2p-4}$; left-most sub-index For pass p=Ln/4+1, Ln/2−1, (Ln & 0x3)=3:

$r_l\ r_r$
| |
$k_0\ j_1 \ldots k_{2p-6}\ j_{2p-5}\ k_{2p-4}\ b_1\ k_{2p}\ k_{2p-1}\ k_{2p-2}\ k_{2p-3}\ b_0\ k_{2p-5}\ j_{2p-6} \ldots k_1\ j_0$ loop0: $k_{2p-5}\ j_{2p-6} \ldots k_1\ j_0$; right-most sub-index
loop1: $k_{2p}\ k_{2p-1}\ k_{2p-2}\ k_{2p-3}$; middle sub-index
loop2: $k_0\ j_1 \ldots k_{2p-6}\ j_{2p-5}\ k_{2p-4}$; left-most sub-index These binary indices define a three-level loop (see FIG. 34). The loop parameters assignments are:

$Dp=2*(p-lno4);$ if $((lnm4=2)\|(lnm4=3))$ $Dp=Dp-1;$ end $ln\_n2\_cnt=lno2-1-Dp;$ $ln\_c2\_inc=(lno2+1)+lnm2+Dp;$ $ln\_n1\_cnt=1+lnm2+(2*Dp);$ $ln\_c1\_inc=lno2-1-Dp;$ $ln\_n0\_cnt=lno2-2-Dp;$ $ln\_b0=lno2-2-Dp;$ $ln\_b1=lno2+lnm2+Dp;$ In FIG. 34, at portion α thereof, the outer loop is unrolled with even-odd indices. At portion β of FIG. 34, all three loop indices are used for the weights index. Two distinct weights groups are utilized. For Two_reordering_radix4_butterflys_b0eqrr, see FIG. 35 for the function sequence and FIG. 36 for the butterflies.

This presents an alternative fused design to the first part of Section 4. The odd-even reordering pattern fused to the FFT multi-pass butterfly computation reduces the number of algorithmic components needed for the computation:

1. The conditional bank of FIG. 11 is eliminated and replaced by the transition structure of FIG. 22, portion C.
2. The loop structures are reduced from four to two and three levels.
3. All butterfly structures are reduced to the minimum order of two for two-point reordering. Finally, the values of p0, np0 indicate the pass when reordering begins, and the number of passes to execute. These two parameters have the default values of 0, Ln/2.

An alternative fused design will be presented in Section 5 below, characterized by a hybrid of two and four-point reordering. For this design, the values of p0, np0 will be assigned values that differ from the default. This will enable the two-bit reordering FFT to process less than Ln/2 vector passes, allowing four-bit reordering butterflies to process the rest.

Section 5: Hybrid Reordering Radix-4 In-Place DIT FFT (Base-2)

In this and Section 6 below, "hybrid" designs are presented. Both these reordering FFTs have parameters which can be assigned to control the higher-level multi-pass execution. This control may be used to adjust the design to fit a particular compute platform.

Assume a cost ($C_{R4}$) associated with the computation of a Radix-4 butterfly is measured in units of local compute resources ($R_L$). Also assume this cost ($C_{R4}$) is directly proportional to the butterfly span ($b_1, b_0$), and large butterfly spans require more $R_L$ than smaller ones. Let $R_p$ represent the amount of resources available for the butterfly computation for a particular compute platform such that, if $C_{R4}>R_p$, a large drop in the computational rate may occur.

Two "coupled" butterfly computations are utilized for the two-bit reordering techniques of Section 4 (discussed above). A four-bit reordering operator (described below) utilizes four coupled butterfly computations. The cost required by the two-bit reordering FFT ($C_{2b}$) equals twice the cost in local compute resources than the standard FFT ($C_S$) and half the cost in local compute resources than the four-bit reordering FFT ($C_{4b}$) for a particular value of ($b_1, b_0$). That is: $C_S=C_{2b}/2$; and $C_{2b}=C_{4b}/2$. As the butterfly span decreases with each pass, so does $C_{R4}$. As will be appreciated in light of this disclosure, control of when and what type of reordering is executed on any pass may impact the hybrid FFT designs here and in Section 6.

The idea behind the first hybrid design (tagged with the key "hybrid5") is:

1. If pass $p<P_{2b}$, execute the standard FFT butterflies for large $C_{R4}$, with no reordering.
2. If $p>=P_{2b}$, execute the two-bit reordering FFT butterflies as $C_{R4}$ decreases below $C_{2b}$.
3. If $p>=P_{4b}$, execute the four-bit reordering FFT butterflies for small $C_{R4}$.

On which pass each kind of reordering FFT begins and ends execution is controlled via a small number of parameter values. As the butterfly computational cost varies from platform to platform, assigning these parameters will configure the hybrid FFT for any one platform conforming to the available compute resources. Before detailing this design, one of its components, the four-bit reordering butterfly, is described here.

Four-bit reordering butterfly. Radix-4 computation with four-bit reordering begins with the ($b_1\ b_0$) field aligned with the right reorder indices ($r_{rl}, r_{rr}$) at (Ln/2−1, Ln/2−2). The reconfigured butterfly binary loop index: L=Ln&0x1:

Two pairs of reorder indices $r_{ll}\ r_{lr}\ r_{rl}\ r_{rr}$
$k_0 \ldots k_{Ln/2-2p-1+L}\ k_{Ln/2-2p+L}\ k_{Ln/2+2p-1+L} \ldots k_{Ln/2-2p+1+L}$
$b_1\ b_0\ j_{Ln/2-2p-3}\ i_{Ln/2-2p-4} \ldots j_0$ reordered field With each subsequent pass, the alignment between the right reorder indices and the ($b_1\ b_0$) field is maintained, since both "travel" to the right by two index values. This means that the butterfly configuration for any size or pass is constant (e.g., no conditional bank is utilized). The above binary loop index specifies a three-level loop executed each pass.

Figure 37:
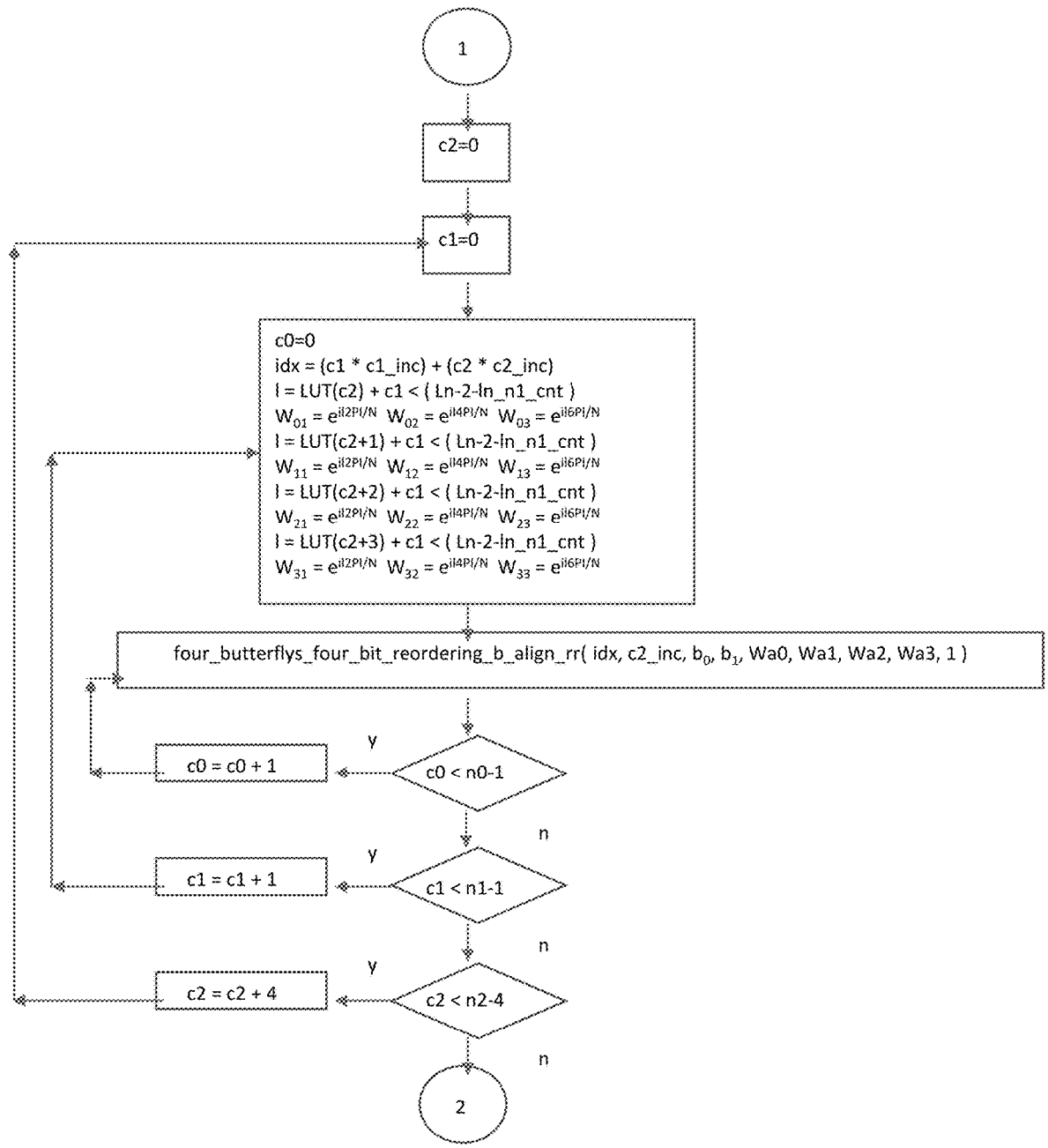
FIG. 37 is a flow diagram illustrating a DIT Radix-4 four-bit reordering operator, in accordance with an embodiment of the present disclosure.

FIGS. 37, 38, and 39 represent a decimation-in-time (DIT) Radix-4 four-bit reordering operator. This operator and its decimation-in-frequency (DIF) variant utilize four simultaneous butterfly computations. In terms of the cost function above, executing this operator for large spans may be expensive for some compute platforms. This design, depicted in FIG. 40, partitions the multi-pass computation into three regions based on large, medium, and small butterfly spans. Each region is characterized by the number of simultaneous butterfly computations required.

Parameter assignment equations. Configuring the loop structure represented in FIG. 37: Four Radix-4 butterflies, four-bit reordering $Dp=2*(p-Ln/4)$ If $Ln$ mod 4=2 or 3

$Dp=Dp-1$ $Ln\_n2\_cnt=Ln/2-Dp$ $Ln\_c2\_inc=Ln/2+Dp+(Ln\&0x1);$ $Ln\_n1\_cnt=Dp+(Ln \& 0x1);$ $Ln\_c1\_inc=Ln/2-Dp;$ $Ln\_n0\_cnt=Ln/2-Dp-2;$ $Ln\_B0=Ln/2-Dp-2;$ $Ln\_B1=Ln/2-Dp-1;$ four_butterflys_four_bit_reordering_b_align_rr(idx, c2_inc, $b_0$, $b_1$, Wa0, Wa1, Wa2, Wa3, 1)

Figure 23:
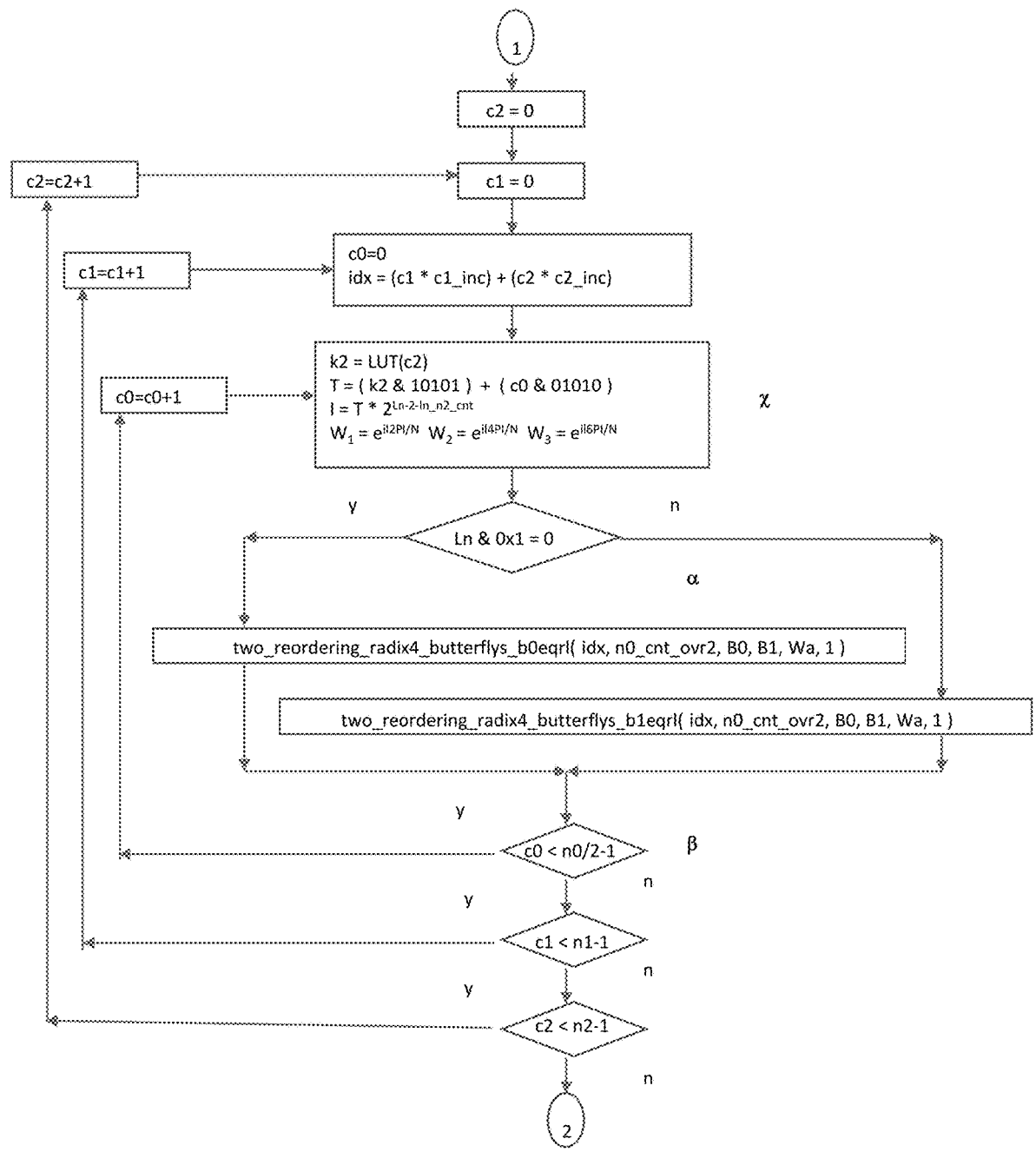
FIG. 23 is a flow diagram illustrating a three-level loop with a conditional path for the polarity of Ln, in accordance with an embodiment of the present disclosure.
Figure 40:
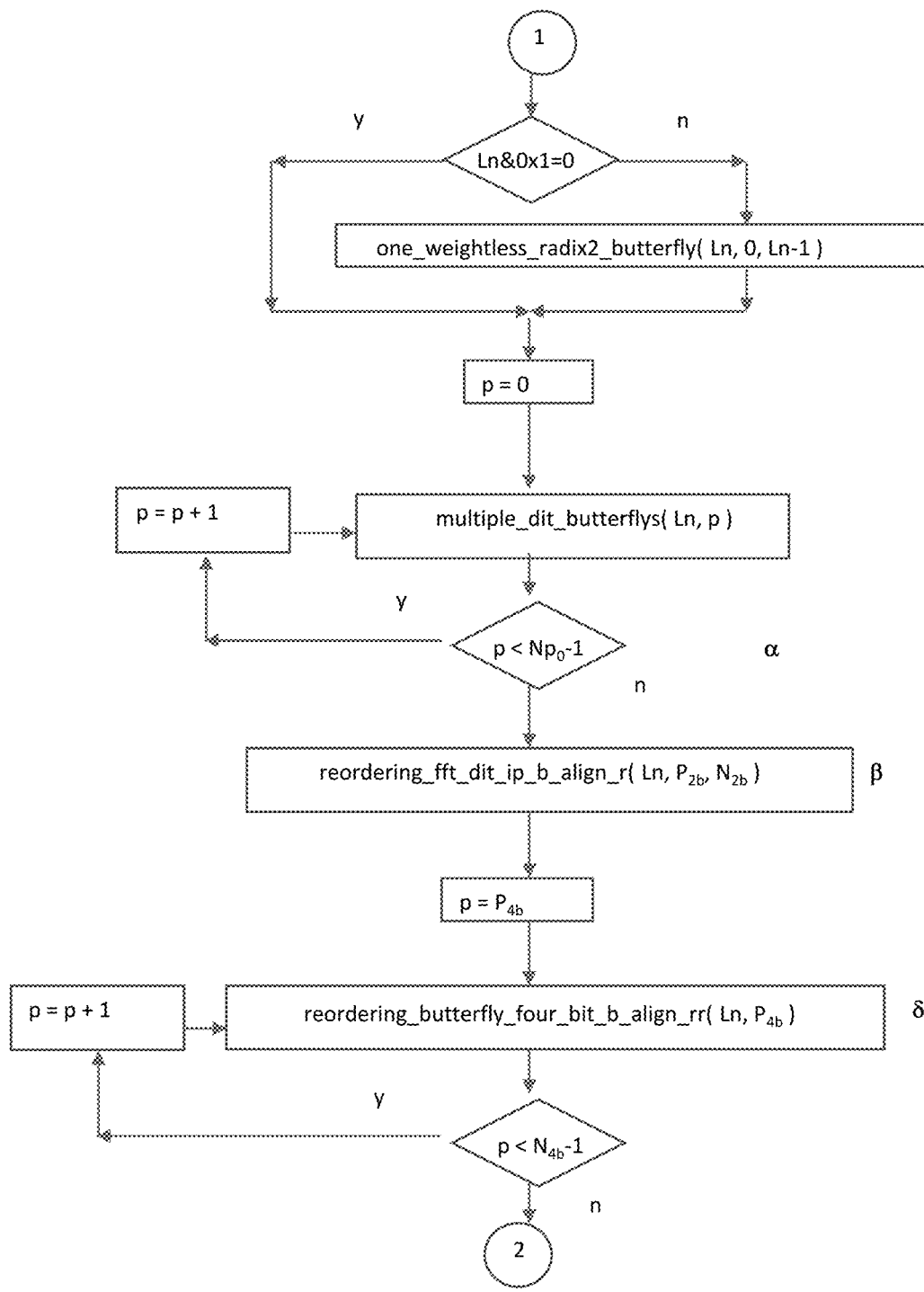
FIG. 40 is a flow diagram illustrating a function, in accordance with an embodiment of the present disclosure.

In FIG. 40, at portion α thereof, for large butterfly spans, the standard DIT Radix-4 function of Section 3 utilizing one simultaneous butterfly computation with no reordering is employed. At portion β of FIG. 40, for medium butterfly spans, the Radix-4 two-bit reordering operator of Section 4, which utilizes two simultaneous butterfly computations, is employed. Note that this code path uses the parameter p0 referenced at the end of Section 4, controlling when the first pass reordering begins. No multi-pass loop is utilized. The weights assignment is changed to be a function of the first two-bit reordering pass: $P_{2b}$. The loop counter mask used in FIG. 23 is modified for the hybrid5 design:

ln_n2_cnt=ln_n0_cnt
   Ln_n2_cnt/2
   odd indexed bit field=$\Sigma\ 2^{2i}+2^a-1$; $a=2P_{2b}$
   $i=P_{2b}$
and
   ln_n2_cnt/2
   even indexed bit field=$\Sigma\ 2^{2i+1}+0$
   $i=P_{2b}$ At portion δ of FIG. 40, for small butterfly spans, the Radix-4 reordering operator of FIGS. 38 and 39, which utilizes four simultaneous butterfly computations, with four-bit reordering is employed.

As the butterfly span decreases each pass, the computational cost decreases, and more simultaneous butterfly computations are possible given the capacity of $R_{LC}$. Based on the capacity of a given target compute platform, the number of passes executing four-bit reordering ($N_{4b}$) is chosen. Then:

$P_{4b}=Ln/2-N_{4b}$ First pass for four-bit reordering
$N_{2b}=Ln/2-(2*N_{4b})$ Number of two-bit reordering passes
$N_{0b}=(Ln/2-N_{2b}-N_{4b})$ Number of passes with no reordering
$P_{2b}=P_{4b}-N_{2b}$ First pass for two-bit reordering Assigning a value for $N_{4b}$ sets $N_{2b}$, $P_{4b}$, and $P_{2b}$. As larger values for $N_{4b}$ are selected, more of the reordering is performed (see FIG. 40 at portion δ thereof) by the Radix-4 four-bit operator.

There are two endpoints in this hybrid design:

$P_{2b}=0$, $P_{4b}=Ln/2$ Two-bit reordering executed on all Ln/2 passes.

$P_{2b}=Ln/4$, $P_{4b}=Ln/4$ Four-bit reordering executed on last half of the multi-pass execution.

Section 6: Tile-Based Reordering FFT (Base-2)

As in Section 5 above, this hybrid design controls the number of passes executed by the four-bit Radix-4 reordering operator of FIGS. 38 and 39. Rather than the two-bit reordering operator of FIG. 13, a table-driven butterfly executed on the last pass will complete the unscrambling process. This design is tagged with the key "hybrid7."

The first pass is a Radix-2 butterfly for even powers of 2. This logic makes it possible to execute the last pass based on a Radix-2 butterfly. We use Radix-2 butterflies anticipating future conversion to a base-3 algorithm. This will be discussed in the Appendix below.

Figure 41:
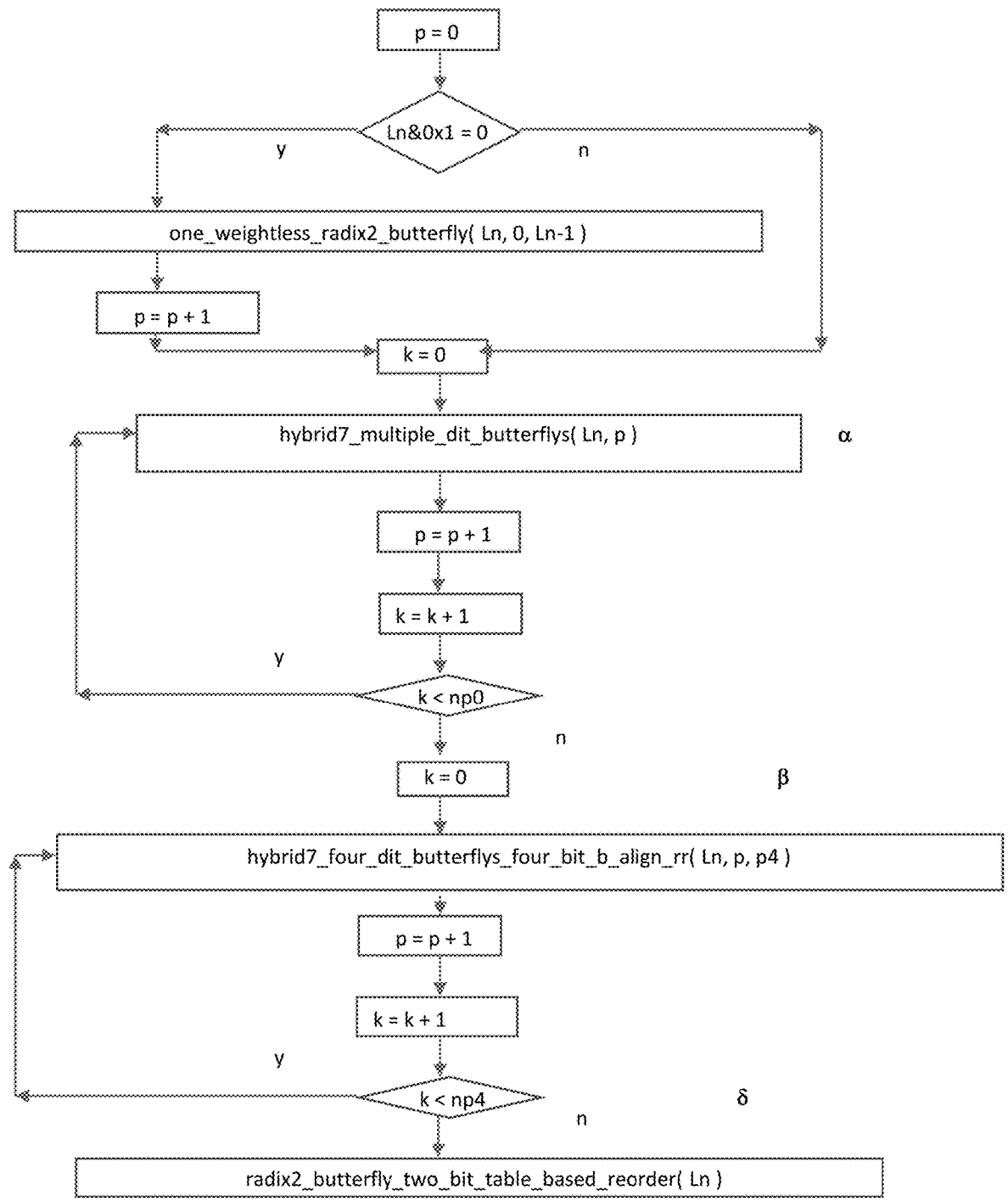
FIG. 41 is a flow diagram illustrating a tile-based reordering FFT algorithm, in accordance with an embodiment of the present disclosure.
Figure 42:
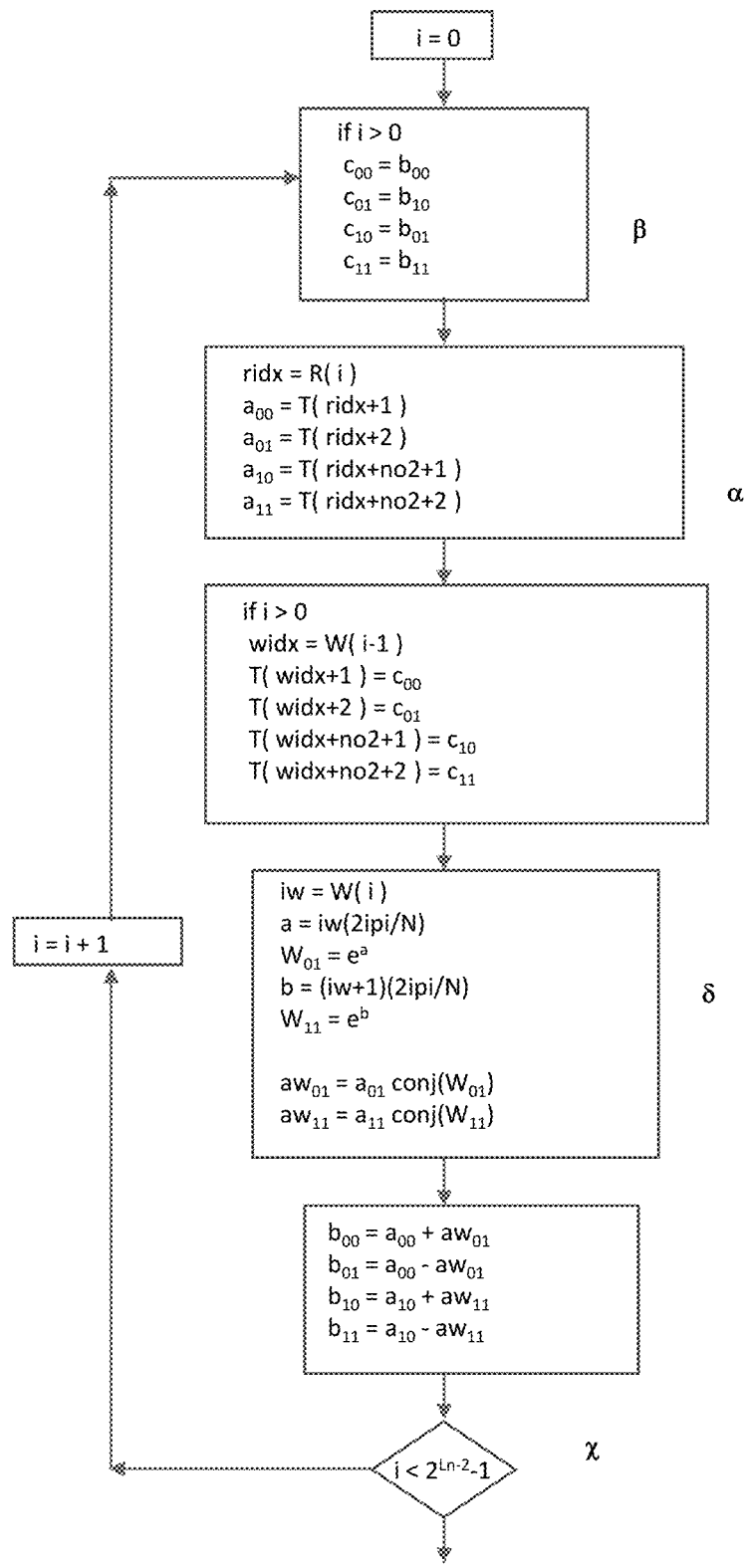
FIG. 42 is a flow diagram illustrating the structure of the last pass of a two-bit Radix-2 table-based reordering operator, in accordance with an embodiment of the present disclosure.

In FIG. 41, at portion α thereof, for large butterfly spans, a variant of the standard DIT Radix-4 function of Section 3, one simultaneous butterfly computation with no reordering is employed. In FIG. 41, at portion β thereof, for small butterfly spans, the Radix-4 reordering operator of FIGS. 38 and 39, which utilizes four simultaneous butterfly computations, with four-bit reordering is employed. In FIG. 41, at portion δ thereof, residual reordering performed by the tile-based table-driven last pass function of FIG. 42 is performed. The Radix-2 butterfly operates on 2×2 tile elements, rather than 4×4 elements, for example. A Radix-4 algorithm also can be used in this hybrid algorithm, as will be discussed later in this section.

The reordering FFT algorithm represented in FIG. 41 utilizes a "tile" represented by the value of Lt. This tile has dimensions $2^{Lt} \times 2^{Lt}$ with an offset of $2^{Ln-Lt}$ elements between rows. The value of Lt is related to the number of passes executing four-bit reordering. Thus, $N_{4b}$ is chosen and:

$P_{4b}=Ln/2-N_{4b}$ First pass for four-bit reordering $Lt=1+(2*np4)$ Tile size for last pass Radix-2 reordering Selecting a value for $N_{4b}$ automatically sets Lt and $P_{4b}$. As Lt is increased, more of the reordering is performed (see FIG. 41 at a portion β thereof) by the four-bit reordering operator, similar to the hybrid5 design discussed above.

The four-bit reordering operators used in both the hybrid5 and hybrid7 designs have different loop control parameter and weights assignments. This is due to the state of the butterfly binary loop index utilized for the last pass. The standard butterfly binary loop index for the hybid7 Radix-2 last pass is:

$k_0\ k_1\ \ldots\ k_{Lt-1}\ k_{Lt}\ \ldots\ k_{Ln-Lt-1}\ k_{Ln-Lt}\ k_{Ln-3}\ k_{Ln-2}\ b_0$ The reconfigured butterfly binary loop index with tile based two-bit reordering, hybrdid7 Radix-2 last pass:

scrambled field
| |
$k_0\ k_{Ln-2}\ k_{Ln-3}\ \ldots\ k_{Ln-Lt}\ k_{Lt}\ \ldots\ k_{Ln-Lt-1}\ k_{Lt-1}\ \ldots\ k_2\ k_1\ b_0$
| | | |
reordered field reordered field Fields $k_0$ and $b_0$ are unrolled into two Radix-2 butterflies offset by N/2. The scrambled field is processed with table-based reordering.

The standard butterfly binary loop index for the hybid5 Radix-4 last pass is:

$k_0\ k_1\ \ldots\ k_{Ln-4}\ k_{Ln-3}\ b_1\ b_0$

The reconfigured butterfly binary loop index with tile based four-bit reordering, hybrid5 Radix-4 last pass:

$k_0\ k_1\ k_{Ln-2}\ k_{Ln-3}\ \ldots\ k_3\ k_2\ b_1\ b_0$
| |
reordered field

Fields ($k_0\ k_1$) and ($b_1\ b_0$) are unrolled into 4 Radix-4 butterflies offset by N/4.

The hybrid7 four-bit reordering butterfly parameter assignments relative to the hybrid5 design are:

Hybrid7 Hybrid5
ln_n2_cnt=ln_n2_cnt+1;
ln_c2_inc=ln_c2_inc−1;
ln_n1_cnt=ln_n1_cnt−2;
ln_c1_inc=ln_c1_inc+1;
ln_n0_cnt=ln_n0_cnt+1;

ln_b0=ln_b0+1;

ln_b1=ln_b1+1;

For the hybrid7 four-bit reordering butterfly weights index, the loop index c1 of FIG. 37 is partitioned into 3 sub-segments:

s1: Reordered segment of length 2 (p–$P_{4b}$), where p is the pass executing and $P_{4b}$ is the pass four-bit reordering begins;

s2: Scrambled segment of length ln_n1_cnt-4 (p–$P_{4b}$); and s3: Reordered segment of length 2 (p–$P_{4b}$).

Define two complementary bi fields:

$$bf0(i)=0, i=0, 2(p-P_{4b})-1$$

$$bf0(i)=1, i=2(p-P_{4b}), ln\_n1\_cnt-2(p-P_{4b})-1$$

$$bf0(i)=0, i=ln\_n1\_cnt-2(p-P_{4b}), ln\_n1\_cnt-1$$

$$bf1(i)=1, i=0, 2(p-P_{4b})-1$$

$$bf1(i)=0, i=2(p-P_{4b}), ln\_n1\_cnt-2(p-P_{4b})-1$$

$$bf1(i)=1, i=ln\_n1\_cnt-2(p-P_{4b}), ln\_n1\_cnt-1$$

The hybrid7 four-bit reordering butterfly weights index computation is:

$$s0=bf0 \text{ \& } c1$$

$$s1=bf1 \text{ \& } c1$$

$$I=LUT(c2)+((s1+LUT(s0))*2^{Ln-2-ln\_n1\_cnt})$$

Figure 43:
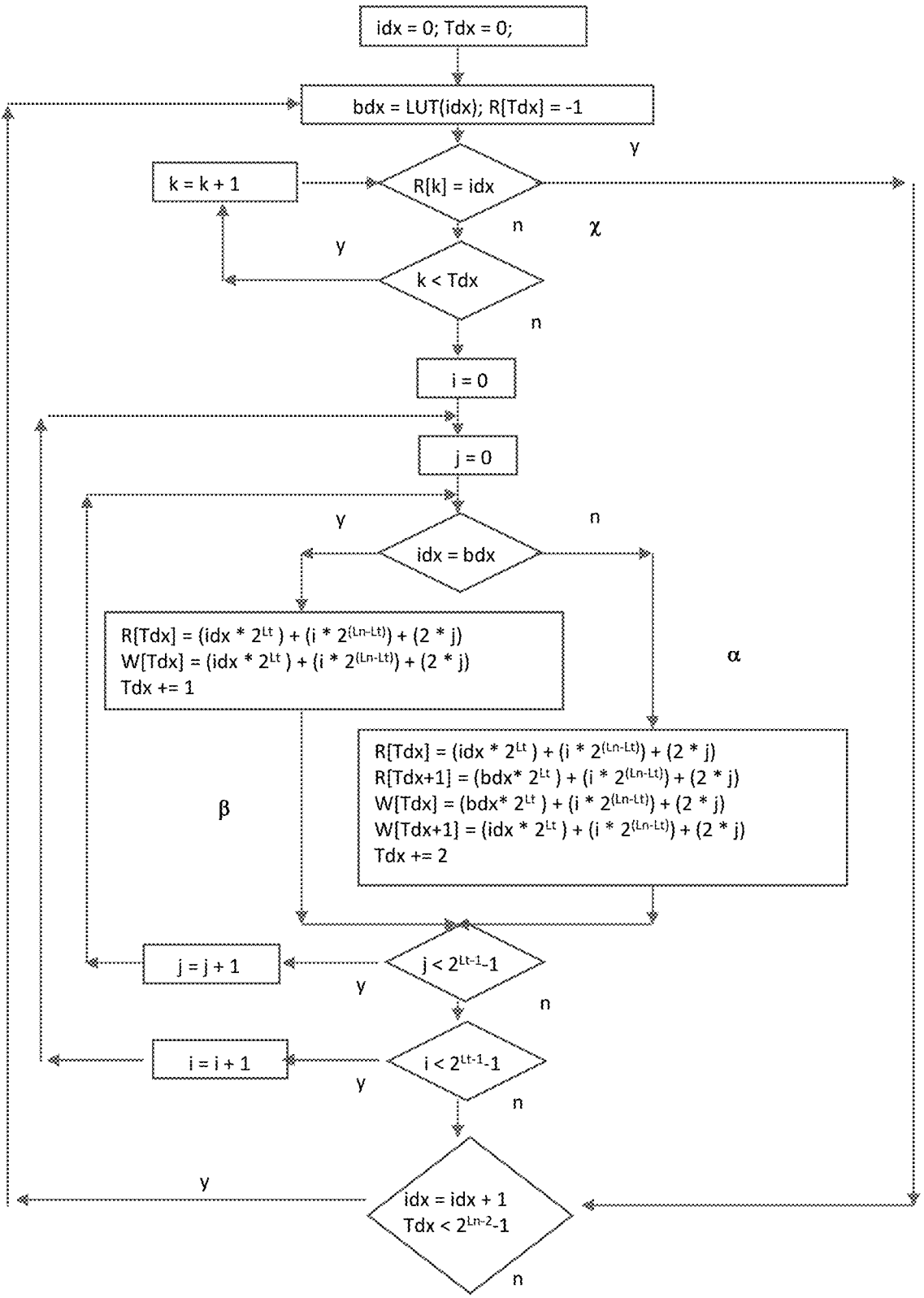
FIG. 43 is a flow diagram illustrating the construction of read/write index tables, in accordance with an embodiment of the present disclosure.

Two-bit Radix-2 table-based reordering operator. FIG. 42 describes the structure of the table-based last pass. FIG. 43 is a flow chart for the construction of the read/write index tables, where R[ ]: read index table, W[ ]: write index table.

In FIG. 42, at portion α thereof, the "read before write" loop policy is utilized for the tile swapping sequence, which reorders the scrambled middle bit field of the reconfigured butterfly binary loop index. For i=2Ln–2Lt, the read sequence is not executed. For i=0, the write sequence is not executed. Also, in FIG. 42, at portion α thereof, as the tile size increases, so does sequential indexing during the last pass. This provides the capability to adjust the tile size for a particular compute unit's available hardware resources. Furthermore, in FIG. 42, at portion thereof, two-bit reordering is represented by the a→c transfer: swap vectors of length one, similar to a 2×2 transpose.

In FIG. 43, two-bit Radix-2 reordering index table assignment with the index tables driving the last pass loop's vector accesses are constructed with a LUT, which returns a bit-reversed index. The table length is $2^{(Ln-2)}$, and the tile size is $2^{Lt} \times 2^{Lt}$. Also, in FIG. 43, at portion α thereof, the relative order of indexing between R[ ] and W[ ] (idx,bdx vs. bdx,idx), combined with the "read before write" loop policy (see FIG. 44 at portion α thereof), is relevant to the vector reordering sequence during the last pass. The inner two loops in FIG. 43 organize the vector accesses such that the reordering proceeds tile by tile. In FIG. 43, at portion thereof, the value Tdx is the table length, which grows by 1 or 2 with each table assignment. The assignment for the two table entries represents the index into the ($2^{Lt} \times 2^{Lt}$) two-dimensional tile. For example, R[Tdx]=(idx*$2^{Lt}$)+(i*$2^{(Ln-Lt)}$)+(2*j). In FIG. 43, at portion χ thereof, the search loop to determine if this value of idx has already been assigned to the R[ ],W[ ] tables as a value for bdx in a previous loop pass is performed.

Hybrid7 design notes: Lt=1, $N_{4b}$=0. In some cases, the standard DIT FFT is executed on all but the last pass representing the lowest cost in $R_{LC}$, all of reordering is performed with the tile-based table-driven last pass, and there is no execution of the four-bit reordering operator represented in FIGS. 38 and 39.

DIF hybrid7 reordering FFT. The DIF version of this reordering FFT may be created from the DIT algorithm:

1. The DIF Radix-4 butterfly listed in Section 3 is used in the core computation;
2. A weighted Radix-2 first pass is executed for Ln even (e.g., Ln&0x1=0); and
3. The j-index is used with no LUT for the butterfly weights calculation:

$$iw=j*2^{(2p)-1+(Ln\&0x1)}$$

Radix-4 table-based reordering FFT. A Radix-4 based algorithm can be used in a variant of the hybrid7 design. The hybrid5 four-bit reordering operator is used with one change: because the middle segment of the butterfly binary loop index is scrambled, the weights index calculation is identical to the hybrid7 design. Thus, the hybrid7 four-bit reordering butterfly weights index computation is:

$$I=LUT(c2)+((s1+LUT(s2)+s3)*2^{Ln-2-ln\_n1\_cnt})$$

Figure 44:
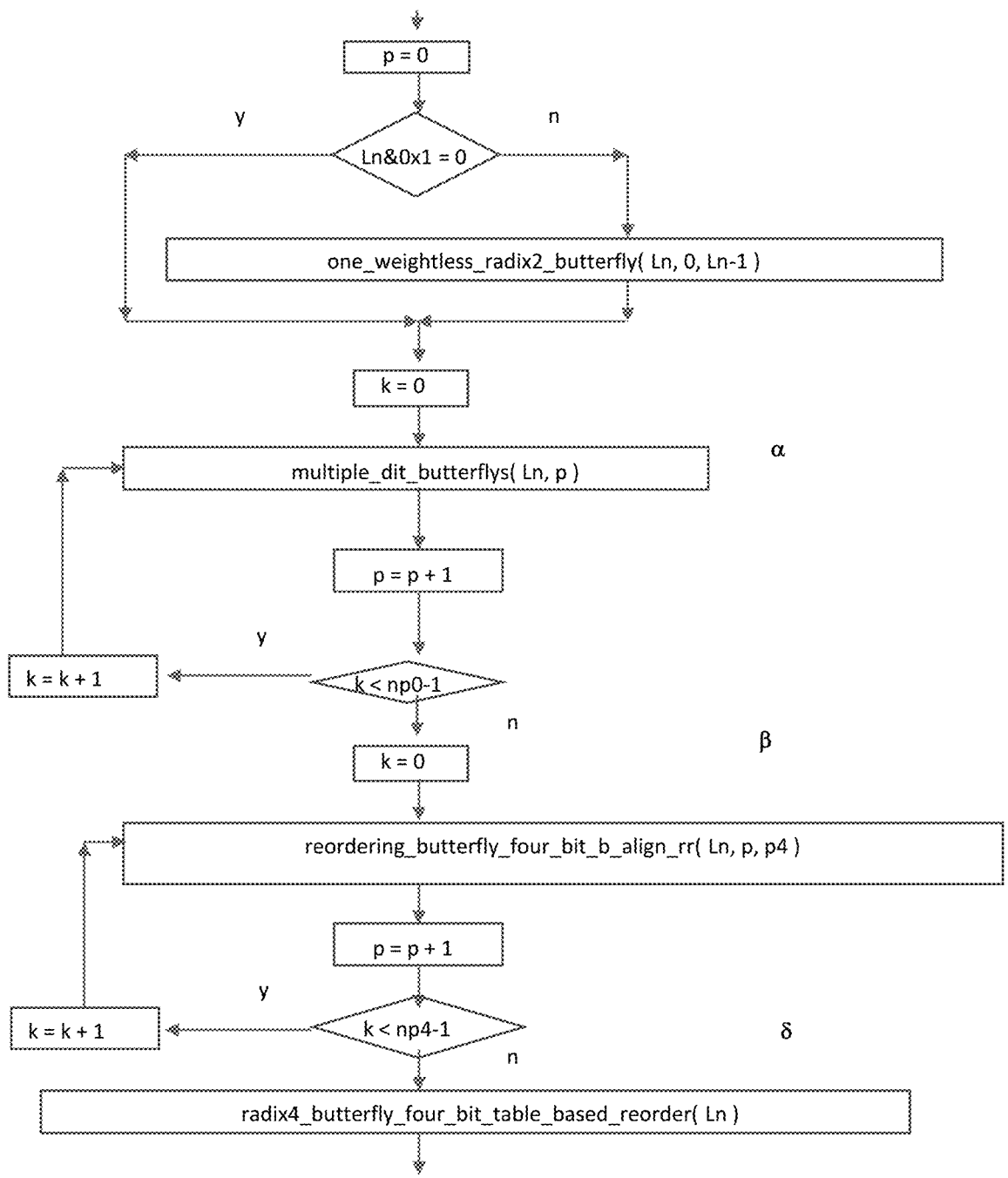
FIG. 44 is a flow diagram illustrating a multi-pass FFT utilizing a Radix-4 table-based reordering butterfly, in accordance with an embodiment of the present disclosure.
Figure 45:
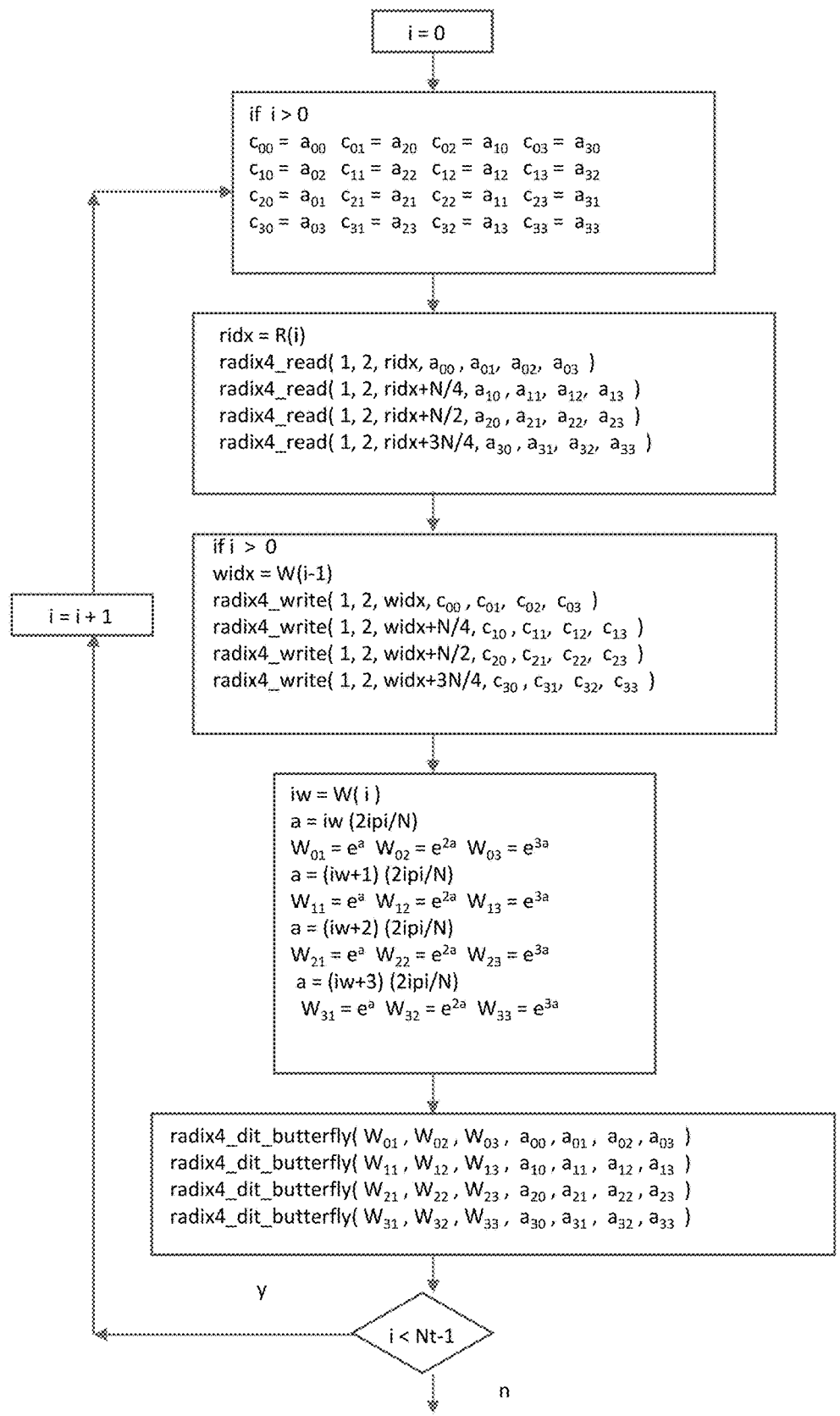
FIG. 45 is a flow diagram illustrating a function, in accordance with an embodiment of the present disclosure.

For a high-level multi-pass flow chart for the hybrid7 FFT utilizing the Radix-4 table-based reordering butterfly, see FIG. 44.

In FIG. 44, at portion α thereof, the same functions are executed as the Radix-2 table-based FFT. Also, in FIG. 44, at portion β thereof, the hybrid5 reordering butterfly function with the weights calculation modified is provided. Also, in FIG. 44, at portion δ thereof, the Radix-4 table-based reordering butterfly modified for tile-based reordering is provided.

The conditional "diamond" in the table generation function of FIG. 43 is changed from $2^{Ln-2Lt}$ to $4^{Ln-2Lt}$. The equation relating $N_{4b}$, $P_{4b}$, and Lt is:

$P_{4b}=Ln/2-N_{4b}$ First pass for four-bit reordering

Lt=2+(2*np4) Tile size for last pass Radix-2 reordering

This reordering FFT is as straightforward to assemble as the Radix-2 variant presented above. However, this algorithm may be considered somewhat awkward to "convert" to base-3. An analogous base-3 butterfly function would involve nine Radix-9 butterflies with a 9×9 reordering stage. This would require 81 complex values, which may "overflow" the local compute resource capacity. The Radix-2 algorithm requires much less $R_{LC}$ but possibly one extra pass to execute.

Appendix (Base-3)

This section makes the algorithms of the base-2 methodologies more abstract. Here, we demonstrate that there exist many sets of algorithms, each set parameterized by an integer b. For the algorithms described in relation to the base-2 methodologies above, b=2. Here, we demonstrate the scope of the design by a direct conversion to a set of algorithms for b=3. Other sets of algorithms exist for other values of b.

Consider the vector index represented:

$i_{Ln-1} \, i_{Ln-2} \, i_{Ln-3} \, i_2 \, i_1 \, i_0$ where each i=0 or 1. This can be made more abstract by viewing this as a sequence of polynomial coefficients for the expansion of any integer N in a base b representation:

Ln–1
$N=\Sigma \, i_k \, b^k$
k=0 where each ik=0, 1, ... b−1, Ln=$\log_b(N)$. The bit-reversed representation is:

Ln−1
M=Σ $i_{Ln-k-1}$ $b^k$
k=0

Note that the indexing for $i_{Ln-k-1}$ is reversed compared to the indexing for $i_k$. M is the bit-reversed value of N with respect to the abstract polynomial representation of base b. Consider a "trinary" index representation of the vector of Section 1. In this representation, b=3, and each index $i_k$ can have values of 0, 1, or 2. The polynomial representation of an integer N is obtained by setting b=3 in the equations above:

Ln−1
N=Σ ik 3k
k=0

Polynomial index counter and sum. The assignment of the butterfly weights utilizes an index value (Idx) derived from one or more loop counters. The Hm polynomial coefficients (dn) of the base b representation of this index value are defined by:

Hm−1
Idx=Σ $d_h$ $b^h$
h=0

The binary sequence $d_h$ is associated with a particular loop.

For any loop whose counter contributes to the computation of the weights index, a polynomial index counter do is updated each pass. This counter is then used by the polynomial index sum above to compute the integer value Idx, needed to assign the W's.

Construct the Hm polynomial coefficients during the execution of the associated loop. Increment d[0] each loop pass, resulting in a mod(b) propagation through the vector d[ ]:

Function sequences: Polynomial index counter is associated with a particular loop. Each loop pass:
Parameters: d[ ]: index array, Hm: index length
d[0]+=1
for (h=0, Hm−2, h=h+1)
 if (d[h]=b)

$d[h]=0 \rightarrow d[h+1]=d[h+1]+1$

Polynomial index sum: For any loop pass, sum the polynomial elements:
Parameters: d[ ]: index array, $h_0$: index, dh: stride, Hm: index length.
Iw0=0
for (h=0, h<Hm, h=h+|dh|)

$Iw0=Iw0+(d[h_0+(dh*h)]b^{|dh*h|})$

Normal sum: $h_0$=0, dh>0
Reverse sum: $h_0$=Hm−1, dh<0
Exponent of b is always positive→|dh*h|
See FIGS. 46 and 47 for the butterflies.

An initialization of the binary counter is executed prior to the loop entry. Both the polynomial sum and counter are combined to perform the function LUT( ) described above for both the base-2 and base-3 reordering FFTs.

Multi-pass reordering algorithm for base b. Consider the reordering algorithm of Section 2 for a general base b. The reordering process is still a sequence of vector swaps. The rules for swapping two fields embedded in the scrambled vector are:

A swap is required if N and M are bit-reversed pairs, as defined above.

The first example of Section 2 is recast as a base-3 reordering algorithm for illustration: Reverse the middle two bits, located at index pair: Ln/2, Ln/2−1, through a sequence of vector swaps of length $3^{ln/2-1}$. Ln=$\log_3(N)$.

reorder indices
  | |
$i_0 i_1 i_2 \ldots i_{Ln/2-1} i_{Ln/2} i_{Ln-3} i_{ln-2} i_{ln-1}$ In the first vector swap executed on the first pass, this vector:

0 0 ... 0 0 1 $i_{Ln/2-2} \ldots i_{Ln-3} i_{Ln-2} i_{Ln-1}$ is swapped with this vector:

0 0 ... 0 1 0 $i_{Ln/2-2} \ldots i_{Ln-3} i_{Ln-2} i_{Ln-1}$

In the second vector swap executed on the first pass, this vector:

0 0 ... 0 0 2 $i_{Ln/2-2} \ldots i_{Ln-3} i_{Ln-2} i_{Ln-1}$ is swapped with this vector:

0 0 ... 0 2 0 $i_{Ln/2-2} \ldots i_{Ln-3} i_{Ln-2} i_{Ln-1}$

In the third vector swap executed on the first pass, this vector:

0 0 ... 0 1 2 $i_{Ln/2-2} \ldots i_{Ln-3} i_{Ln-2} i_{Ln-1}$ is swapped with this vector:

0 0 ... 0 2 1 $i_{Ln/2-2} \ldots i_{Ln-3} i_{Ln-2} i_{Ln-1}$

After all of the $3^{Ln/2-1}$ vector swap sequences are executed on pass 0, the middle two bits in the trinary index representation of the scrambled vector are considered to be reordered, and the next two bits are processed: Ln/2+1, Ln/2−2 on pass 1. For b=3, FIG. 6 remains unchanged; however, all of the initialization is replaced with power of 3 assignments. The vector_swap( ) function (FIG. 46) performs three swaps per loop pass for b=3, compared to one swap for b=2 (FIG. 7).

Figure 49:
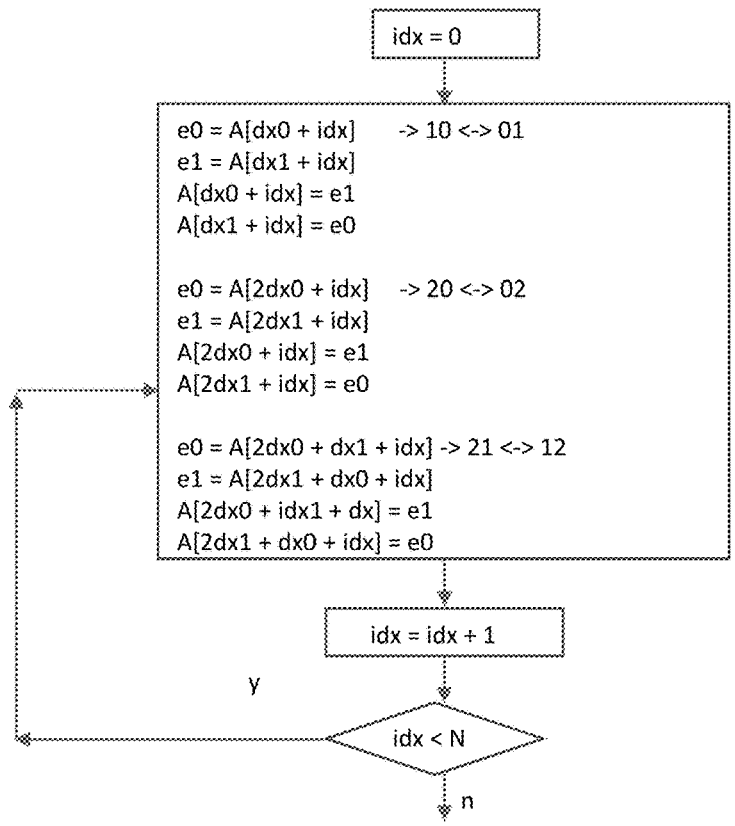
FIG. 49 is a flow diagram illustrating a function, in accordance with an embodiment of the present disclosure.

The vector swap for b=3 is:

$jj\_vswp(Ln,p):Ln\_rl=ln/2+p+(Ln\&0x1);Ln\_rr=ln/2-p-1;$ $v0=3^{ln\_rr}; v1=3^{ln\_rl}$ $N=3^{ln\_rr}; Nj=3^{ln\_rr}; Ni=3^{ln\_rl-ln\_rr-1}$ $iinc=3^{ln\_rr+1}; jinc=3^{ln\_rl+1}$ Given vector A[ ], vector_swap (dx0, dx1, N) is defined for base b=3. (See FIG. 49).

Standard In-place DIT FFT of Section 3. The Radix-4 in-place DIT FFT described in Section 3 is recast in a trinary index representation for vector lengths which are powers of three:

N=$3^{Ln}$, Ln=0, 1, 2, ...
FIG. 8: Ln=$\log_3$ (N) for b=3.
The butterfly order is nine-point since:
Butterfly order=$2^2$→four-point butterfly
Butterfly order=$3^2$→nine-point butterfly
The In-place DIT FFT for b=3 has the same butterfly loop index representation as the b=2 instance, but now k's, b's, and j's=0, 1, or 2:
Ln & 0x1=1: Radix-3 butterfly is executed
$b_0 i_{Ln-2} i_{Ln-3} j_2 j_1 j_0$
Pass p: p=0
Ln & 0x1=0:
$b_1 b_0 j_{Ln-3} i_{Ln-4} \ldots j_1 j_0$
Ln & 0x1=1:
$k_0 b_1 b_0 j_{Ln-4} j_{Ln-5} \ldots j_1 j_0$
Pass p: p=1, Ln/2−1
Ln & 0x1=0:
$k_0 k_1 \ldots k_{2p-2} k_{2p-1} b_1 b_0 j_{Ln-2p-3} j_{Ln-2p-4} \ldots j_1 j_0$
Ln & 0x1=1:
$k_0 k_1 \ldots k_{2p-2} k_{2p-1} k_{2p} b_1 b_0 j_{Ln-2p-4} j_{Ln-2p-5} \ldots j_1 j_0$
The k and j index fields represent similar loop structures as the base-2 representation (e.g., loop counts and vector index values). The field $b_1, b_0$ represents the vector indices of the nine-point butterfly. The first pass is executed with a "weightless" Radix-3 butterfly. Subsequent passes are Radix-9-based butterfly stages for both even and odd powers of three sized vectors. Note that each b index has values 0, 1, or 2 (e.g., $b_1$ $b_0$={0,0 0,1 0,2 1,0 1,1 1,2 2,0 2,1 2,2}→nine pairs).

Figure 50:
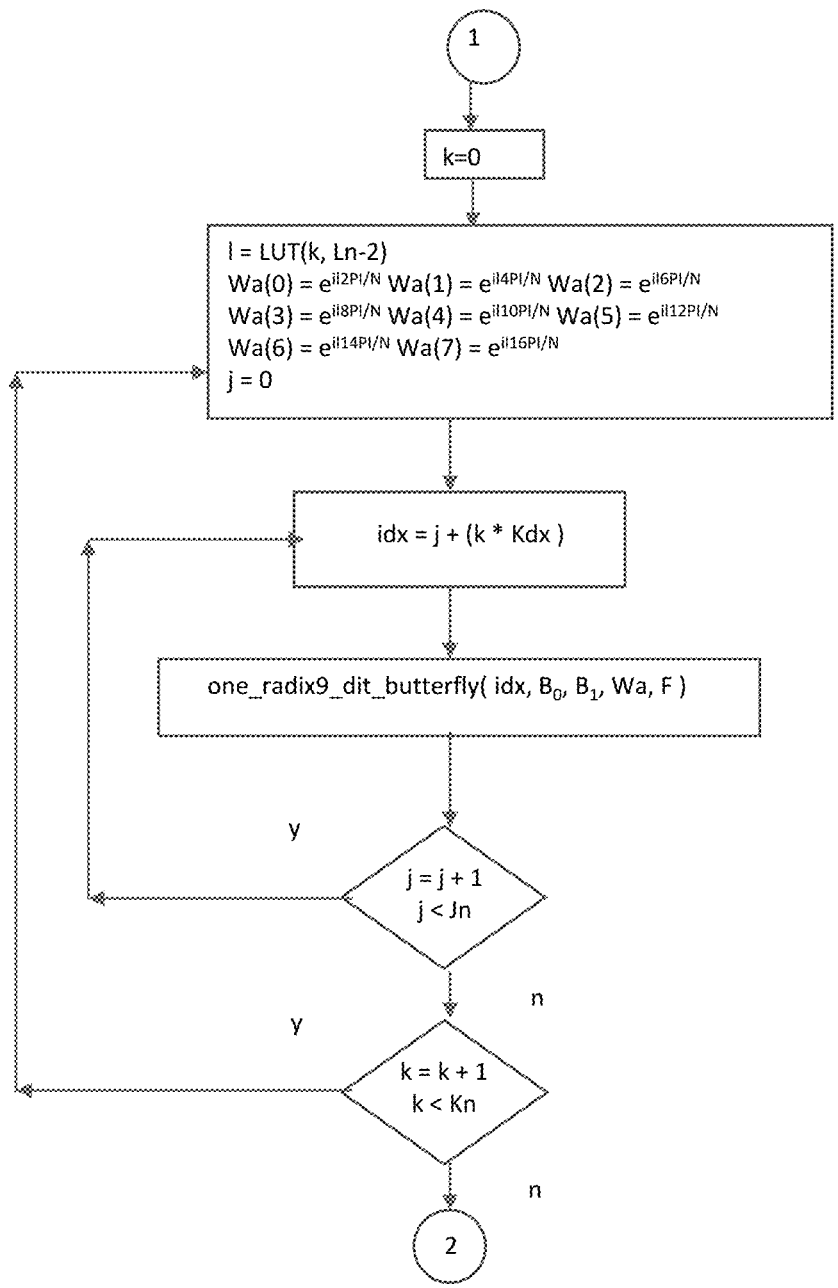
FIG. 50 is a flow diagram illustrating power-of-three/nine-point butterfly FFT algorithm, in accordance with an embodiment of the present disclosure.

The "power of two/four-point butterfly" FFT algorithm of FIG. 9 is replaced with a "power of three/nine-point butterfly" FFT algorithm represented in the FIG. 50.

In Section 3, with reference to FIG. 8, if (Ln & 0x1) is true (i.e., odd power of three sized vectors), the first pass is executed with a "weightless" Radix-3 butterfly stage. Subsequent passes are nine-point butterfly stages for both even and odd powers of three sized vectors.

Figure 47:
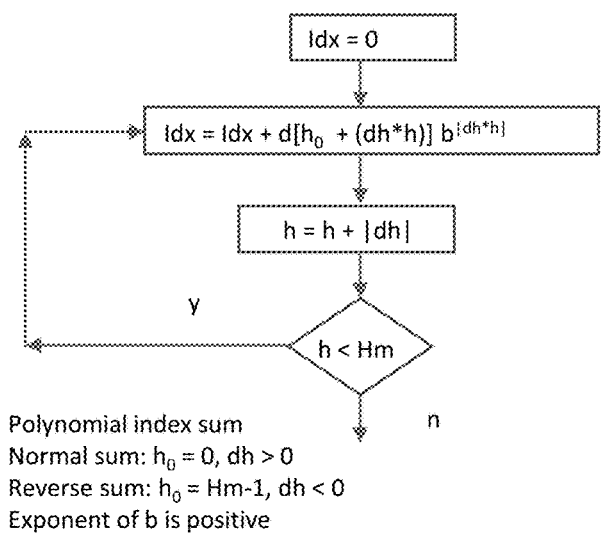
FIG. 47 is a flow diagram illustrating a polynomial index sum, in accordance with an embodiment of the present disclosure.
Figure 48:
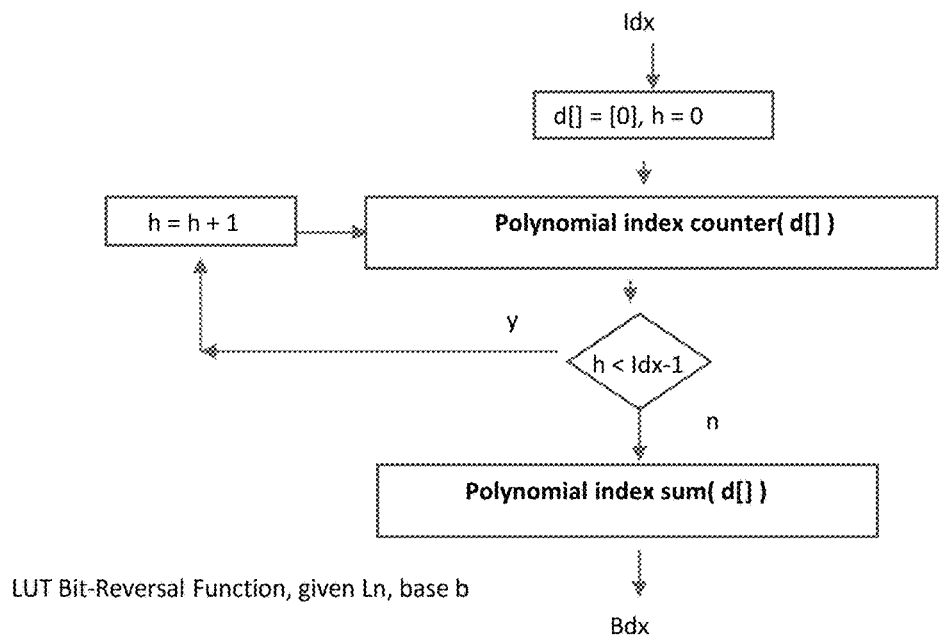
FIG. 48 is a flow diagram illustrating a LUT bit reversal function, in accordance with an embodiment of the present disclosure.

In FIG. 47, the k field of the butterfly loop index representation is used to assign the complex exponential roots of unity (W's) required for the butterfly computations. This integer represented by the k field one any loop pass is bit-reversed for the assignment of the W's.

For the nine-point DIT FFT, the b=3 algorithm has the following "power of three" parameter assignment stage:

multiple_radix9_dit_butterflys(Ln, p): vector size Ln, pass p

Ln_ng=2p
Ln_nb=Ln−2−2p
$B0=b^{Ln\_nb}=3^{Ln\_nb}$
$B1=b^{Ln\_nb+1}=3^{Ln\_nb+1}$
$Kdx=b^{Ln\_nb+2}=3^{Ln\_nb+2}$
$Jn=b^{Ln\_nb}=3^{Ln\_nb}$
$Kn=b^{Ln\_ng}=3^{Ln\_ng}$

Nine-point DIT FFT components: DFT:

$$y_k = \sum_{n=0}^{N-1} x_n\, e^{(2\Pi i/N)kn}$$

Three-point butterfly: Set N=3: Function sequence:

$y_0 = x_0 + x_1 + x_2$ $y_1 = x_0 + e^{(2\Pi i/3)} x_1 + e^{(4\Pi i/3)} x_2$ $y_2 = x_0 + e^{(4\Pi i/3)} x_1 + e^{(8\Pi i/3)} x_2$

Figure 51:
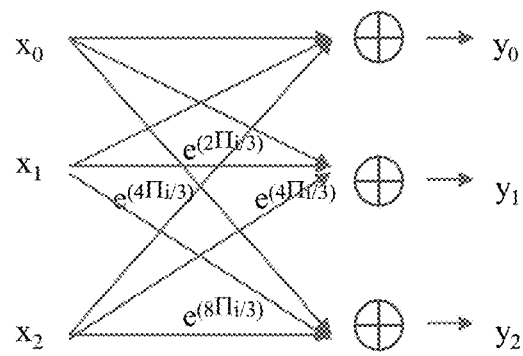
FIG. 51 is a butterfly diagram illustrating a three-point butterfly, in accordance with an embodiment of the present disclosure.

See FIG. 51 for the three-point butterfly.

Nine-point butterfly: Function sequence:

$b0 = a0 + (W_3 a3) + (W_6 a6)$ $b3 = a0 + e^{2\Pi i/3}(W_3 a3) e^{4\Pi i/3}(W_6 a6)$ $b6 = a0 + e^{4\Pi i/3}(W_3 a3) = e^{8\Pi i/3}(W_6 a6)$ $b1 = (W_1 a1) + (W_4 a4) + (W_7 a7)$ $b4 = (W_1 a1) + e^{2\Pi i/3}(W_4 a4) + e^{4\Pi i/3}(W_7 a7)$ $b7 = (W_1 a1) + e^{4\Pi i/3}(W_4 a4) + e^{8\Pi i/3}(W_7 a7)$ $b2 = (W_2 a2) + (W_5 a5) + (W_8 a8)$ $b5 = (W_2 a2) + e^{2\Pi i/3}(W_5 a5) + e^{4\Pi i/3}(W_8 a8)$ $b8 = (W_2 a2) + e^{4\Pi i/3}(W_5 a5) + e^{8\Pi i/3}(W_8 a8)$ $b4 = e^{4\Pi i/9} b4$ $b5 = e^{8\Pi i/9} b5$ $b7 = e^{2\Pi i/9} b7$ $b8 = e^{4\Pi i/9} b8$ $c0 = b0 + b1 + b2$ $c1 = b0 + e^{2\Pi i/3} b1 + e^{4\Pi i/3} b2$ $c2 = b0 + e^{4\Pi i/3} b1 + e^{8\Pi i/3} b2$ $c3 = b3 + b4 + b5$ $c4 = b3 + e^{2\Pi i/3} b4 + e^{4\Pi i/3} b5$ $c5 = b3 + e^{4\Pi i/3} b4 + e^{8\Pi i/3} b5$ $c6 = b6 + b7 + b8$ $c7 = b6 + e^{2\Pi i/3} b7 + e^{4\Pi i/3} b8$ $c8 = b6 + e^{4\Pi i/3} b7 + e^{8\Pi i/3} b8$ y0=c0 y3=c4 y6=c7
y1=c1 y4=c5 y7=c8
y2=c2 y5=c3 y8=c6

Figure 52:
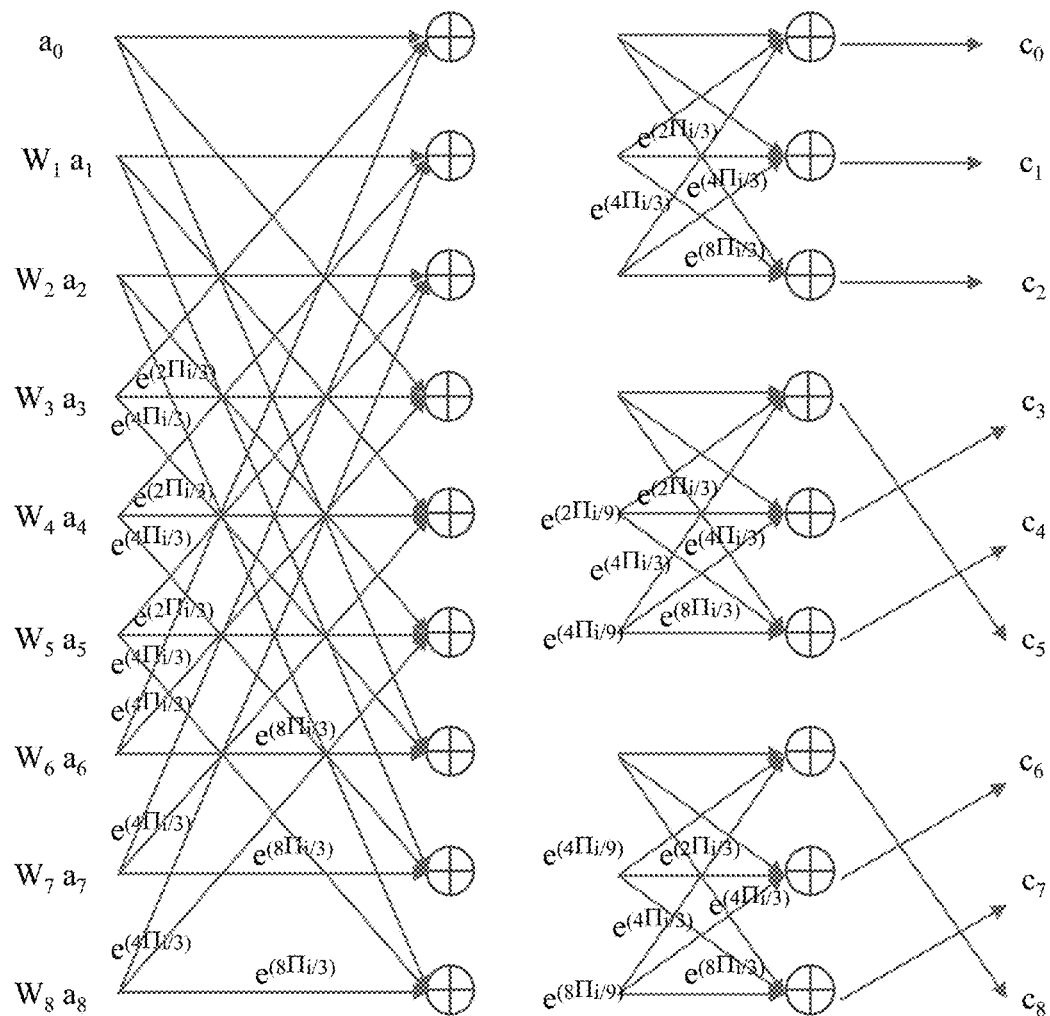
FIG. 52 is a butterfly diagram illustrating a nine-point butterfly, in accordance with an embodiment of the present disclosure.

See FIG. 52 for the nine-point butterfly.

Define nine point read(B0, B1, idx, $a_0$, $a_1$, $a_2$, $a_3$, $a_4$, $a_5$, $a_6$, $a_7$, $a_8$)

$a_0 = A[idx]$ $a_1 = A[B0 + idx]$ $a_2 = A[2B0 + idx]$ $a_3 = A[B1 + idx]$ $a_4 = A[B1 + B0 + idx]$ $a_5 = A[B1 + 2B0 + idx]$ $a_6 = A[2B1 + idx]$ $a_7 = A[2B1 + B0 + idx]$ $a_8 = A[2B1 + 2B0 + idx]$ Define nine_point write(B0, B1, idx, $a_0$, $a_1$, $a_2$, $a_3$, $a_4$, $a_5$, $a_6$, $a_7$, $a_8$)

$A[idx] = a_0$ $A[B0 + idx] = a_1$ $A[2B0 + idx] = a_2$ $A[B1 + idx] = a_3$ $A[B1 + B0 + idx] = a_4$ $A[B1 + 2B0 + idx] = a_5$ $A[2B1 + idx] = a_6$ $A[2B1 + B0 + idx] = a_7$ $A[2B1 + 2B0 + idx] = a_8$ Base-3 Reordering FFTs. The rules for the conversion of the base-2 FFTs described in Sections 4, 5, and 6 to base-3:
1. Loop parameters are assigned as powers of three rather than two.
2. The execution of reordering Radix-4 butterflies is replaced by reordering Radix-9 butterflies.
3. Loops are unrolled three times for two-bit reordering and nine times for four-bit reordering.

4. Eight weights are required for the Radix-9 butterfly computation. The weights index may require bit reversal.
5. The top-level multi-pass loop structure is identical for both base-2 and base-3, as both FFT designs are based on the same butterfly binary loop index.

For example, consider the base-3 butterfly functions for the first algorithm of Section 4. For path (b0>rl), the reordering butterfly function is:

nine reordering butterflys b0gtrl(c0+idx, ih, io)
For path (b$_0$=
Alignment: b$_0$=r$_l$, B0=$3^{Ln\_B0}$, B1=$3^{Ln\_B1}$
nine-point_read(B0, B1, idx, a$_0$)
nine-point_read(B0, B1, idx+ih, a$_1$)
nine-point_read(B0, B1, idx+2ih, a$_2$)
nine-point_bfly (W$_0$, a$_0$)
nine-point_bfly (W$_0$, a$_1$)
nine-point_bfly (W$_0$, a$_2$)
c$_{00}$=a$_{00}$, c$_{01}$=a$_{10}$, c$_{02}$=a$_{20}$, c$_{03}$=a$_{03}$, c$_{04}$=a$_{13}$, c$_{05}$=a$_{23}$, c$_{06}$=a$_{06}$, c$_{07}$=a$_{16}$, c$_{08}$=a$_{26}$
c$_{10}$=a$_{01}$, c$_{11}$=a$_{11}$, c$_{12}$=a$_{21}$, c$_{13}$=a$_{04}$, c$_{14}$=a$_{14}$, c$_{15}$=a$_{24}$, c$_{16}$=a$_{07}$, c$_{17}$=a$_{17}$, c$_{18}$=a$_{27}$
c$_{20}$=a$_{02}$, c$_{21}$=a$_{12}$, c$_{22}$=a$_{22}$, c$_{23}$=a$_{05}$, c$_{24}$=a$_{15}$, c$_{25}$=a$_{25}$, c$_{26}$=a$_{08}$, c$_{27}$=a$_{18}$, c$_{28}$=a$_{28}$
nine-point_write(B0, B1, idx, c$_0$)
nine-point_write(B0, B1, idx+ih, c$_1$)
nine-point_write(B0, B1, idx+2ih, c$_2$)
For path (b1=rl):
Alignment: b1=rl, B0=$3^{Ln\_B0}$, B1=$3^{Ln\_B1}$
nine-point_read(B0, B1, idx, a$_0$)
nine-point_read(B0, B1, idx+ih, a$_1$)
nine-point_read(B0, B1, idx+2ih, a$_2$)
nine-point_bfly (W$_0$, a$_0$)
nine-point_bfly (W$_0$, a$_1$)
nine-point_bfly (W$_0$, a$_2$)
c$_{00}$=a$_{00}$, c$_{01}$=a$_{01}$, c$_{02}$=a$_{02}$, c$_{03}$=a$_{10}$, c$_{04}$=a$_{11}$, c$_{05}$=a$_{12}$, c$_{06}$=a$_{20}$, c$_{07}$=a$_{21}$, c$_{08}$=a$_{22}$
c$_{10}$=a$_{03}$, c$_{11}$=a$_{04}$, c$_{12}$=a$_{05}$, c$_{13}$=a$_{13}$, c$_{14}$=a$_{14}$, c$_{15}$=a$_{15}$, c$_{16}$=a$_{23}$, c$_{17}$=a$_{24}$, c$_{18}$=a$_{25}$
c$_{20}$=a$_{06}$, c$_{21}$=a$_{07}$, c$_{22}$=a$_{08}$, c$_{23}$=a$_{16}$, c$_{24}$=a$_{17}$, c$_{25}$=a$_{18}$, c$_{26}$=a$_{26}$, c$_{27}$=a$_{27}$, c$_{28}$=a$_{28}$
nine-point_write(B0, B1, idx, c$_0$)
nine-point_write(B0, B1, idx+ih, c$_1$)
nine-point_write(B0, B1, idx+2ih, c$_2$)

For path (b1<rl) and (b0>rr), the reordering butterfly function is:
nine_reordering_butterflys_b1ltrl(c0+idx, ih, io)
having the same reordering butterfly structure as:
nine_reordering_butterflys_b0gtrl(c0+idx, ih, io)
where ih=$3^{ln\_c2\_inc}$ and io=$3^{ln\_c1\_inc-1}$.

Figure 54:
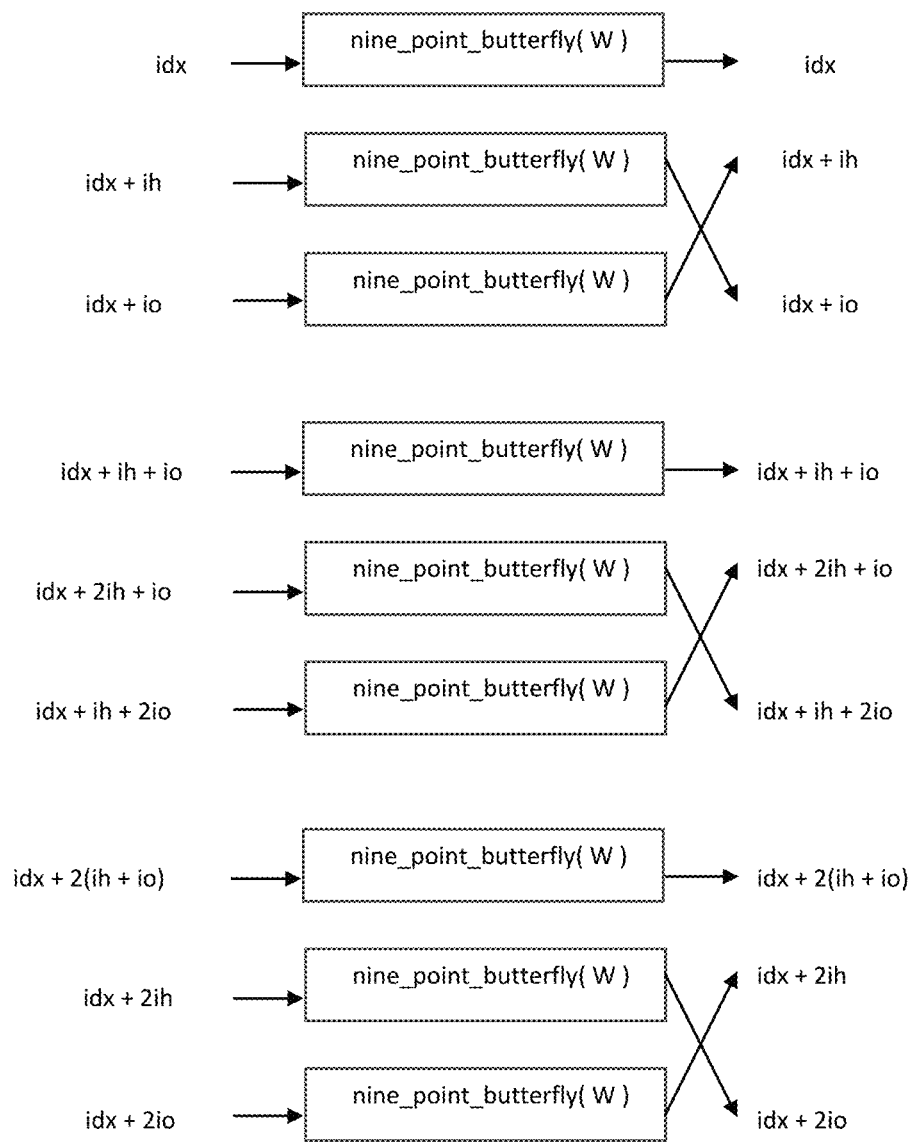
FIG. 54 is a butterfly diagram illustrating a nine-point butterfly, in accordance with an embodiment of the present disclosure.

For path (b0=rr), the reordering butterfly configuration is identical to FIG. 54 except that each of the butterflies uses a unique weights group, as in the previous path.

Table-driven hybrid FFT with two-point reordering for base-2 or base-3. As in Sections 5 and 6, this design is motivated by the assumption that good data locality increases the efficiency of local compute resource utilization.

The first sequence of passes performs no reordering and requires the minimum compute resources for the butterfly computation. Since data locality improves with each subsequent pass, reordering is delayed until some pass pr>0. For this design, as in Section 6, the final pass is a table-driven Radix-2/Radix-3 butterfly which reorders some remaining middle section of the binary loop index.

The algorithm in Section 6 uses a four-point reordering operator for the middle passes. The base-3 version of this operator is a nine-point reordering operator, requiring nine Radix-9 butterflies, which can be expensive. This design uses a two-point reordering operator which results in either a two or three Radix-9 butterfly configuration for the base-3 algorithm.

Further restrict the b-field represented in the binary loop index to be positioned between the two reordering indices for the first two-bit reordering pass pr: r$_{l0}$, r$_{r0}$ avoiding a b-field alignment state with the left reordering index (reference FIG. 11). This eliminates the need for a Radix-9 configuration utilizing three reordering butterflies until the last Radix-9 pass when data locality is improved. With this restriction, reordering passes utilize a configuration of two reordering butterflies for both base-2 and base-3, minimizing the compute resource requirement for the two-bit reordering FFT. This restriction puts a limit on the number of two-bit reordering passes np2 for a particular size vector Ln.

General constraint: ln_b1<rl0. For even powers of two:

$$ln\_b1 < rl0$$

$$Ln-1-(2*pr)-1+lnm2 < lno2+pr-lnm2$$

$$Ln-1-(2*pr)-1 < lno2+pr$$

$$lno2-(2*pr)-2 < pr$$

$$lno2-2 < 3*pr$$

$$(lno2-2)/3 < pr$$

Example: Ln=12

$$4/3 < pr$$

$$pr(\max)=2$$

$$np2(\max)=(lno2-1)-pr(\max)$$

$$np2(\max)=5-2=3$$

For odd powers of two:

$$ln\_b1 < rl0$$

$$Ln-1-(2*pr)-(1-lnm2) < lno2+pr-lnm2$$

$$Ln-1-(2*pr) < lno2+pr-1$$

$$lno2-(2*pr) < pr$$

$$lno2 < 3*pr$$

$$lno2/3 < pr$$

Example: Ln=13

$$6/3 < pr$$

$$2 < pr$$

$$pr(\max)=3$$

$$np2(\max)=lno2-pr(\max)$$

$$np2(\max)=6-3=3$$

Once two-bit reordering begins, the binary data index is partitioned into five sub-segments. For the high unordered segment:

←r$_l$ as p increases
|
i$_{Ln-1}$ . . . i$_{Lno2+p+lnm2}$

For the middle segment $r_{I0}\ r_{r0}$
| |
$i_{Lno2+p-1+lnm2} \cdots i_{Lno2+pr+lnm2}\ i_{Lno2+pr-1+lnm2} \cdots i_{Lno2-pr}$
$i_{Lno2-pr-1}\ i_{Lno2-p}$
left lobe  middle sub-segment  right lobe For the low unordered segment:
$r_r \rightarrow$ as p increases
|
$i_{Lno2-p-1} \cdots i_0$ The left and right "lobe" reordered segments widen with each pass, leaving a middle sub-segment which is reordered by the table-driven last pass. As in Section 6, a reordering Radix-2/Radix-3 butterfly is executed on the last pass.

Figure 61:
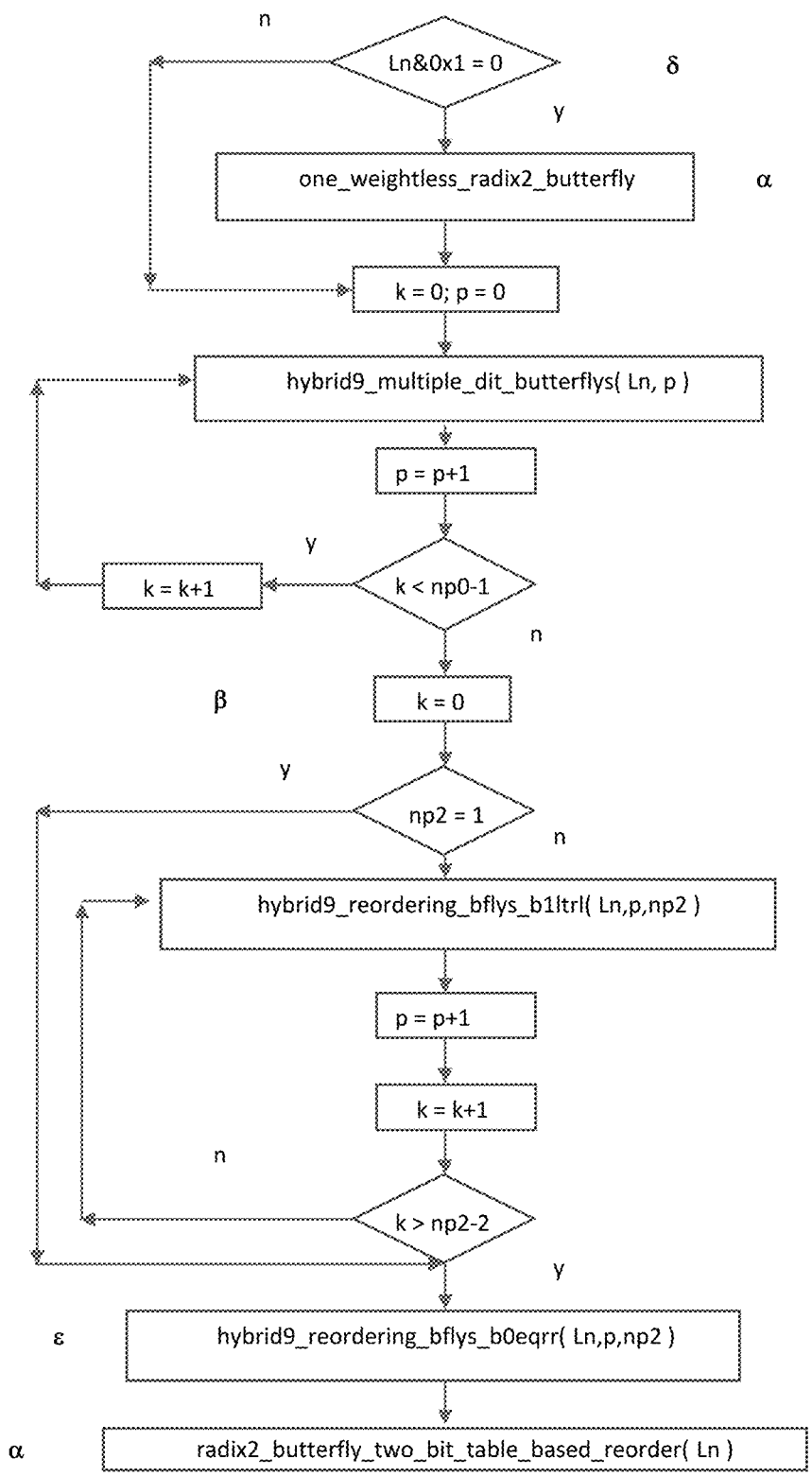
FIG. 61 is a flow diagram illustrating a three-level loop structure of butterfly functions, in accordance with an embodiment of the present disclosure.

The butterfly functions represented in FIG. 61 have a three-level loop structure. The outer loop is the high unordered sub-segment. The middle loop is the reordered left lobe, middle unordered sub-segment, and reordered right lobe. The inner loop is the low unordered sub-segment.

Compare FIG. 61 with FIG. 41. Also, in FIG. 61, at portion α thereof, Radix-3 butterflies are executed for base-3. In FIG. 61, at portion β thereof, parameter definitions: given np2:
np0=Ln/2−np2−1, $r_{r0}$=np2, $r_{I0}$=Ln−np2−1, pr=Ln−np2−1
Also, in FIG. 61, at portion δ thereof, even powers of 2 and 3 execute the Radix-2/Radix-3 butterfly to align the computation with the last pass. Referring to the double loop parameter assignments associated with FIG. 9, the double loop embedded within the function Hybrid9_multiple_dit_butterflys is:

$Ln\_ng=(2*p)-((Ln\ \&\ 0x1)-1);$ $Ln\_nb=Ln-2-Ln\_ng;$

Also, in FIG. 61, at portion ε thereof, there is a special function for the last Radix-4/Radix-9 pass. Note that this design utilizes at least one stage of two-bit reordering.

Figure 46:
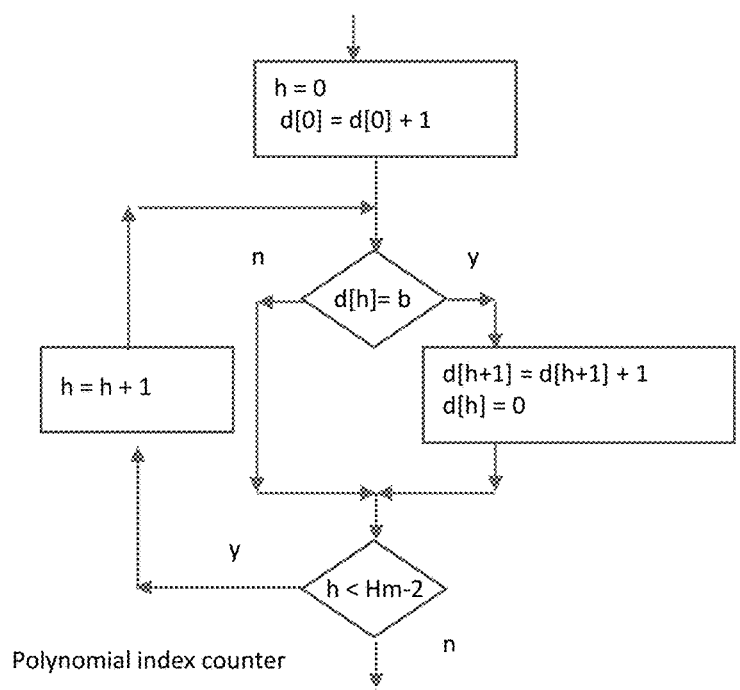
FIG. 46 is a flow diagram illustrating a polynomial index counter, in accordance with an embodiment of the present disclosure.

A variant of the polynomial index counter and summing function of FIGS. 46 and 47 are used to compute the weights indices for the butterfly computation. There are multiple sub-segments which are summed, each one using a separate binary counter and polynomial index summing function. Each summing function utilizes a starting index (ss), an ending index (se), a polynomial exponent (sn), and an indicator for normal or bit-reversed sum (sf). These functions are defined below in FIG. 68.

Once reordering begins, each subsequent pass positions the b-field closer to the right reordering index $r_{r0}$. This results in three alignment states for ln_b0 and $r_{r0}$:

$ln\_b0>r_{r0}$ $ln\_b0=r_{r0}$ $ln\_b0<r_{r0}$

These alignment states are used to compute parameter assignments for the polynomial summing functions. Loop parameters and the values of ln_b0, ln_b1 are powers of two for base-2 and powers of three for base-3

$lnm2=Ln\ \&\ 0x1$ $lno2=(Ln-lnm2)/2$

Figure 59:
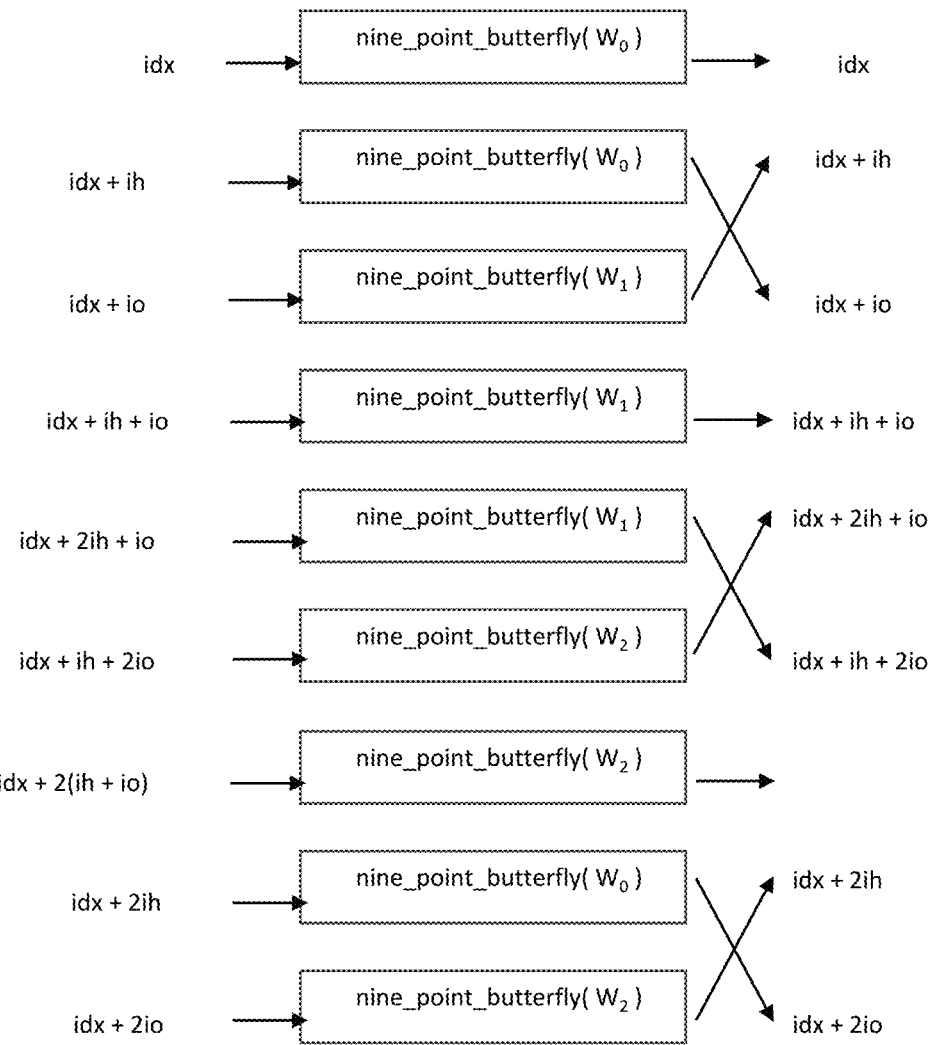
FIG. 59 is a butterfly diagram illustrating a nine-point butterfly, in accordance with an embodiment of the present disclosure.
Figure 60:
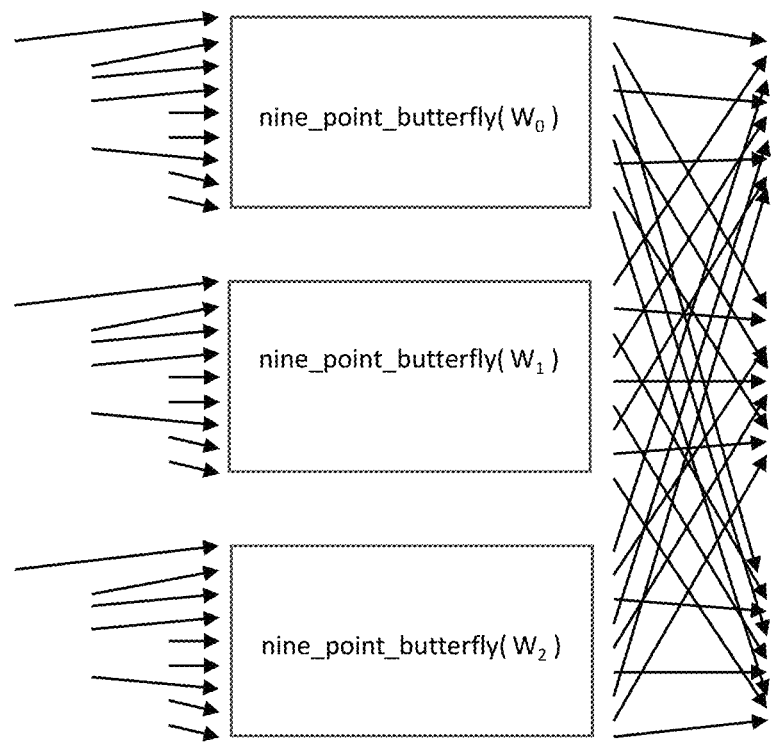
FIG. 60 is a butterfly diagram illustrating three reordering Radix-9 butterflies, in accordance with an embodiment of the present disclosure.
Figure 62:
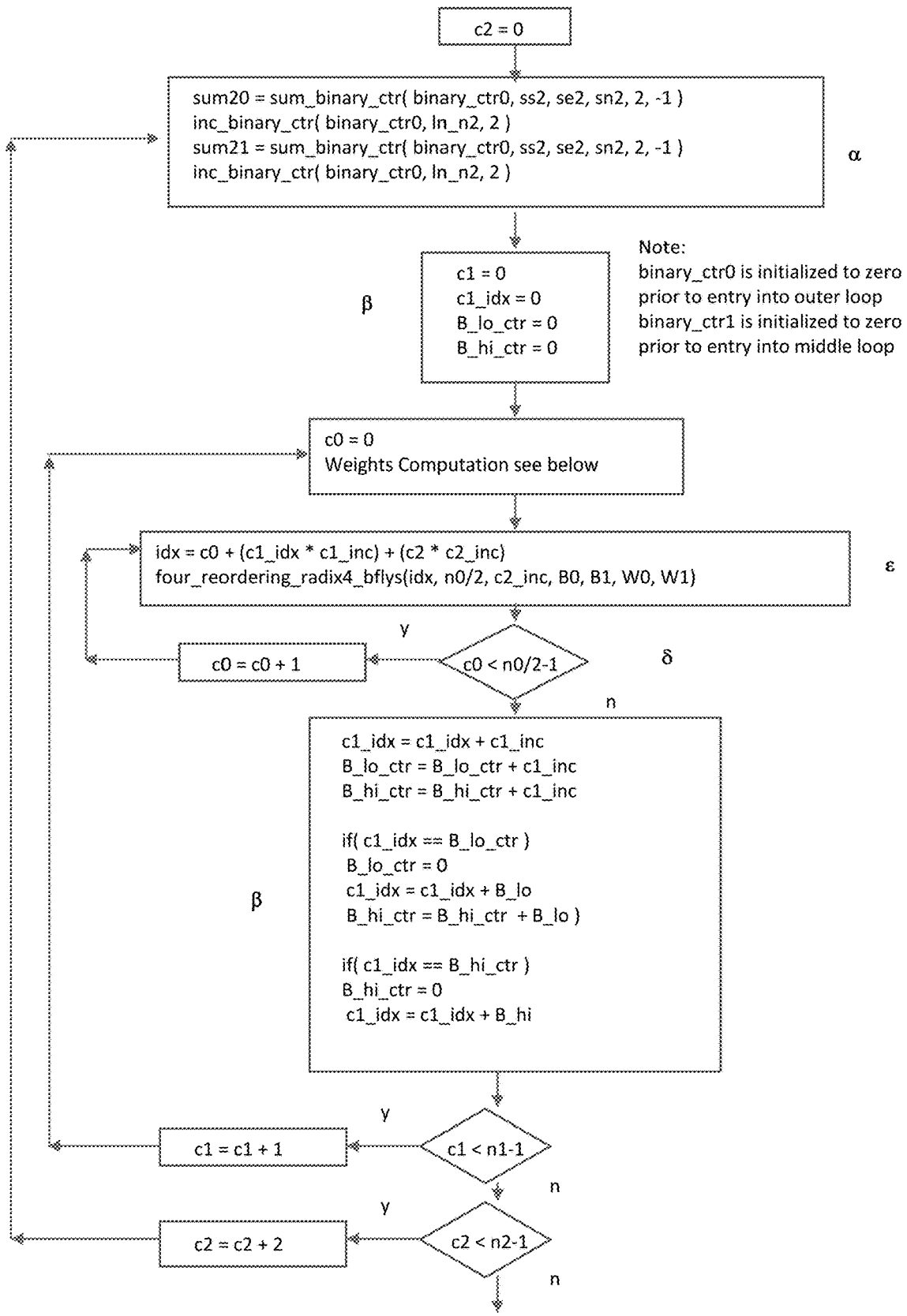
FIG. 62 is a flow diagram illustrating a function, in accordance with an embodiment of the present disclosure.

Turning to FIG. 62, a Hybrid9_reordering_bflys_b1ltrl (Ln, p, np2) is shown. General constraint: $ln\_b_1<r_{I0}$. The loop parameters are:

$ln\_n2=lno2-p+lnm2$ $ln\_c2\_inc=lno2+p$ $ln\_n1=(2*p)-2-lnm2$ $ln\_c1\_inc=lno2-p+lnm2$ if $(r_{I0}<3)$ $ln\_c1\_inc=ln\_c1\_inc+2$ $ln\_n0=lno2-p+lnm2$ $ss2=0$ $se2=lno2-p-1+lnm2$ $sn2=lno2-p+lnm2$ $sf2=-1$ In FIG. 62, at portion α thereof, referencing the binary loop index below, this polynomial summing function is used to bit-reverse the high unordered segment. These summing function parameters are independent of the b-field alignment state. The parameter signifying the base is changed from a 2 to a 3 for the base-3 algorithm. Also, in FIG. 62, at portion β thereof, there is a separate loop and data index for the middle loop. The incrementing data index detects an alignment with the b-field and "hops" over it. This allows for a reduced loop structure. B_lo_ctr and B_hi_ctr are initialized to zero prior to entry into the middle loop. Assigned prior to entry into middle loop controlled by counter c1:
If B1>B0, B_hi=B1, B_lo=B0
else B_hi=B0, B_lo=B1
Again, in FIG. 62, at portion δ thereof, inner and outer loops are unrolled by 3 for the base-3 algorithm. The inner loop count is n0/3, and the outer loop increments by 3 rather than 2. In FIG. 62, at portion ε thereof, base-3: nine reordering Radix-9 butterflies are executed (see FIG. 59). Only a one or two butterfly configuration is utilized to be computed and reorder the output. For any one of the three b-field alignment states, the summing functions executed to process the middle segment will have distinct parameter values. For each of the three alignment states, the binary loop index is displayed, and the summing function parameter assignments listed.

Turning to FIG. 63 for summing function parameters:
Independent of b-field alignment with $r_{r0}$:

$Nw=(2*p)+1-lnm2$ $ss10=0$ $se10=(p-pr)-1$ $sf10=1$ $ss12=ln\_n1+2-(p-pr)$ $se12=ln\_n1-1$ $sf12=1$ In the binary loop index, for alignment state: b0>rr0, the high unordered segment is:
$k_0 \ldots k_{Lno2-p-1}$
The left lobe is:
$kLno2-p \ldots kLno2-pr-1$
The left lobe reordered is:
$kLno2-pr-1 \ldots kLno2-p$ The middle segment is:
$k_{Lno2-pr}\ k_{2p-lnm2}\ b_1\ b_0\ j_{Ln-3-2p-1+lnm2}\ \ldots\ j_{Lno2-pr}$
The right lobe is:
$j_{Lno2-pr-1}\ \ldots\ j_{Lno2-p}$
The right lobe reordered is:
$j_{Lno2-p}\ \ldots\ j_{Lno2-pr-1}$
The low unordered segment is:
$j_{Lno2-p-1}\ \ldots\ j_0$
Also, in FIG. 63, the polynomial summing function parameters are:

$ln\_b0=(Ln-3)-(2*p)+lnm2$ $ln\_b1=(Ln-2)-(2*p)+lnm2$ $ss11=(ln-rr0-1)+(p-pr)$ $se11=(ln\_n1\_cnt-1)-(p-pr)$ $sn11=ln\_n1\_cnt$ $sf11=-1$ In the binary loop index, for alignment state: $b_0=r_{r0}$, the high unordered segment is:
$k_0\ \ldots\ k_{Lno2-p-1}$
The left lobe is:
$k_{Lno2-p}\ \ldots\ k_{Lno2-pr-1}$
The left lobe reordered is:
$k_{Lno2-pr-1}\ \ldots\ k_{Lno2-p}$
The middle segment is:
$k_{Lno2-pr}\ \ldots\ k_{2p-lnm2}\ b_1$
The right lobe is:
$b_0\ j_{Ln-3-2p-1+lnm2}\ \ldots\ j_{Lno2-p}$
The right lobe reordered is:
$j_{Lno2-p}\ \ldots\ j_{Ln-3-2p-1+lnm2}\ b_0$
The low unordered segment is:
$j_{Lno2-p-1}\ \ldots\ j_0$
Again, in FIG. 63, the polynomial summing function parameters are:

$ln\_b0=lno2+pr$ $ln\_b1=Ln-2-(2*p)+lnm2$ $ss11=(p-pr)$ $se11=ln\_n1\_cnt-(p-pr)$ $sn11=ln\_n1\_cnt+1$ $sf11=-1$ In the binary loop index, for alignment state: $b_0<r_{r0}$, the high unordered segment is:
$k_0\ \ldots\ k_{Lno2-p-1}$
The left lobe is:
$k_{Lno2-p}\ \ldots\ k_{Lno2-pr-1}$
The left lobe reordered is:
$k_{Lno2-pr-1}\ \ldots\ k_{Lno2-p}$
The middle segment is:
$k_{Lno2-pr}\ \ldots\ k_{Ln02+pr-1+lnm2}$
The right lobe is:
$k_{Lno2-pr+lnm2}\ \ldots\ k_{2p-lnm2}\ b_1\ b_0\ j_{Ln-3-2p-1+lnm2}\ \ldots\ j_{Lno2-p}$
The right lobe reordered is:
$j_{Lno2-p}\ \ldots\ j_{Ln-3-2p-1}\ b_0\ b_1\ k_{2p-lnm2}\ \ldots\ k_{Lno2+pr+lnm2}$
The low unordered segment is:
$j_{Lno2-p-1}\ \ldots\ j_0$ Again, in FIG. 63, the polynomial summing function parameters are:

$ln\_b0=(2*p)+2-lnm2$ $ln\_b1=(2*p)+1-lnm2$ $ss11=(p-pr)$ $se11=(ln\_n1\_cnt+1)-(p-pr)$ $sn11=ln\_n1\_cnt+2$ $sf11=-1$ Also, in FIG. 63, at portion α thereof, the polynomial index functions handle the left lobe (sum12), middle subsegment (sum11), and the right lobe (sum10). For the base-3 algorithm, the base parameter is changed from 2 to 3, sums are scaled by powers of 3 rather than 2 for the weights index assembly, and eight weights are computed rather than three for the butterfly computation.

Figure 64:
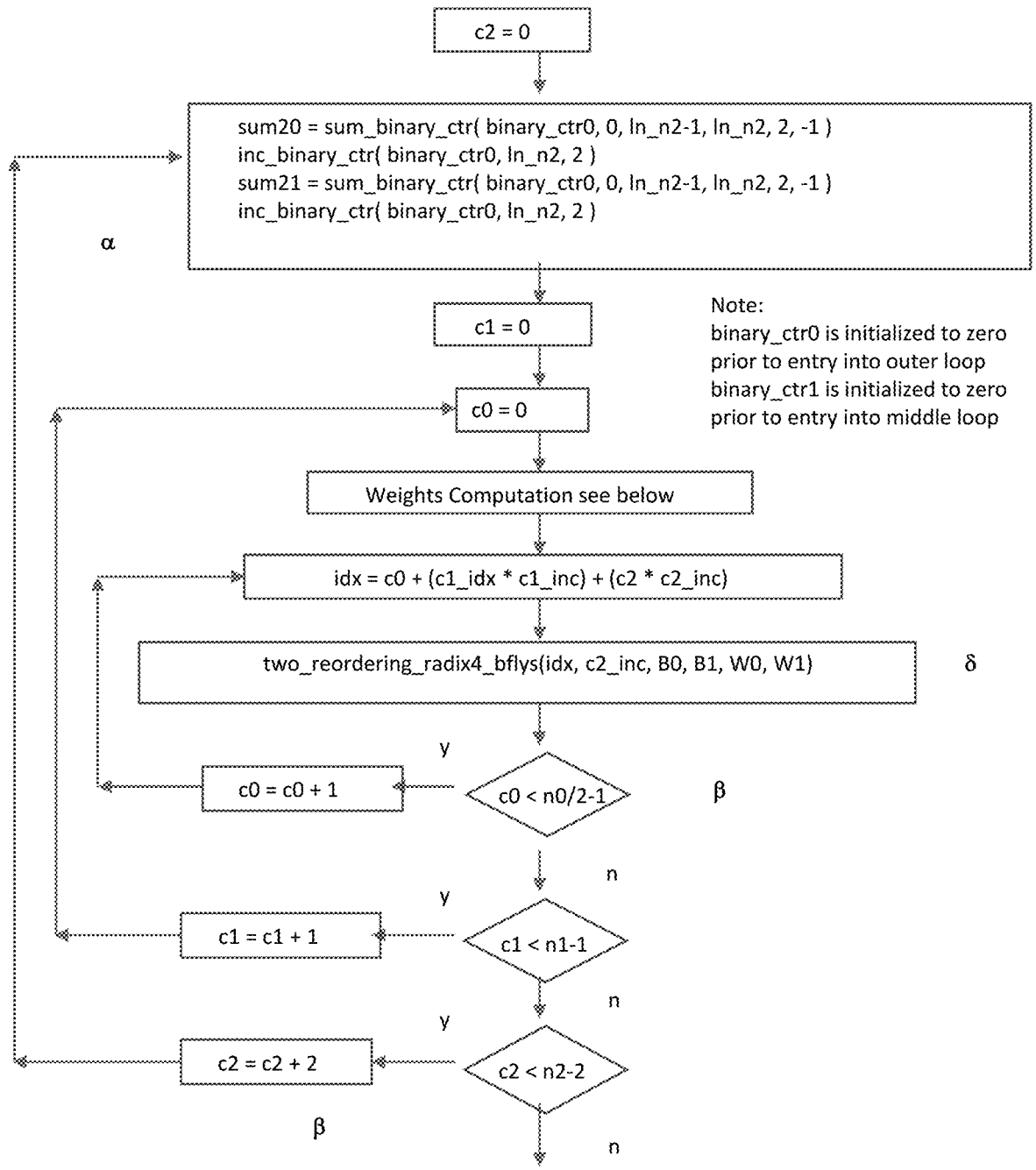
FIG. 64 is a flow diagram illustrating a function, in accordance with an embodiment of the present disclosure.

Hybrid9_reordering_bflys_b0eqrr(Ln, p, np2). The binary loop index for the last Radix-4/Radix-9 pass is:
$r_l\ r_{l0}\ r_{r0}\ r_r$
| | | |
$k_0\ k_1\ b_1\ k_{2p-lnm2}\ \ldots\ k_{lno2+pr+lnm2}\ k_{lno2-pr}\ \ldots\ k_{lno2+pr+1+lnm2}\ k_{lno2-pr-1}\ \ldots\ k_{lno2-p}\ b_0\ j_0$
reordered left lobe middle unordered segment reordered right lobe
The loop parameters are:

$ln\_n2=2$ $ln\_c2\_inc=Ln-2$ $ln\_n1=(lno2+p-1)-(lno2-p)+1=2p-1+lnm2$ if $np2>1$ $ln\_c1\_inc=2$ else $ln\_c1\_inc=3$ $ln\_n0=2$ Turning to FIG. 64, at portion α thereof, the polynomial index function bit-reverses the two element sub-segment represented in the binary index above on the far left. In FIG. 64, at portion β thereof, the base-3 algorithm unrolls the inner and outer loop by 3: c2=c2+3, c0</n0/3. In FIG. 64, at portion δ thereof, the function two_reordering_radix4_bflys is replaced by the function three_reordering_radix9_bflys for the base-3 algorithm. This function utilizes three Radix-9 butterflies for the reordering configuration.

Turning to FIG. 65, at portion α thereof, the polynomial index functions handle the reordered left lobe, the middle unordered sub-segment, and the reordered right lobe. The polynomial summing function parameter assignments are:

if $r_{r0}>2$ $se21=ln\_n1\_cnt-(np2-1)$ else $se21=ln\_n1\_cnt-1$ end if $r_{r0}>1$ $sn21=ln\_n1\_cnt+1$ else $sn21=ln\_n1\_cnt$ end In FIG. 65, at portion β thereof, eight weights rather than three are utilized for the base-3 algorithm.

Similar to the four-bit reordering FFT of Section 6, the equations relating the number of two-bit reordering passes (np2) and the tile size used in the last Radix-2/Radix-3 pass are:

$P_2=Ln/2-np2-1$ First pass for two-bit reordering
$Lt=1+np2$ Tile size for last pass Radix-2/3

As the value of np2 is increased, more two-bit reordering is done, and the tile size increases providing better data locality in the vector access sequence. This results in more efficient use of local compute resources.

Table-driven hybrid FFT with two-point reordering for base-2 or base-3. Reordering Radix-4 last pass: This algorithm uses a table-driven four-point reordering Radix-4 butterfly for the last pass. The two-point reordering hybid9 design is "converted" to the table-driven Radix-4-based design tagged hybrid10. This algorithm uses a 4×4 sub-tile for the table-based reordering and, therefore, the table length is one-fourth the size compared to the hybrid9 FFT design.

The hybrid9 design is modified to create the hybrid10 FFT: The general constraint ($ln\_b_1 < r_{I0}$) puts a limit on the number of two-bit reordering passes np2 for a particular size vector Ln. These values are similar but not identical to the hybrid9 values.

General constraint: $ln\_b_1 < r_{I0}$:

Even powers of two:

$ln\_b_1 < r_{I0}$ $Ln-1-(2*pr) < lno2+pr-1$ $lno2-(2*pr) \leq pr$ $lno2 < 3*pr$ $lno2/3 < pr$ Example: Ln=12

$6/3 < pr$ $pr(\max)=3$ $np2(\max)=(lno2-1)-pr(\max)$ $np2(\max)=5-3=2$

Odd powers of two:

$ln\_b_1 < r_{I0}$ $Ln-1-(2*pr)-lnm2 < lno2+pr-1+lnm2$ $Ln-1-(2*pr)-1 < lno2+pr$ $lno2-(2*pr)-2 \leq pr$ $lno2-2 < 3*pr$ $(lno2-2)/3 < pr$ Example: Ln=13

$(6-2)/3 < pr$ $1 < pr$ $pr(\max)=2$ $np2(\max)=lno2-1-pr(\max)$ $np2(\max)=5-2=3$ Returning to FIG. 61, at portion α thereof, odd powers of 2 and 3 execute the Radix-2/Radix-3 butterfly to align the computation with the last Radix-4 pass. The last pass is a table-driven four-bit reordering Radix-4 butterfly. In FIG. 61, at portion β thereof, the parameter definitions, given np2, are:

$np0=Ln/2-np2-1$ $r_{r0}=np2+1$ $r_{I0}=Ln-np2-2$ $pr=Ln-np2-1$

In FIG. 61, portion δ thereof is referring to the double loop parameter assignments associated with FIG. 9, Hybrid10_multiple_dit_butterflys:

$Ln\_ng=(2*p)+(Ln \ \& \ 0x1)$ $Ln\_nb=Ln-2-Ln\_ng$

Also, in FIG. 61, at portion ε thereof, there is a special function for the next-to-last Radix-4/Radix-9 pass. The reordering butterfly function is: Hybrid10_reordering_bflys_b1ltrl(Ln, p, np2) (see FIG. 62).

General constraint: $b1 < r_{I0}$. The loop parameters are:

$ln\_n2=lno2-(p-1)$ $ln\_c2\_inc=lno2+(p-1)+lnm2$ $ln\_n1=(2*(p-1))-2+lnm2$ $ln\_c1\_inc=lno2-(p-1)$ if $(r_{I0} < 3)$ $ln\_c1\_inc=ln\_c1\_inc+2$ $ln\_n0=lno2-(p-1)$ $ss2=0$ $se2=lno2-p$ $sn2=lno2-p+1$ $sf2=-1$ Returning to FIG. 62, the summing functions computing the weights index for the various loop index segments have identical parameter values for the hybrid9 and hybrid10 designs. With respect to the b-field alignment with $r_{r0}$, only the values of the parameters ln_b0 and ln_b1 are modified for the hybrid10 algorithm.

In the binary loop index, for alignment state: $b_0 > r_{r0}$:

$ln\_b0=(Ln-2)-(2*p)-lnm2;$ $ln\_b1=(Ln-1)-(2*p)-lnm2;$

In the binary loop index, for alignment state: $b_0=r_{r0}$:

$ln\_b0=lno2+pr-1+lnm2;$ $ln\_b1=Ln-1-(2*p)-lnm2;$

In the binary loop index, for alignment state: $b_0 < r_{r0}$:

$$ln\_b0=(2*p)+1+lnm2;$$

$$ln\_b1=(2*p)+lnm2;$$

Hybrid10_reordering_bflys_b0eqrr(Ln, p, np2). The binary loop index for the next-to-last Radix-4/Radix-9 pass is:

$r_l$ $r_{l0}$ $r_{r0}$ $r_r$
| | | |
$k_0$ $k_1$ $k_2$ $b_1$ $k_{2p+lnm2}$ . . . $k_{lno2+pr+lnm2}$ $k_{lno2-pr}$ . . . $k_{lno2+pr+1+lnm2}$ $k_{lno2-pr-1}$ $k_3$ $b_0$ $j_1$ $j_0$ reordered left lobe  middle unordered segment  reordered right lobe The loop parameters assignments are:

$$ln\_n2\_cnt=lno2-(p-1)$$

$$ln\_c2\_inc=lno2+(p-1)+lnm2$$

$$ln\_n1\_cnt=(2*(p-1))-1+lnm2$$

if $np2>1$ $$ln\_c1\_inc=3$$

else $$ln\_c1\_inc=4$$

end $$ln\_n0\_cnt=lno2-p$$

$$ln\_b0=lno2-p$$

if $np2>1$ $$ln\_b1=lno2+(p-1)-1+lnm2$$

else $$ln\_b1=lno2-(p-1)$$

end

Returning to FIG. 64, at portion α thereof, the polynomial index functions bit-reverse the three element sub-segment represented in the binary index above on the far left. In FIGS. 64 and 65, all other logic represented in these figures is identical for the two designs.

Figure 66:
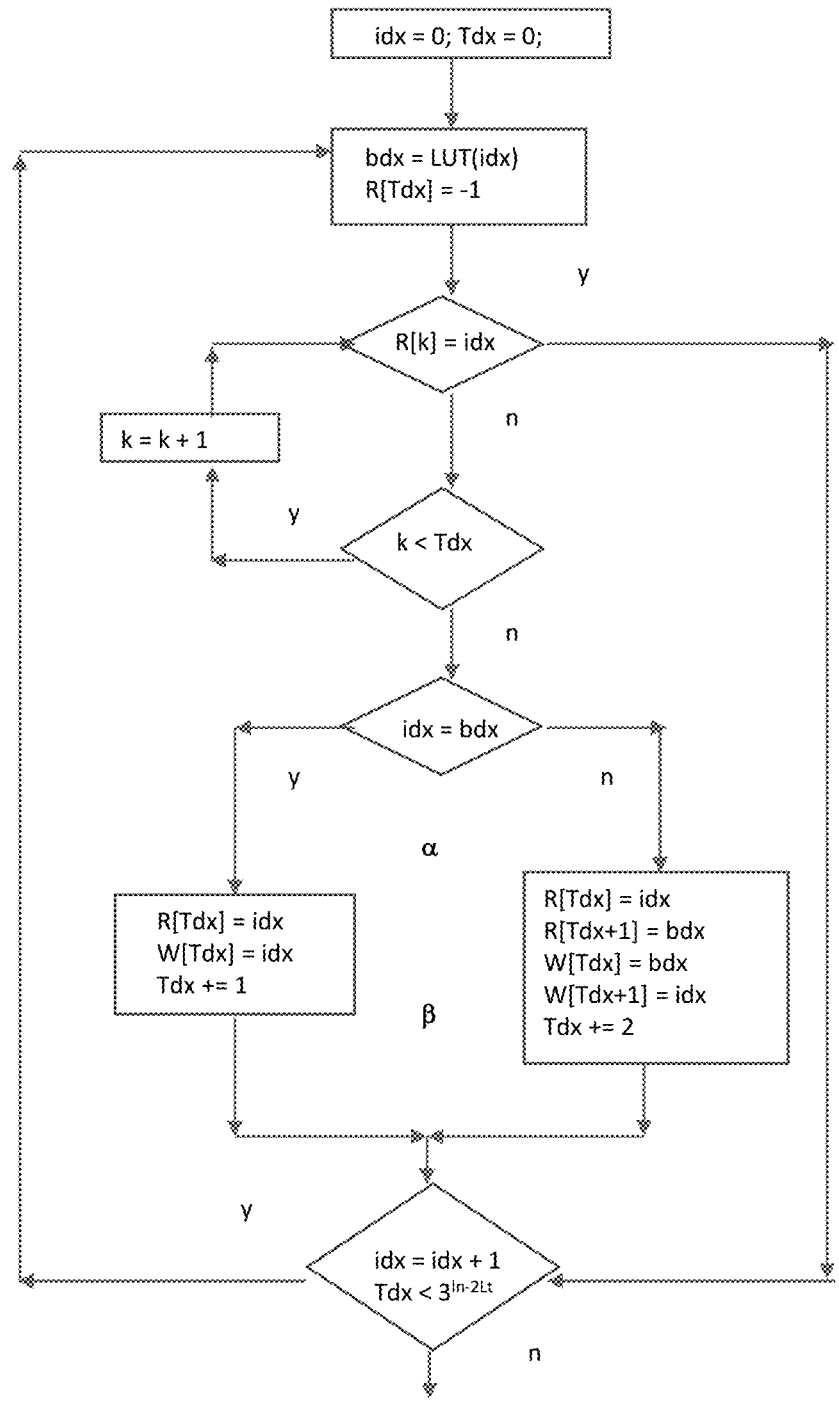
FIG. 66 is a flow diagram illustrating a function, in accordance with an embodiment of the present disclosure.

The Radix-4 last pass processes 4×4 sub-tiles within the larger $2^{Lt} \times 2^{Lt}$ tile. Given that np2 is the number of two-bit reordering passes prior to the last Radix-4 pass:

$P_2$=Ln/2–np2–1 First pass for two-bit reordering
Lt=2+np2 Tile size for the last Radix-4 pass Turning to FIG. 66, at portion β thereof, the table length Tdx grows by one or two with each table assignment. The table length is reduced to $2^{Ln-2Ln}$ for Radix-4 base-2 if the tile sized double loop executes in the reordering butterfly.

Returning to FIG. 67, the 4×4 sized sub-tiles are processed, twelve W's are assigned, and four Radix-4 butterflies are executed. The 4×4 reordering sequence is:

$c_{00}=a_{00}$ $c_{01}=a_{20}$ $c_{02}=a_{10}$ $c_{03}=a_{30}$
$c_{10}=a_{02}$ $c_{11}=a_{22}$ $c_{12}=a_{12}$ $c_{13}=a_{32}$
$c_{20}=a_{01}$ $c_{21}=a_{21}$ $c_{22}=a_{11}$ $c_{23}=a_{31}$
$c_{30}=a_{03}$ $c_{31}=a_{23}$ $c_{32}=a_{13}$ $c_{33}=a_{33}$

Returning to FIG. 67, at portion δ thereof, there is a $2^{Lt} \times 2^{Lt}$ double tiling loop, with R/W tables of length $2^{Ln-2Lt}$ where Lt>1.

Reordering butterfly driver table size. The table size as represented in FIG. 43 is N/4 for base-2 and N/9 for base-3. This could represent a large resource requirement, and the following presents a technique of reducing the size of this table at the cost of requiring additional local compute resources.

Figure 67:
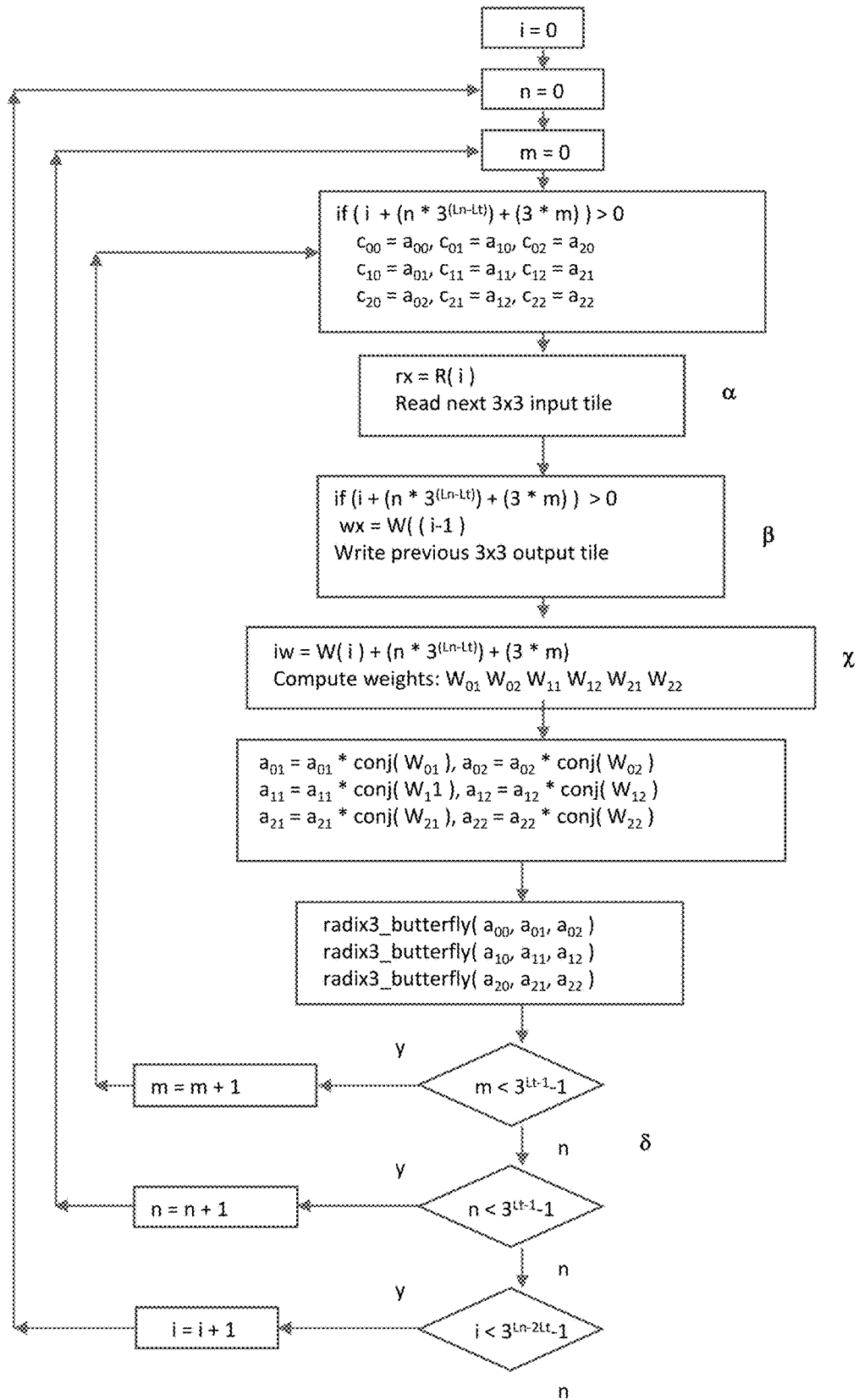
FIG. 67 is a flow diagram illustrating a function, in accordance with an embodiment of the present disclosure.

The method is to "transfer" the inner double loop in the table generation function depicted in FIG. 43 to the reordering butterfly function. This is represented in FIGS. 66 and 67. The base-3 version is used for illustration. The table length is reduced at the cost of a more complex loop structure. This method works for both base-2 and base-3 FFTs and can be used in the four-bit reordering FFT of Section 6. Either of the methods of FIGS. 42-43 or FIGS. 66-67 will work for the table-driven last Radix-4 pass executed for the hybrid10 design.

Returning to FIG. 66, at portion α thereof, the "read before write" loop policy is utilized for tile swapping. In FIG. 66, at portion β thereof, the table length Tdx grows by one or two with each table assignment. The table length is reduced to $2^{Ln-2Lt}$ for base-2 or $3^{Ln-2Lt}$ for base-3.

Returning to FIG. 67, at portion α thereof, the input 3×3 sub-tile is:

$$a_{00}=T(rx+(n*3^{(Ln-Lt)})+(3*m)$$

$$a_{01}=T((rx+1)+(n*3^{(Ln-Lt)})+(3*m))$$

$$a_{02}=T((rx+2)+(n*3^{(Ln-Lt)})+(3*m))$$

$$a_{10}=T(rx+(3^{Ln-1})+(n*3^{(Ln-Lt)})+(3*m))$$

$$a_{11}=T(rx+(3^{Ln-1})+1+(n*3^{(Ln-Lt)})+(3*m))$$

$$a_{12}=T(rx+(3^{Ln-1})+2+(n*3^{(Ln-Lt)})+(3*m))$$

$$a_{20}=T(rx+(2*(3^{Ln-1}))+(n*3^{(Ln-Lt)})+(3*m))$$

$$a_{21}=T(rx+(2*(3^{Ln-1}))+1+(n*3^{(Ln-Lt)})+(3*m))$$

$$a_{22}=T(rx+(2*(3^{Ln-1}))+2+(n*3^{(Ln-Lt)})+(3*m))$$

Also, in FIG. 67, at portion β thereof, the output 3×3 sub-tile is:

$$T(wx+(n*3(Ln-Lt))+(3*m))=c00,$$

$$T(wx+1+(n*3(Ln-Lt))+(3*m))=c01,$$

$$T(wx+2+(n*3(Ln-Lt))+(3*m))=c02$$

$$T(wx+(3Ln-1)+(n*3(Ln-Lt))+(3*m))=c20,$$

$$T(wx+(3Ln-1)+1+(n*3(Ln-Lt))+(3*m))=c21,$$

$$T(wx+(3Ln-1)+2+(n*3(Ln-Lt))+(3*m))=c22$$

$$T(wx+(2*(3Ln-1))+(n*3(Ln-Lt))+(3*m))=c10,$$

$$T(wx+(2*(3Ln-1))+1+(n*3(Ln-Lt))+(3*m))=c11,$$

$$T(wx+(2*(3Ln-1))+2+(n*3(Ln-Lt))+(3*m))=c12$$

Furthermore, in FIG. 67, at portions α and β thereof, the read-before-write logic ensures a coherent swap sequence. Also, in FIG. 67, at portion χ thereof, the weights computations are:

$$k01=iw*2*pi/N \rightarrow W01=eik01$$

$$k02=iw*4*pi/N \rightarrow W02=eik02$$

$$k11=iw+1*2*pi/N \rightarrow W11=eik11$$

$$k12=iw+1*4*pi/N \rightarrow W12=eik12$$

$k21=iw+2*2*pi/N \rightarrow W21=eik21$ $k22=iw+2*4*pi/N \rightarrow W22=eik22$

In FIG. 67, at portion δ thereof, there is a $3^{Lt} \times 3^{Lt}$ double tiling loop, with R/W tables of length $3^{Ln-2Lt}$.

Figure 68:
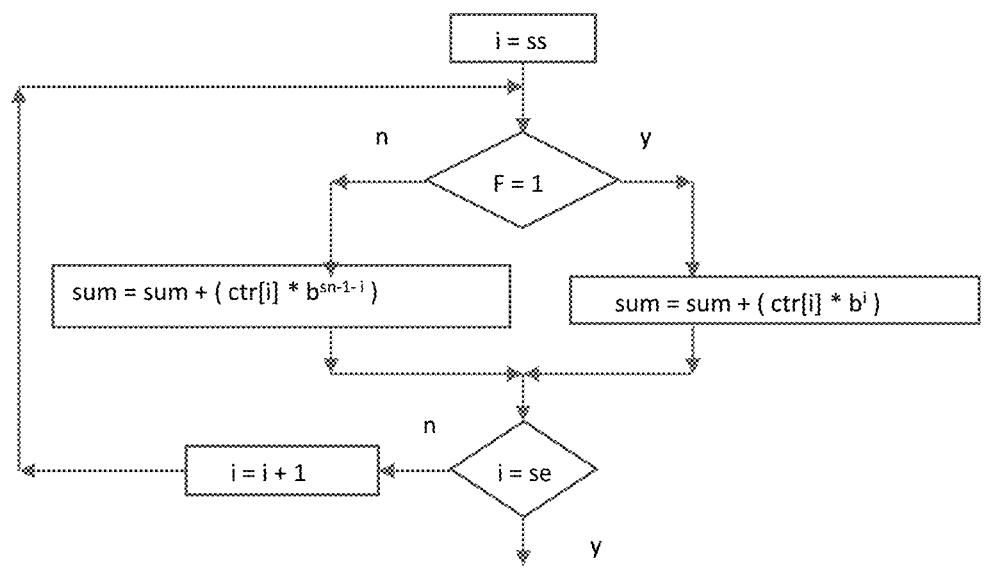
FIG. 68 is a flow diagram illustrating a binary counter summing function, in accordance with an embodiment of the present disclosure.

The binary counter summing function depicted in FIGS. 64, 65, 66, and 67 is a variation of the logic of FIG. 47 and is represented in FIG. 68. The parameters are:
 ss: starting index in the sum.
 se: ending index in the sum
 sn: Polynomial exponent used for bit reversing sums. The power term in the summing equation is bsn−1−i for bit reversal and $b_1$ for an ordered sum.
 b: polynomial base, equals 2 or 3.
 F: Indicates normal or bit-reversed sums.

Binary counter incrementing function is represented in FIGS. 64, 65, 66, and 67 by the function: inc_binary(binary_ctr, Ln, b). (See FIG. 46 with binary_ctr→d[ ], Ln→Hm, b→b).

The summing function of FIG. 68 and the binary counter incrementing function can be used for all the reordering FFTs above providing a more uniform conversion between base-2 and base-3. The binary counters are initialized to zero prior to the beginning of the execution of the associated loop. For any pass p: Nw=(2*p)+lnm2.

For Reordering_fft_dit_ip, see FIG. 10.

For Reordering_radix4_butterflys_b1ltrl_b0gtrr, see FIG. 12. In FIG. 12, at portion δ thereof, a binary counter is initialized to zero prior to entry into the outer loop controlled by loop counter c2. Each loop pass, this counter is incremented by one. Each pass through the loop controlled by counter c2:
 l=sum_binary_ctr(binary_ctr, ss, se, sn, b, F)
 inc_binary_ctr(binary_ctr, sn, b)
The butterfly weights computation is:

$iw=l*b^{Ln-2-Nw}$ $W_1=e^{jiw2pi/N} \ W_2=e^{jiw4pi/N} \ W_3=e^{jiw6pi/N}$

The parameters are:
 ss=0
 se=Ln_n3−1
 sn=Ln_n3
 b=2 or 3.
 F=−1
The same sequence will work for the functions reordering_radix4_butterflys_b0eqrl and reordering_radix4_butterflys_b1eqrl.

In FIG. 12: Reordering_radix4_butterflys_b1ltrl_b0gtrr. In FIG. 12, at portion δ thereof, two segments are combined for the assignment of the W's utilized for the butterfly computation. The high order scrambled segment is reordered with a polynomial summing function and combined with the lower order unscrambled segment in reverse order. Two groups of W's are utilized since the outer loop c3 is unrolled. The binary counter is initialized to zero prior to entry into the outer loop. Since two groups of weights are utilized, this counter is incremented by two each outer loop pass.

Each pass through the loop controlled by counter c2:
 l0=sum_binary_ctr(binary_ctr, ss, se, sn, b, F)
 inc_binary_ctr(binary_ctr, sn, b)
 l1=sum_binary_ctr(binary_ctr, ss, se, sn, b, F)
 inc_binary_ctr(binary_ctr, sn, b)
The butterfly weights computation is:

$l0=l0+(c1*b^{ln\_n3})$ $iw0=l0*b^{Ln-2-Nw}$ $W_{01}=e^{jiw02pi/N} \ W_{02}=e^{jiw04pi/N} \ W_{03}=e^{jiw06pi/N}$ $l1=l1+(c1*2^{Ln\_n3})$ $iw1=l1*b^{Ln-2-Nw}$ $W_{11}=e^{jiw12pi/N} \ W_{12}=e^{jiw14pi/N} \ W_{13}=e^{jiw16pi/N}$ The parameters are:
 ss=0
 se=Ln_n3−1
 sn=Ln_n3
 b=2 or 3.
 F=−1
The same sequence will work for the function reordering_radix4_butterflys_b0eqrr.

For Reordering_fft_dit_ip_b_align_r, see FIG. 22. Section 4, FIG. 23: Reordering_butterflys_b_align_rl. The summing function of FIG. 68 is modified such that the value of the loop counter "i" is incremented by 2 rather than 1, tagged "by2." There are two binary counters: one which is incremented each pass through the loop controlled by counter c2 and one for the loop controlled by counter c0. Each binary counter is initialized to zero prior to loop entry. The outer loop summing function sums in bit-reversed order, while the inner loop function sums in normal order.

Returning to FIG. 23, at portion χ thereof, each pass through the loop controlled by counter c2:
 s1=sum_binary_ctr_by2(binary_ctr1, ss, se, sn, b, F)
 inc_binary_ctr(binary_ctr1, sn, b)
The parameters are:
 ss=1−lnm2
 se=Ln_n2−1
 sn=Ln_n2
 b=2 or 3.
 F=−1
Each pass through the loop controlled by counter c0:
 s0=sum_binary_ctr by2(binary ctr0, ss, se, sn, b, F)
 inc_binary_ctr(binary_ctr0, sn, b)
The butterfly weights computation is $itw=s0+s1$ $iw=itw*b^{(Ln-2-Nw)}$ $W_1=e^{jiw2pi/N} \ W_2=e^{jiw4pi/N} \ W_3=e^{jiw6pi/N}$ The parameters are:
 ss=1
 se=Ln_n0−1
 sn=Ln_n0
 b=2 or 3.
 F=1
In FIGS. 28, 31, and 34, the outer loop summing function produces a bit-reversed value, whereas the inner loop summing function produces a normal ordered value. Also, in FIG. 28: Reordering_butterflys_b_align_rr_lnm4eq2. Each pass through the loop controlled by counter c2:
 s1=sum_binary_ctr_by2 (binary_ctr1, ss, se, sn, b, F)
 inc_binary_ctr(binary_ctr1, sn, b)
The parameters are:
 ss=1−lnm2
 se=Ln_n1−2
 sn=Ln_n1−1 b=2 or 3.
F=−1
Each pass through the loop controlled by counter c0:
  s0=sum_binary_ctr_by2 (binary_ctr0, ss, se, sn, b, F)
  inc_binary_ctr(binary_ctr0, sn, b)
The parameters are:
  ss=1
  se=Ln_n0−1
  sn=Ln_n0
  b=2 or 3.
  F=1
The butterfly weights computation is:

$$itw=s0+s1$$

$$iw=itw*b^{(Ln-2-Nw)}$$

$$W_1=e^{jiw2pi/N} \quad W_2=e^{jiw4pi/N} \quad W_3=e^{jiw6pi/N}$$

Returning to FIG. 31, Reordering_butterflys_b_align_rr_lnm4eq3. Each pass through the loop controlled by counter c2:
  s01=sum_binary_ctr_by2 (binary_ctr1, ss, se, sn, b, F)
  inc_binary_ctr(binary_ctr1, sn, b)
  s11=sum_binary_ctr_by2 (binary_ctr1, ss, se, sn, b, F)
  inc_binary_ctr(binary_ctr1, sn, b)
The parameters are:
  ss=1−lnm2
  se=Ln_n1−1
  sn=Ln_n1
  b=2 or 3.
  F=−1
Each pass through the loop controlled by counter c0:
  s0=sum_binary_ctr_by2 (binary_ctr0, ss, se, sn, b, F)
  inc_binary_ctr(binary_ctr0, sn, b)
The parameters are:
  ss=1
  se=Ln_n0−1
  sn=Ln_n0
  b=2 or 3.
  F=1
The butterfly weights computation is:

$$itw=s0+s01$$

$$iw0=itw*b^{(Ln-2-Nw)}$$

$$W_{01}=e^{jiw02pi/N} \quad W_{02}=e^{jiw04pi/N} \quad W_{03}=e^{jiw06pi/N}$$

$$itw=s0+s11$$

$$iw1=itw*b^{(Ln-2-Nw)}$$

$$W_{11}=e^{jiw12pi/N} \quad W_{12}=e^{jiw14pi/N} \quad W_{13}=e^{jiw16pi/N}$$

Returning to FIG. 34: Reordering butterflys b align rr. Each pass through the loop controlled by counter c2:
  s01=sum_binary_ctr_by2 (binary_ctr1, ss, se, sn, b, F)
  inc_binary_ctr(binary_ctr1, sn, b)
  s11=sum_binary_ctr_by2 (binary_ctr1, ss, se, sn, b, F)
  inc_binary_ctr(binary_ctr1, sn, b)
The parameters are:
  ss=1
  se=2
  sn=Ln_n2
  b=2 or 3.
  F=−1
Each pass through the loop controlled by counter c0:
  s0=sum_binary_ctr_by2 (binary_ctr0, ss, se, sn, b, F)
  inc_binary_ctr(binary_ctr0, sn, b)

The parameters are:
  ss=1
  se=2
  sn=Ln_n0
  b=2 or 3.
  F=1
The butterfly weights computation is:

$$itw=s0+s01+(c1*b^{ln\_n2})$$

$$iw0=itw*b^{(Ln-2-Nw)}$$

$$W_{01}=e^{jiw02pi/N} \quad W_{02}=e^{jiw04pi/N} \quad W_{03}=e^{jiw06pi/N}$$

$$itw=s0+s11+(c1*b^{ln\_n2})$$

$$iw1=itw*b^{(Ln-2-Nw)}$$

$$W_{11}=e^{jiw12pi/N} \quad W_{12}=e^{jiw14pi/N} \quad W_{13}=e^{jiw16pi/N}$$

Returning to FIG. 37, one summing function incremented four times to produce the four weights bit-reversed indices utilized for the reordering butterfly. The summing index is incremented by 1. Each pass through the loop controlled by counter c2:
  s0=sum_binary_ctr (binary_ctr, ss, se, sn, b, F)
  inc_binary_ctr(binary_ctr, sn, b)
  s1=sum_binary_ctr (binary_ctr, ss, se, sn, b, F)
  inc_binary_ctr(binary_ctr, sn, b)
  s2=sum_binary_ctr (binary_ctr, ss, se, sn, b, F)
  inc_binary_ctr(binary_ctr, sn, b)
  s3=sum_binary_ctr (binary_ctr, ss, se, sn, b, F)
  inc_binary_ctr(binary_ctr, sn, b)
The butterfly weights computation is:

$$itw=s0+(c1*b^{ln\_n2})$$

$$iw0=itw*b^{(Ln-2-Nw)}$$

$$W_{01}=e^{jiw02pi/N} \quad W_{02}=e^{jiw04pi/N} \quad W_{03}=e^{jiw06pi/N}$$

$$itw=s1+(c1*b^{ln\_n2})$$

$$iw1=itw*b^{(Ln-2-Nw)}$$

$$W_{11}=e^{jiw12pi/N} \quad W_{12}=e^{jiw14pi/N} \quad W_{13}=e^{jiw16pi/N}$$

$$itw=s2+(c1*b^{ln\_n2})$$

$$iw2=itw*b^{(Ln-2-Nw)}$$

$$W_{21}=e^{jiw22pi/N} \quad W_{22}=e^{jiw24pi/N} \quad W_{23}=e^{jiw26pi/N}$$

$$itw=s3+(c1*b^{ln\_n2})$$

$$iw3=itw*b^{(Ln-2-Nw)}$$

$$W_{31}=e^{jiw32pi/N} \quad W_{32}=e^{jiw34pi/N} \quad W_{33}=e^{jiw36pi/N}$$

The parameters are:
  ss=0;
  se=Ln_n2−1;
  sn=Ln_n2;
  b=2 or 3;
  F=−1

Reordering_fft_dit_ip_hybrid5: weights index computed for P2b>0. Returning to FIG. 40, at portion β thereof, for medium butterfly spans, the Radix-4 two-bit reordering operator of Section 4 utilizes two simultaneous butterfly computations. The weights assignment is a function of the first two-bit reordering pass: P2b.

Returning to FIG. 23, Hybrid5 reordering_butterflys_b_align_rl: there are two binary counters, and each binary counter is initialized to zero prior to loop entry. Also, in FIG. 23, at portion χ thereof, each pass through the loop controlled by counter c2:
  s1=sum_binary_ctr_by2(binary_ctr1, ss, se, sn, b, F)
  ss=1+lnm2; se=Ln_n2−(2*$P_{2b}$)−1; sn=Ln_n2; b=2 or 3; F=−1
  s2=sum_binary_ctr(binary_ctr1, ss, se, sn, b, F)
  ss=Ln_n2−(2*$P_{2b}$); se=Ln_n2−1; sn=Ln_n2; b=2 or 3; F=−1
  inc_binary_ctr(binary_ctr1, sn, b)
  s1=s1+s2
Each pass through the loop controlled by counter c0:
  s0=sum_binary_ctr_by2(binary_ctr0, ss, se, sn, b, F)
  inc_binary_ctr(binary_ctr0, sn, b)
  ss=(2*$P_{2b}$)+1; se=Ln_n0−1; sn=Ln_n0; b=2 or 3: F=1
The butterfly weights computation is:

$$itw=s0+s1$$

$$iw=itw*b^{(Ln-2-Nw)}$$

$$W_1=e^{jiw2pi/N}\ W_2=e^{jiw4pi/N}\ W_3=e^{jiw6pi/N}$$

Again, in FIG. 23: Hybrid5 reordering_butterflys_b_align_rr_lnm4eq2. Also, in FIG. 23, at portion χ thereof, each pass through the loop controlled by counter c1:
  s1=sum_binary_ctr_by2(binary_ctr1, ss, se, sn, b, F)
  ss=1−lnm2; se=Ln/2−(2*$P_{2b}$)−1; sn=Ln/2; b=2 or 3; F=−1
  s2=sum_binary_ctr(binary_ctr1, ss, se, sn, b, F)
  ss=Ln/2−(2*$P_{2b}$); se=Ln/2−1; sn=Ln/2; b=2 or 3; F=−1
  inc_binary_ctr(binary_ctr1, sn, b)

$$s1=s1+s2$$

Each pass through the loop controlled by counter c0:
  s0=sum_binary_ctr_by2(binary_ctr0, ss, se, sn, b, F)
  inc_binary_ctr(binary_ctr0, sn, b)
  ss=(2*$P_{2b}$)+1; se=Ln/2−1; sn=Ln/2; b=2 or 3: F=1
The butterfly weights computation is:

$$itw=s0+s1$$

$$iw=itw*b^{(Ln-2-Nw)}$$

$$W_1=e^{jiw2pi/N}\ W_2=e^{jiw4pi/N}\ W_3=e^{jiw6pi/N}$$

Again, in FIG. 23: Hybrid5 reordering_butterflys_b_align_rr_lnm4eq3. Also, in FIG. 23, at portion χ thereof, two sums are computed each pass through the loop controlled by counter c1:
  s01=sum_binary_ctr_by2(binary_ctr1, ss, se, sn, b, F)
  ss=1−lnm2; se=Ln_n1−(2*$P_{2b}$)−1; sn=Ln_n1; b=2 or 3; F=−1
  s02=sum_binary_ctr(binary_ctr1, ss, se, sn, b, F)
  ss=Ln_n1−(2*$P_{2b}$); se=Ln_n1−1; sn=Ln_n1; b=2 or 3; F=−1
  inc_binary_ctr(binary_ctr1, sn, b)
  s11=sum_binary_ctr_by2(binary_ctr1, ss, se, sn, b, F)
  s12=sum_binary_ctr(binary_ctr1, ss, se, sn, b, F)
  inc_binary_ctr(binary_ctr1, sn, b)
  s01=s01+s02
  s11=s11+s12
Each pass through the loop controlled by counter c0:
  s0=sum_binary_ctr_by2(binary_ctr0, ss, se, sn, b, F)
  inc_binary_ctr(binary_ctr0, sn, b)
  ss=(2*$P_{2b}$)+1; se=Ln_n0−1; sn=Ln_n0; b=2 or 3: F=1

The butterfly weights computation is:

$$itw=s0+s01$$

$$iw0=itw*b^{(Ln-2-Nw)}$$

$$W_{01}=e^{jiw02pi/N}\ W_{02}=e^{jiw04pi/N}\ W_{03}=e^{jiw06pi/N}$$

$$itw=s0+s11$$

$$iw1=itw*b^{(Ln-2-Nw)}$$

$$W_{11}=e^{jiw12pi/N}\ W_{12}=e^{jiw14pi/N}\ W_{13}=e^{jiw16pi/N}$$

Again, in FIG. 23: Hybrid5 reordering butterflys b align rr. Two sums are computed each pass through the loop controlled by counter c2:
  s01=sum_binary_ctr_by2(binary_ctr1, ss, se, sn, b, F)
  ss=0; se=Ln_n2−(2*$P_{2b}$)−1; sn=Ln_n2; b=2 or 3; F=−1
  s02=sum_binary_ctr(binary_ctr1, ss, se, sn, b, F)
  ss=Ln_n2−(2*$P_{2b}$); se=Ln_n2−1; sn=Ln_n2; b=2 or 3; F=−1
  inc_binary_ctr(binary_ctr1, sn, b)
  s11=sum_binary_ctr_by2(binary_ctr1, ss, se, sn, b, F)
  s12=sum_binary_ctr(binary_ctr1, ss, se, sn, b, F)
  inc_binary_ctr(binary_ctr1, sn, b)

$$s01=s01+s02$$

$$s11=s11+s12$$

Each pass through the loop controlled by counter c0:
  s0=sum_binary_ctr_by2(binary_ctr0, ss, se, sn, b, F)
  inc_binary_ctr(binary_ctr0, sn, b)
  ss=(2*P2b)+1; se=Ln_n0−1; sn=Ln_n0; b=2 or 3: F=1
The butterfly weights computation is:

$$itw=s0+s01$$

$$iw0=itw*b^{(Ln-2-Nw)}$$

$$W_{01}=e^{jiw02pi/N}\ W_{02}=e^{jiw04pi/N}\ W_{03}=e^{jiw06pi/N}$$

$$itw=s0+s11$$

$$iw1=itw*b^{(Ln-2-Nw)}$$

$$W_{11}=e^{jiw12pi/N}\ W_{12}=e^{jiw14pi/N}\ W_{13}=e^{jiw16pi/N}$$

Reordering_fft_dit_ip_hybrid7: weights index computed for $P_{4b}$>0. Reordering butterfly four bit b align rr(Ln, $P_{4b}$). Returning to FIG. 37, four-bit reversed indices are utilized for the reordering butterfly. Two binary counters are used. Each pass through the loop controlled by counter c2 (b=2 or 3):
  S20=sum_binary_ctr (binary ctr2, 0, ln_n2−1, ln_n2, b, −1)
  inc_binary_ctr(binary ctr2, ln_n2, b)
  S21=sum_binary_ctr (binary ctr2, 0, ln_n2−1, ln_n2, b, −1)
  inc_binary_ctr(binary ctr2, ln_n2, b)
  S22=sum_binary_ctr (binary ctr2, 0, ln_n2−1, ln_n2, b, −1)
  inc_binary_ctr(binary ctr2, ln_n2, b)
  S23=sum_binary_ctr (binary ctr2, 0, ln_n2−1, ln_n2, b, −1)
  inc_binary_ctr(binary ctr2, ln_n2, b)
Each pass through the loop controlled by counter c1:
  s10=sum_binary_ctr (binary_ctr1, 0, 2*(p−$P_{4b}$)−1, ln_n1, b, 1)
  s11=sum_binary_ctr (binary_ctr1, 2*(p−$P_{4b}$), ln_n1−2*(p−$P_{4b}$)−1, ln_n1, b, −1)

s12=sum_binary_ctr (binary_ctr1, ln_n1−2*(p−P$_{4b}$)−1, ln_n1, b, 1)
inc_binary_ctr(binary_ctr1, ln_n1, b)

$$s1=s10+s11+s12$$

The butterfly weights computation is:

$$itw=s20+(s1*b^{ln\_n2})$$

$$iw0=itw*b^{(Ln-2-Nw)}$$

$$W_{01}=e^{jiw02pi/N} \quad W_{02}=e^{jiw04pi/N} \quad W_{03}=e^{jiw06pi/N}$$

$$itw=s21+(s1*b^{ln\_n2})$$

$$iw1=itw*b^{(Ln-2-Nw)}$$

$$W_{11}=e^{jiw12pi/N} \quad W_{12}=e^{jiw14pi/N} \quad W_{13}=e^{jiw16pi/N}$$

$$itw=s22+(s1*b^{ln\_n2})$$

$$iw2=itw*b^{(Ln-2-Nw)}$$

$$W_{21}=e^{jiw22pi/N} \quad W_{22}=e^{jiw24pi/N} \quad W_{23}=e^{jiw26pi/N}$$

$$itw=s23+(s1*b^{ln\_n2})$$

$$iw3=itw*b^{(Ln-2-Nw)}$$

$$W_{31}=e^{jiw32pi/N} \quad W_{32}=e^{jiw34pi/N} \quad W_{33}=e^{jiw36pi/N}$$

Reordering driver table assignment: in FIGS. 43 and 66, one binary counter incremented each pass through the outer loop, producing a bit-reversed value.

Bdx=sum_binary_ctr (binary_ctr, ss, se, sn, b, F)
inc_binary_ctr(binary_ctr, ln_n1, b)

The parameters are:
ss=0
se=Ln−1
sn=Ln
b=2 or 3.
F=−1

Additional Butterfly Diagrams

Figure 69:
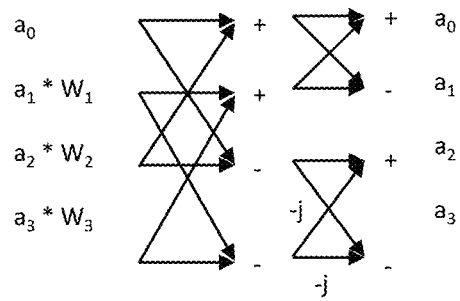
FIG. 69 is a butterfly diagram illustrating a Radix-4 butterfly, in accordance with an embodiment of the present disclosure.

FIG. 69 is a butterfly diagram illustrating a Radix-4 butterfly, in accordance with an embodiment of the present disclosure.

Figure 70:
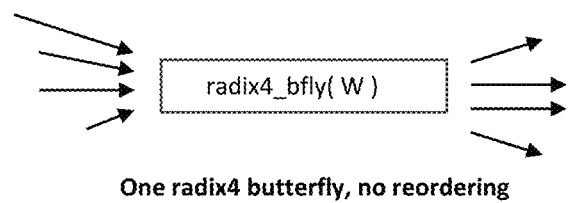
FIG. 70 is a butterfly diagram illustrating one Radix-4 butterfly with no reordering, in accordance with an embodiment of the present disclosure.

FIG. 70 is a butterfly diagram illustrating one Radix-4 butterfly with no reordering, in accordance with an embodiment of the present disclosure.

Figure 71:
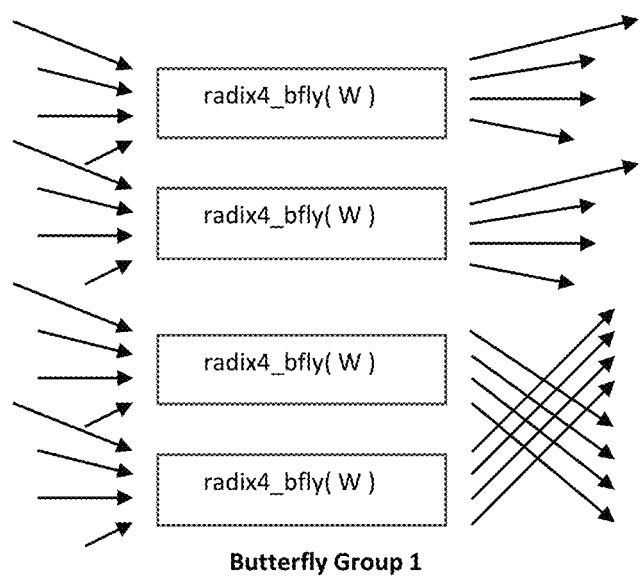
FIG. 71 is a butterfly diagram illustrating a first butterfly group of four Radix-4 butterflies, in accordance with an embodiment of the present disclosure.
Figure 72:
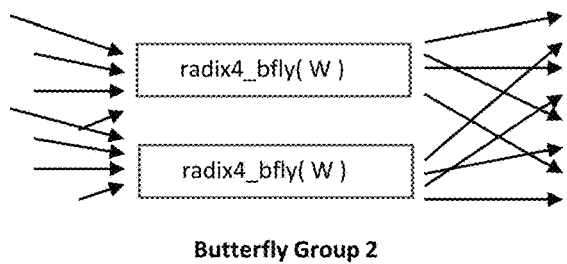
FIG. 72 is a butterfly diagram illustrating a second butterfly group of two Radix-4 butterflies, in accordance with an embodiment of the present disclosure.
Figure 73:
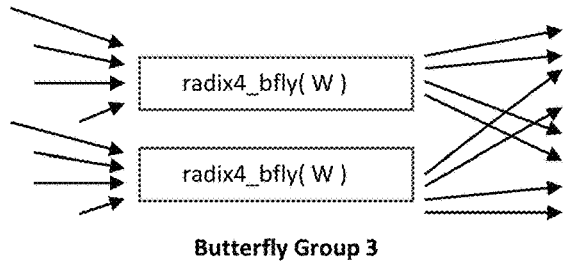
FIG. 73 is a butterfly diagram illustrating a third butterfly group of two Radix-4 butterflies, in accordance with an embodiment of the present disclosure.

FIG. 71 is a butterfly diagram illustrating a first butterfly group of four Radix-4 butterflies, in accordance with an embodiment of the present disclosure. FIG. 72 is a butterfly diagram illustrating a second butterfly group of two Radix-4 butterflies, in accordance with an embodiment of the present disclosure. FIG. 73 is a butterfly diagram illustrating a third butterfly group of two Radix-4 butterflies, in accordance with an embodiment of the present disclosure.

Figure 74:
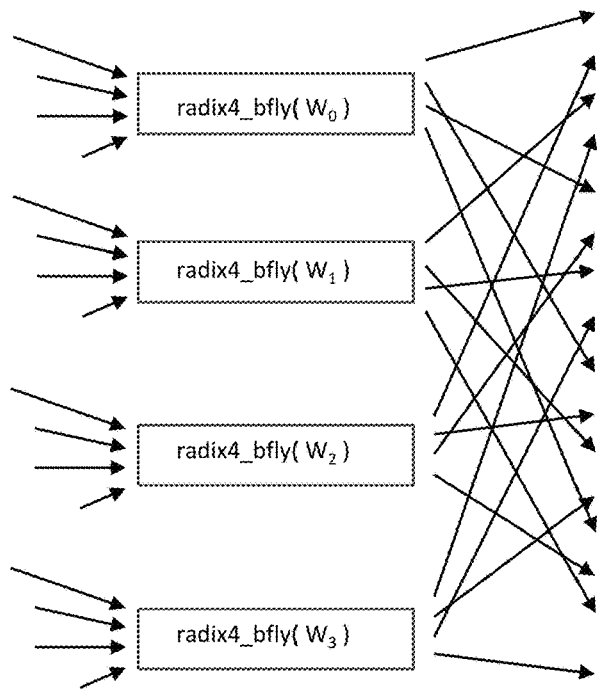
FIG. 74 is a butterfly diagram illustrating fused four-bit reordering Radix-4 butterflies, in accordance with an embodiment of the present disclosure.

FIG. 74 is a butterfly diagram illustrating fused four-bit reordering Radix-4 butterflies, in accordance with an embodiment of the present disclosure.

Figure 75:
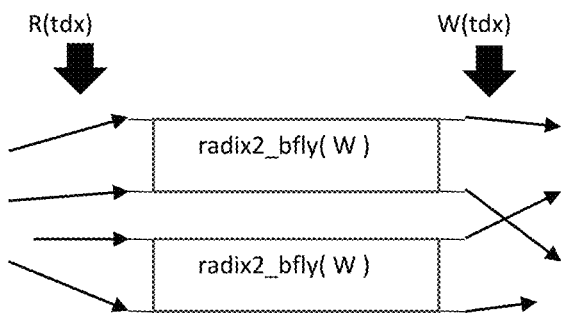
FIG. 75 is a butterfly diagram illustrating two Radix-2 butterflies with table-based reordering, in accordance with an embodiment of the present disclosure.
Figure 76:
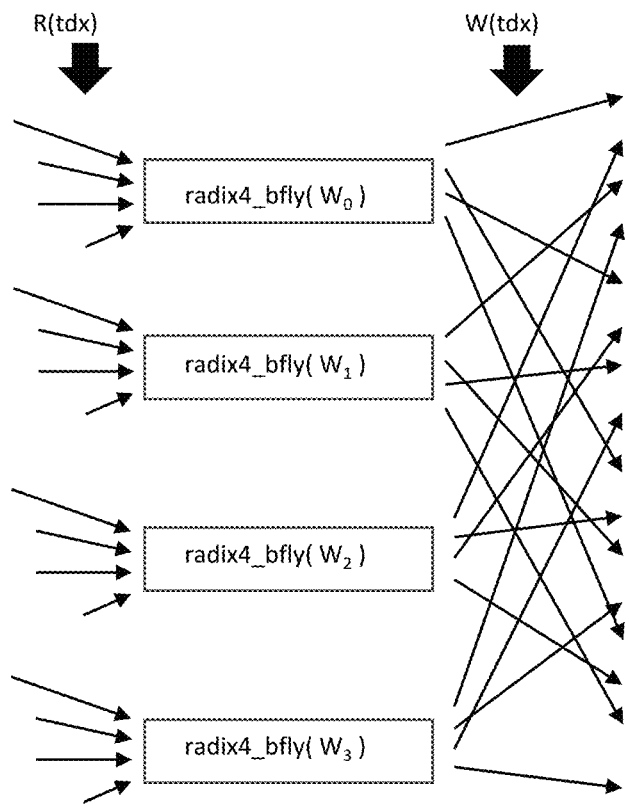
FIG. 76 is a butterfly diagram illustrating four Radix-4 butterflies with table-based reordering, in accordance with an embodiment of the present disclosure.

FIG. 75 is a butterfly diagram illustrating two Radix-2 butterflies with table-based reordering, in accordance with an embodiment of the present disclosure. FIG. 76 is a butterfly diagram illustrating four Radix-4 butterflies with table-based reordering, in accordance with an embodiment of the present disclosure.

Figure 77:
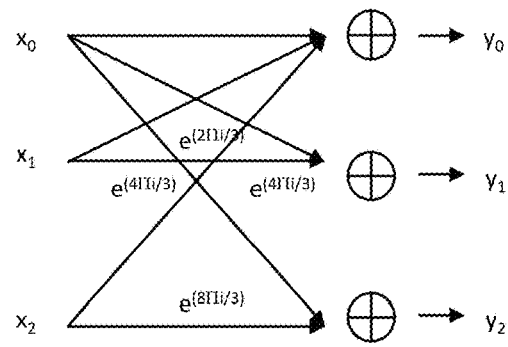
FIG. 77 is a butterfly diagram illustrating a three-point butterfly, in accordance with an embodiment of the present disclosure.
Figure 78:
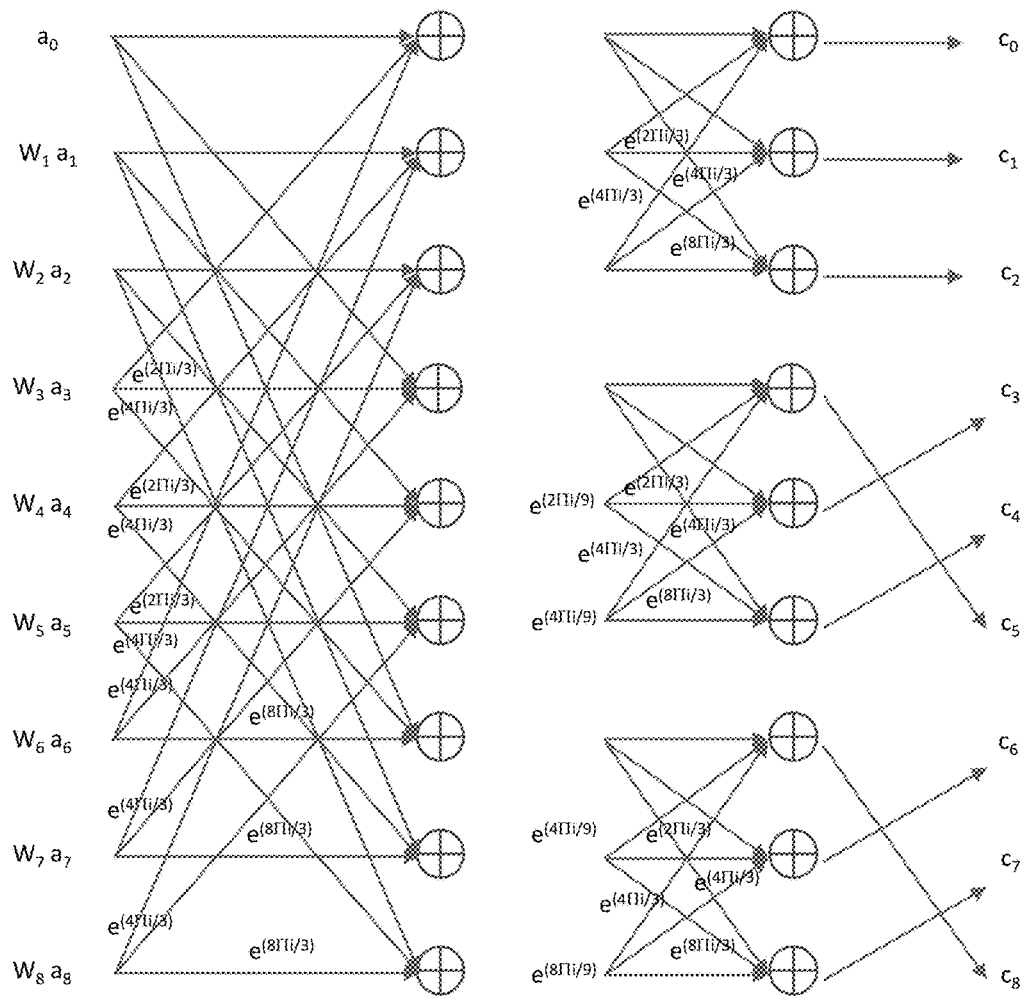
FIG. 78 is a butterfly diagram illustrating nine-point butterfly, in accordance with an embodiment of the present disclosure.

FIG. 77 is a butterfly diagram illustrating a three-point butterfly, in accordance with an embodiment of the present disclosure. FIG. 78 is a butterfly diagram illustrating nine-point butterfly, in accordance with an embodiment of the present disclosure.

Figure 79:
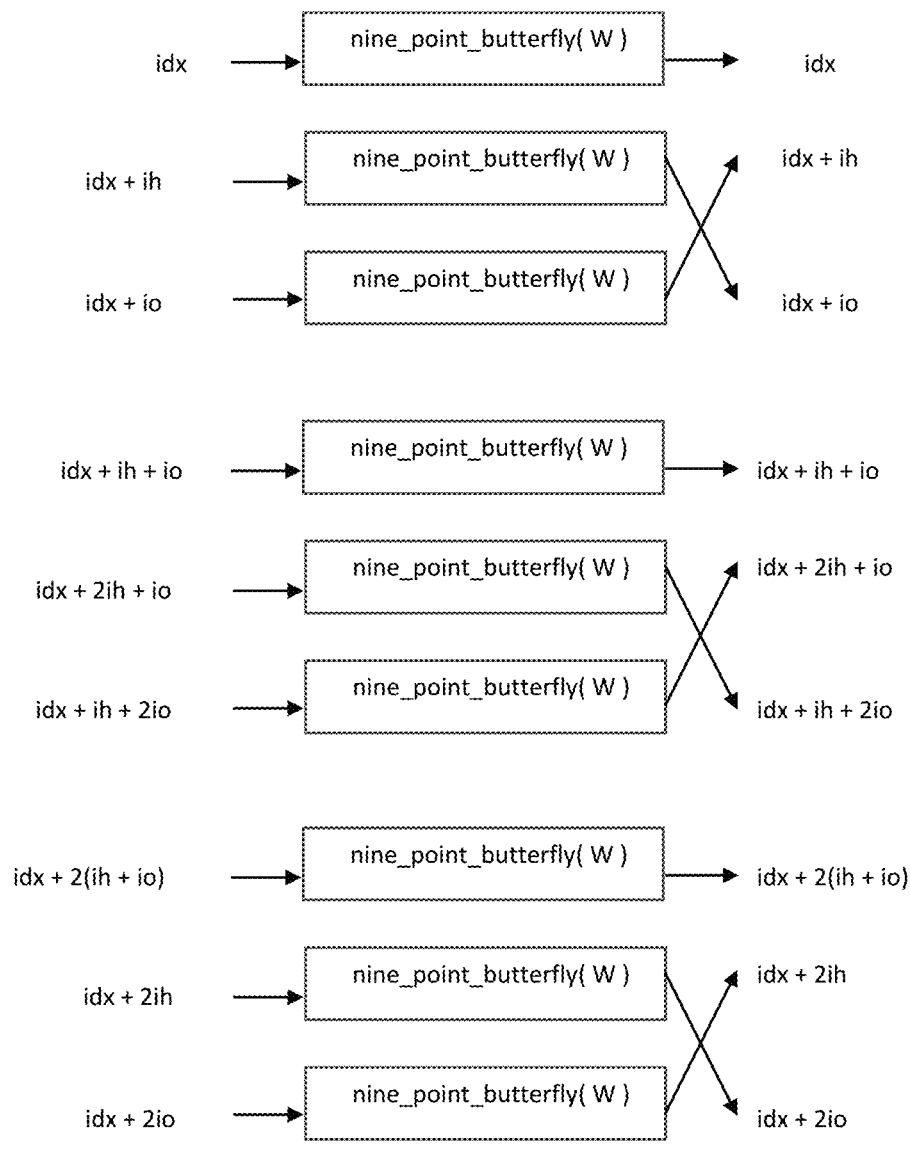
FIG. 79 is a butterfly diagram illustrating a first group of a nine-point butterfly, in accordance with an embodiment of the present disclosure.
Figure 80:
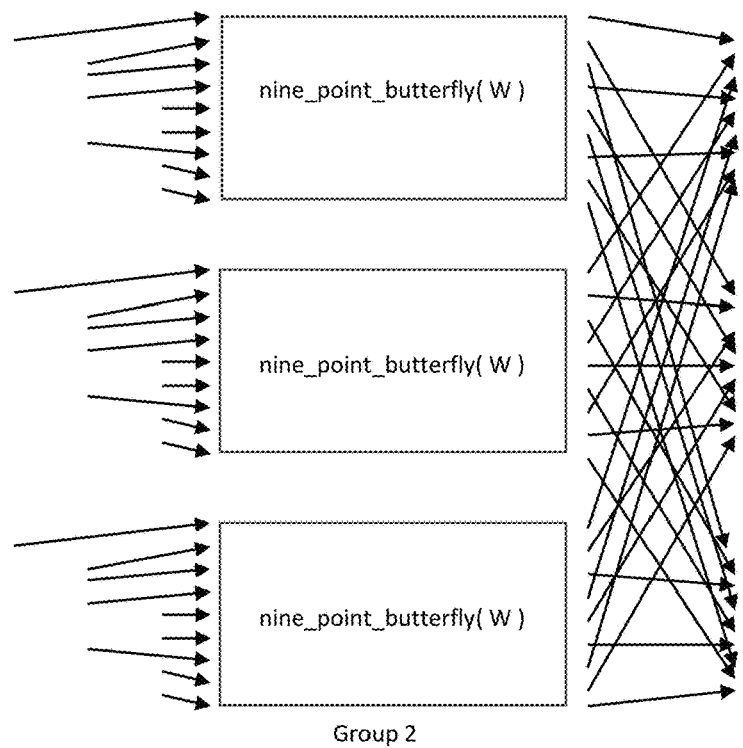
FIG. 80 is a butterfly diagram illustrating a second group of a nine-point butterfly, in accordance with an embodiment of the present disclosure.
Figure 81:
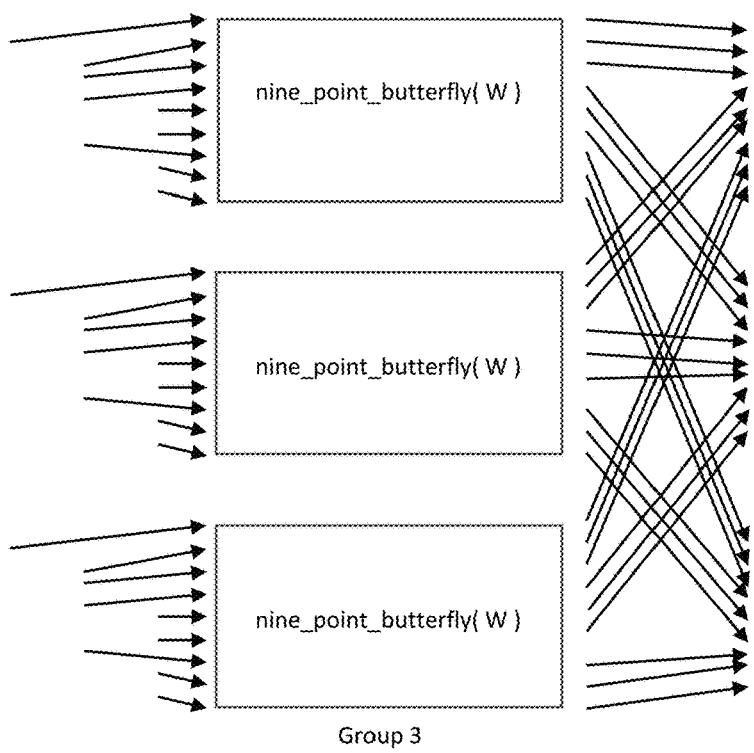
FIG. 81 is a butterfly diagram illustrating a third group of a nine-point butterfly, in accordance with an embodiment of the present disclosure.

FIG. 79 is a butterfly diagram illustrating a first group of a nine-point butterfly, in accordance with an embodiment of the present disclosure. FIG. 80 is a butterfly diagram illustrating a second group of a nine-point butterfly, in accordance with an embodiment of the present disclosure. FIG. 81 is a butterfly diagram illustrating a third group of a nine-point butterfly, in accordance with an embodiment of the present disclosure.

Four-Point DFTs

This approach avoids using the binary loop index representation described above, instead using a standard matrix product representation. In this Section, expressions enclosed with parentheses ( ) represent the DFT two-butterfly configurations described above. The design principle here is: maximum computational rate and minimum memory requirements.

Regarding notation, the product of N×N matrices:

$$\prod_{i=0}^{k-1} p_i = p_{k-1} \, p_{k-2} \cdots p_1 \, p_0$$

BR(n,N): bit-reversed value of integer n associated with length N
Bk: sparse matrix of k element DFTs
Rk: sparse matrix of k element reordering sub-matrices
k element reordering matrix Rk$_{ij}$=1 if j=BR(i,k), else 0
k element DFT matrix Bk, k elements of unity per row, else 0
N=FFT size Reference Approach #1. Vector Memory (M)=N complex elements. Computational kernel complexity (m): high. Ln=Log$_b$(N), base b=4→Four-point DFT. Decimation-in-Frequency Reordering FFT matrix product. Reordering matrices R$_4$ commute with DFT matrices B$_2$. ( ) implies concurrency.

$$\prod_{p=0}^{Ln/2-1} (R4_p \, B2_{p+Ln/2}) \prod_{p=0}^{Ln/2-1} B2_p$$

Figure 82:
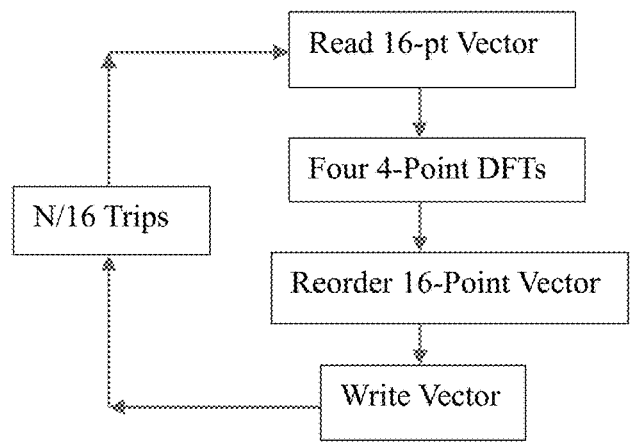
FIG. 82 is a flow diagram for the computational kernel flow for a Reference Approach #1.

FIG. 82 is a flow diagram for the computational kernel flow for this existing Reference Approach #1. For FIG. 82, the computational kernel complexity (m) is:

Number of elements read+4*DFT size+number of elements reordered $$m=16+4*(4*2)+16=64$$

Reference Approach #2. This design schedules vector reordering for the last pass of the multi-pass computation. Vector memory is viewed as an N/16 array of 16 element vectors. There are two reordering stages: (1) the first stage reorders the 16 element vectors—this activity is intended to be concurrent with the four-point DFT computations; and (2) the second stage reorders whole 16 element vectors driven by an index table—each table entry contains both a read and write index into vector memory for each 16-element vector produced in the first reordering stage.

This algorithm may be represented as a factoring of the standard N×N reordering matrix into two N×N matrices: (1) a "local" reordering matrix; and (2) a "global" reordering matrix. The power of two matrix representation is as follows. ( ) implies concurrency.

$$RN \prod_{p=0}^{Ln/2-1} B4_p$$

RN=RG RL=RN/16 R16
$$\prod_{p=0}^{Ln/2-2} RG(RL\ B4_{Ln/2-1})\ \Pi\ B4_p$$
$$\prod_{p=0}^{Ln/2-2} RN/16(R16\ B4_{Ln/2-1})\ \Pi\ B4_p$$

Figure 83:
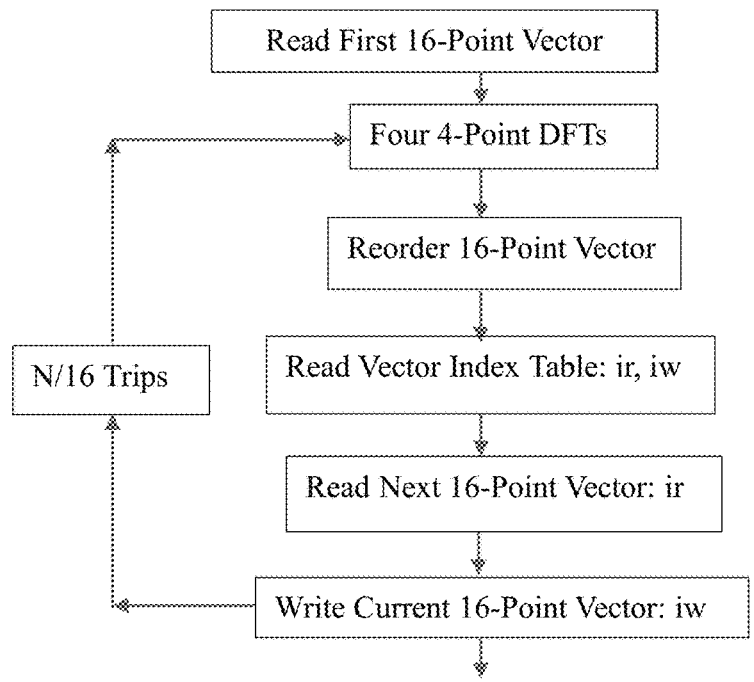
FIG. 83 is a flow diagram for the computational kernel flow for a Reference Approach #2.

FIG. 83 is a flow diagram for the computational kernel flow for this existing Reference Approach #2. For FIG. 83, the computational kernel complexity (m) is:

Number of elements read+4*DFT size+number of elements reordered $m=16+4*(4*2)+16=64$ Reference Approach #3. This design reschedules the reordering sequence with respect to the computational sequence.

$$\prod_{p=0}^{Ln/2-1} B2_{Ln-1}\ \Pi\ (R4_p\ B2_{p+Ln/2-1})\ \Pi\ B2_p$$
p=0 p=0

The result is a decoupling of the two processes and a reduction in the computational kernel complexity for most matrix products. The product (i.e., p=0) is:

$(R4_0\ B2_{Ln/2-1})$ which still has the high kernel complexity of Reference Approach #1 (discussed above). Another problem is the rescheduling algorithm of Reference Approach #3 has an inherent cache instability resulting from scheduling the reordering sequence "too early" in the multi-pass computational sequence. The 4-point DFT index values increase with each subsequent pass once the reordering sequence begins. The index values of Reordering Sequences 1-2 DFT, however, decrease with each subsequent pass for increased cache stability because the reordering schedule begins at least one pass after the mid-point of the computational sequence, in accordance with some embodiments.

Reordering Sequences. In accordance with some embodiments, the reordering sequence may be rescheduled (with respect to the computational sequence) until after the mid-point in the multi-pass computational sequence is complete. The multi-pass reordering FFT matrix product from Reference Approach #1 (discussed above), in a base-2 representation:

Ln/4−1 Ln/4−1
$\Pi\ R16_p\ B4_{p+Ln/4}\ \Pi\ B4_p$
p=0 p=0

Re-align the reordering sequence to begin after the midpoint of the multi-pass computational sequence. For Reordering Sequence 1 (Ln & 0x3=0):

Ln/4−3 Ln/4−1
$R64_{Ln/4-2}\ B4_{Ln/2-1}\ \Pi\ R16_p\ B4_{p+Ln/4+1}\ R4\ B4_{Ln/4}\ \Pi\ B4_p$
p=0 p=0

For Reordering Sequence 2 (Ln & 0x3=0):

Ln/4−3 Ln/4−1
$R256_{Ln/4-2}\ B4_{Ln/2-1}\ \Pi R16_p\ B4_{p+Ln/4+1}\ B4_{Ln/4}\ \Pi\ B4_p$
p=0 p=0

The product term for local and global matrix factoring is:

$R16_p\ B4_{p+Ln/4+1}=RG\ RL\ B4_{p+Ln/4+1}=RG4_p\ (RL4_p\ B4_{p+Ln/4+1})$

The (RL4 B4) term represents the concurrent execution of the local reordering of small sub-vectors resident in vector memory and 4-point DFT computations. The RG4 term represents the global reordering of whole sub-vectors driven by a 4-element index table.

The last pass for Reordering Sequences 1 and 2:
$R64/256_{Ln/4-2}\ B4_{Ln/2-1}=RG\ RL\ B4_{Ln/2-1}=RG4/16_{Ln/4-2}\ (RL16_{Ln/4-2}\ B4_{Ln/2-1})$ $RL16_{Ln/4-2}=RL4_{Ln/4-2}\ R4eo$
V=v(0) v(1) v(2) v(3) . . . v(N/2) v(N/2+1) v(N/2+2) v(N/2_3)
R4eo V=v(0) v(N/2) v(2) v(N/2+2) . . . v(1) v(N/2+1) v(3) v(N/2_3)

B4eo: Computes the even-indexed 4-point DFTs, then the odd-indexed 4-point DFTs.

Factor R4eo through the matrix product sequence (Ln & 0x3=0). For Reordering Sequence 1:

Ln/4−2 Ln/4−2
$\Pi\ RG4_p\ (RL4_p\ B4eo_{p+Ln/4+1})\ (R4\ B4eo_{Ln/4})\ (R4eo\ B4_{Ln/4-1})\ \Pi\ B4_p$
p=0 p=0

For Reordering Sequence 2:

Ln/4−3 Ln/4−1
$RG16_{Ln/4-2}\ (RL4_{Ln/4-2}\ B4eo_{Ln/2-1})\ \Pi\ RG4_p\ (RL4_p\ B4eo_{p+Ln/4+1})\ (R4eo\ B4Ln/4)\ \Pi\ B4_p$
p=0 p=0

Figure 84:
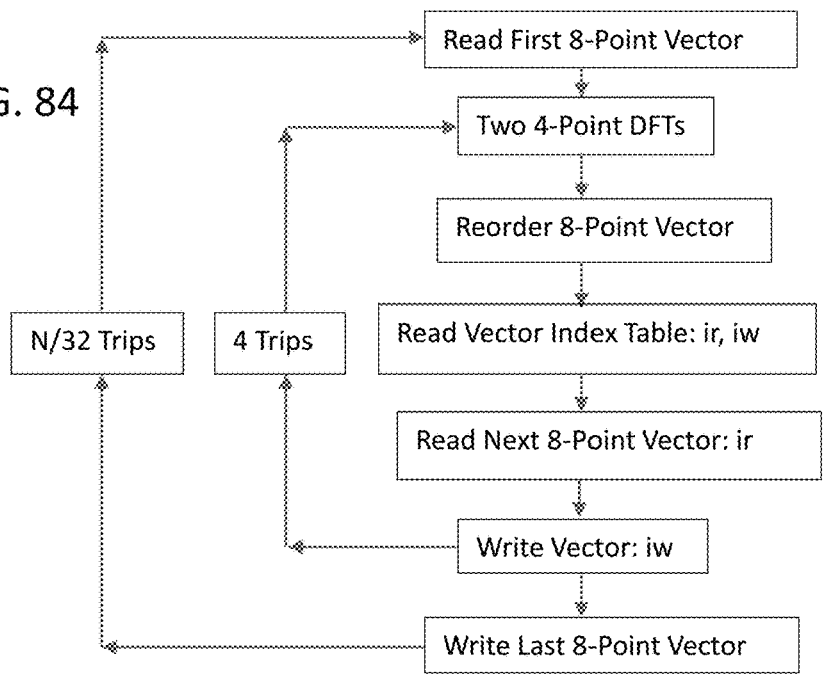
FIG. 84 is a flow diagram for the computational kernel flow for Reordering Sequence #1, in accordance with an embodiment of the present disclosure.
Figure 85:
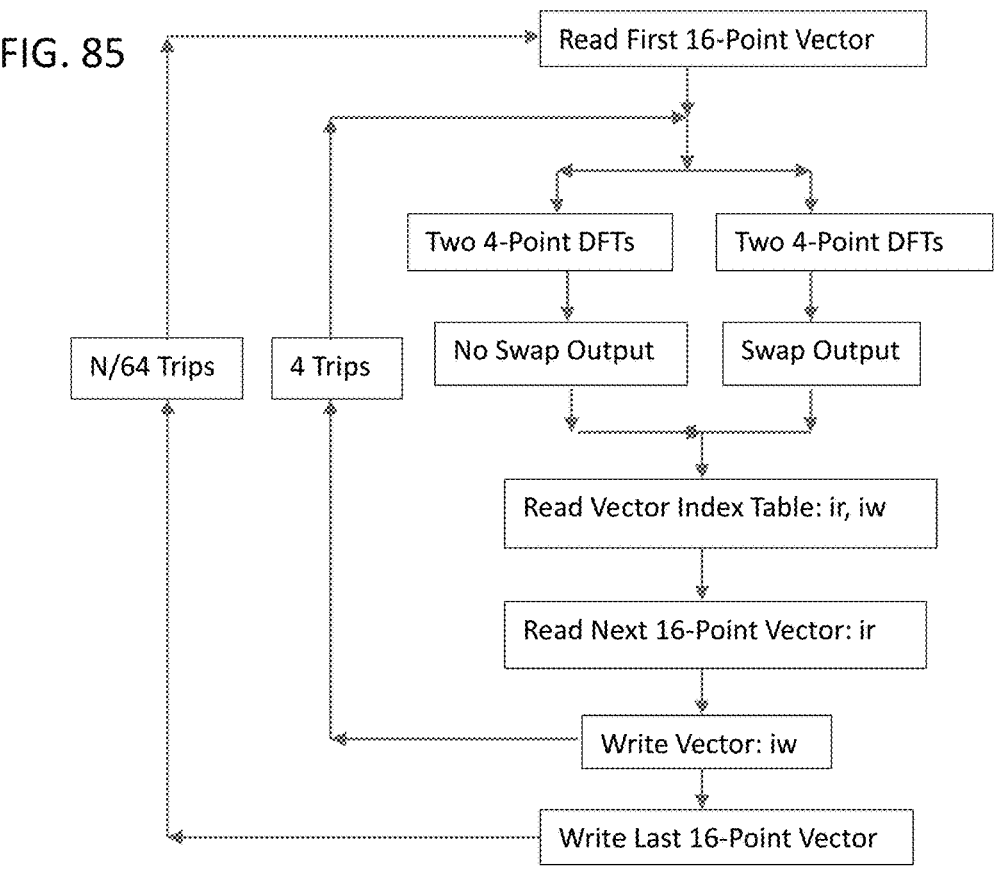
FIG. 85 is a flow diagram for the computational kernel flow for Reordering Sequence #2a, in accordance with an embodiment of the present disclosure.

FIG. 84 is a flow diagram for the computational kernel flow for Reordering Sequence #1, in accordance with an embodiment of the present disclosure. For FIG. 84, the computational kernel complexity (m):

Number of elements read+2*DFT size+number of elements reordered $m=8+2*(4*2)+8=32$ FIG. 85 is a flow diagram for the computational kernel flow for Reordering Sequence #2a, in accordance with an embodiment of the present disclosure. For FIG. 85, the computational kernel complexity (m):

Number of elements read+2*DFT size+four element swap buffer $m=16+(2*4*2)+4=36$

Figure 86:
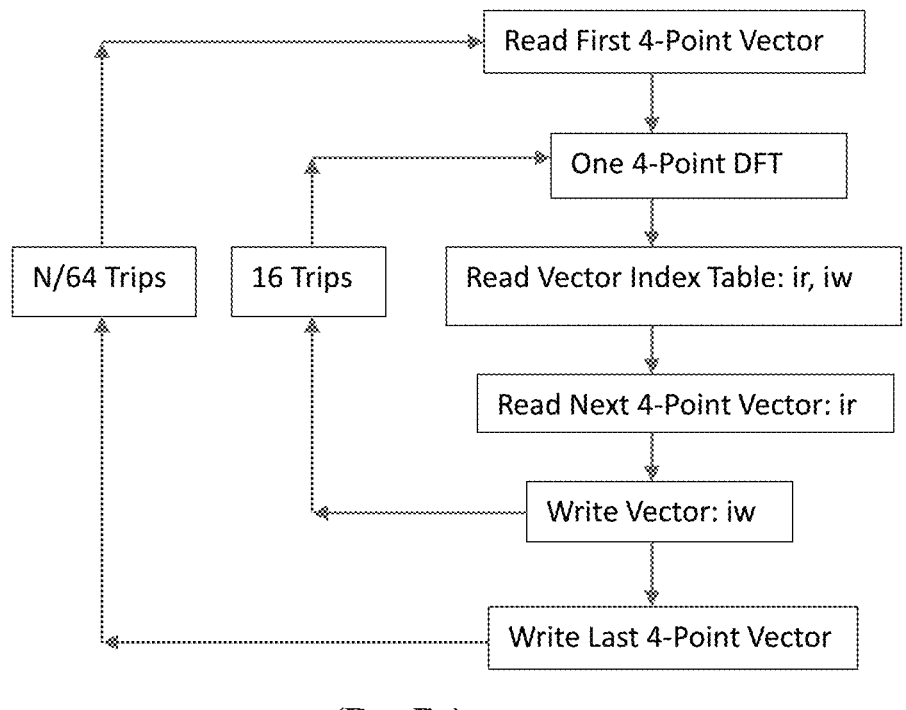
FIG. 86 is a flow diagram for the computational kernel flow for Reordering Sequence #2b, in accordance with an embodiment of the present disclosure.

FIG. 86 is a flow diagram for the computational kernel flow for Reordering Sequence #2b, in accordance with an embodiment of the present disclosure. For FIG. 86, the computational kernel complexity (m):

Number of elements read+DFT size+number of elements reordered $m=4+(4*2)+4=16$

Utilizes a 16-element "read only" double index table
Regarding memory requirements:
Vector Memory (M)=N complex elements
Computational kernel complexity (m):
Reference Approach #1 64
Reordering Sequence #1 32+4 element double index array
Reordering Sequence #2 36/16+4/16 element double index array The decimation-in-frequency matrix representations for Reordering Sequence #1 are as follows:
Ln & 0x3=0
Ln/4−2 Ln/4−2
$\Pi\ RG4_p\ (RL4_p\ B4eo_{p+Ln/4+1})\ (R4\ B4eo_{Ln/4})\ (R4eo\ B4_{Ln/4-1})\ \Pi\ B4_p$
p=0 p=0
Ln & 0x3=1
Ln/4−2 Ln/4−1
$(R4\ B2eo)\ \Pi\ RG4_p\ (RL4_p\ B4eo_{p+Ln/4+1})\ (R4eo\ B4_{Ln/4})\ \Pi\ B4_p$
p=0 p=0
Ln & 0x3=2
Ln/4−1 Ln/4−1
$\Pi\ RG4_p\ (RL4_p\ B4eo_{p+Ln/4+1})\ (R4eo\ B4_{Ln/4})\ \Pi\ B4_p$ p=0 p=0
Ln & 0x3=3
Ln/4−2 Ln/4−1
(R4 B2eo) Π RG4$_p$ (RL4$_p$ B4eo$_{p+Ln/4+2}$) (R4 B4eo$_{Ln/4+1}$) (R4eo B4$_{Ln/4}$) Π B4$_p$
p=0 p=0

The decimation-in-frequency matrix representations for Reordering Sequence #2 are as follows:

Ln & 0x3=0
Ln/4−3 Ln/4−1
RB$_{LF}$ Π RG4$_p$ (RL4$_p$ B4eo$_{p+Ln/4+1}$) (R4eo B4$_{Ln/4}$) Π B4$_p$
p=0 p=0
RB$_{LF}$=RG16$_{Ln/4}$_2 (RL4$_{Ln/4-2}$ B4eo$_{Ln/2-1}$)
Ln & 0x3=1
Ln/4−3 Ln/4−1
RB$_{LF}$ Π RG4$_p$ (RL4$_p$ B4eo$_{p+Ln/4+2}$) (R4 B4eo$_{Ln/4+1}$) (R4eo B4$_{Ln/4}$) Π B4$_p$
p=0 p=0
RB$_{LF}$=RG4$_{Ln/4-2}$ (RL4$_{Ln/4-2}$ B2eo)
Ln & 0x3=2
Ln/4−3 Ln/4−1
RB$_{LF}$ Π RG4$_p$ (RL4$_p$ B4eo$_{p+Ln/4+2}$) (R4 B4$_{Ln/4+1}$) (R4eo B4$_{Ln/4}$) Π B4$_p$
p=0 p=0
RB$_{LF}$=RG16$_{Ln/4-2}$ (RL4$_{Ln/4-2}$ B4eo$_{Ln/2-1}$)
Ln & 0x3=3
Ln/4−2 Ln/4
RB$_{LF}$ Π RG4$_p$ (RL4$_p$ B4eo$_{p+Ln/4+2}$) (R4eo B4$_{Ln/4+1}$) Π B4$_p$
p=0 p=0
RB$_{LF}$=RG4$_{Ln/4-2}$ (RL4$_{Ln/4-2}$ B2eo)

The decimation-in-time matrix representations for Reordering Sequence #1 are as follows:

Ln & 0x3=0
Ln/4−2 Ln/4−2
B4$_{p+Ln/4+1}$ (R4eo B4eo$_{Ln/4}$) (R4 B4eo$_{Ln/4-1}$) Π RG4$_p$ (RL4$_p$ B4eo$_p$)
p=0 p=0
Ln & 0x3=1
Ln/4−1 Ln/4−1
Π B4$_{p+Ln/4+1}$ (R4eo B4eo$_{Ln/4}$) Π RG4$_p$ (RL4$_p$ B4eo$_p$) RB$_{FP}$
p=0 p=1
RB$_{FP}$=RG4$_0$ (RL4$_0$ B2eo)
Ln & 0x3=2
Ln/4−1 Ln/4−1
Π B4$_{p+Ln/4+1}$ (R4eo B4eo$_{Ln/4}$) Π RG4$_p$ (RL4$_p$ B4eo$_p$)
p=0 p=0
Ln & 0x3=3
Ln/4−1 Ln/4−1
Π B4$_{p+Ln/4+2}$ (R4eo B4eo$_{Ln/4+1}$) (R4 B4eo$_{Ln/4}$) Π RG4$_p$ (RL4$_p$ B4eo$_p$) RB$_{FP}$
p=0 p=0
RB$_{FP}$=RG4$_0$ (RL4$_0$ B2eo)

The decimation-in-time matrix representations for Reordering Sequence #2 are as follows:

Ln & 0x3=0
Ln/4−1 Ln/4−2
Π B4$_{p+Ln/4}$ (R4eo B4eo$_{Ln/4-1}$) Π RG4$_p$ (RL4$_p$ B4eo$_p$) RB$_{FP}$
p=0 p=1
RB$_{FP}$=RG16$_0$ (RL4$_0$ B4$_0$)
Ln & 0x3=1
Ln/4−1 Ln/4−2
B4$_{p+Ln/4+1}$ (R4eo B4eo$_{Ln/4}$) (R4 B4eo$_{Ln/4-1}$) Π RG4$_p$ (RL4$_p$ B4eo$_p$) RB$_{FP}$
p=0 p=1

RB$_{FP}$=RG4$_0$ (RL4$_0$ B2)
Ln & 0x3=2
Ln/4−1 Ln/4−2
B4$_{p+Ln/4}$ (R4eo B4eo$_{Ln/4}$) (R4 B4eo$_{Ln/4-1}$) Π RG4$_p$ (RL4$_p$ B4eo$_p$) RB$_{FP}$
p=0 p=1
RB$_{FP}$=RG16$_0$ (RL4$_0$ B4$_0$)
Ln/4 Ln/4−1
Π B4$_{p+Ln/4+1}$ (R4eo B4eo$_{Ln/4}$) Π RG4$_p$ (RL4$_p$ B4eo$_p$) RB$_{FP}$
p=0 p=1
RB$_{FP}$=RG4$_0$ (RL4$_0$ B2)

As will be appreciated in light of this disclosure, the design constraints discuss in this section include minimizing memory requirements. Regarding memory structure, if the available memory is, for example, a multi-way hierarchical cache, then small vector indices for the 4-point DFT computation may result in better cache stability, in accordance with some embodiments.

As will be further appreciated in light of this disclosure, for a DFT size of $b^n$ and reordering size of $b^{2n}$, b may be 2, 3, etc., and n may be 2, 3, etc. The examples described above in relation to 4-point DFTs set b=2 and n=2. However, just as easily, b could be set at 3. Thus, 9-point DFTs would be provided (rather than 4-point DFTs), and reordering would be 9/81-point (rather than 4/16-point).

In accordance with some embodiments, the disclosed techniques may be utilized to minimize the total vector memory transfers (dM), which is the number of transfers per pass multiplied by the number of passes:

$$dM=(2*N)*((\text{Log}_2(N)/\text{Log}_2(\text{DFT size}))=(2/\text{Log}_2(\text{DFT size}))*N*(\text{Log}_2(N))$$

If the DFT size is 4, then $$dM=N*(\text{Log}_2(N))$$

The computational kernel complexity with no reordering is:

$$m=2*\text{DFT size}+(\text{DFT size}*\text{Log}_2(\text{DFT size}))$$

As such, the computational tradeoff is:

| DFT Size | dM | m |
|---|---|---|
| 2 | 2 * N Log$_2$(N) | 6 |
| 4 | 1 | 16 |
| 8 | 2/3 | 40 |
| 16 | 1/2 | 96 |

By increasing the DFT size from 4 to 16, for example, the total vector memory transfers (dM) are reduced by half and the computational kernel complexity (m) is increased by six times. This tradeoff may make sense for some computational platforms.

Radar System Architecture and Operation

Figure 87:
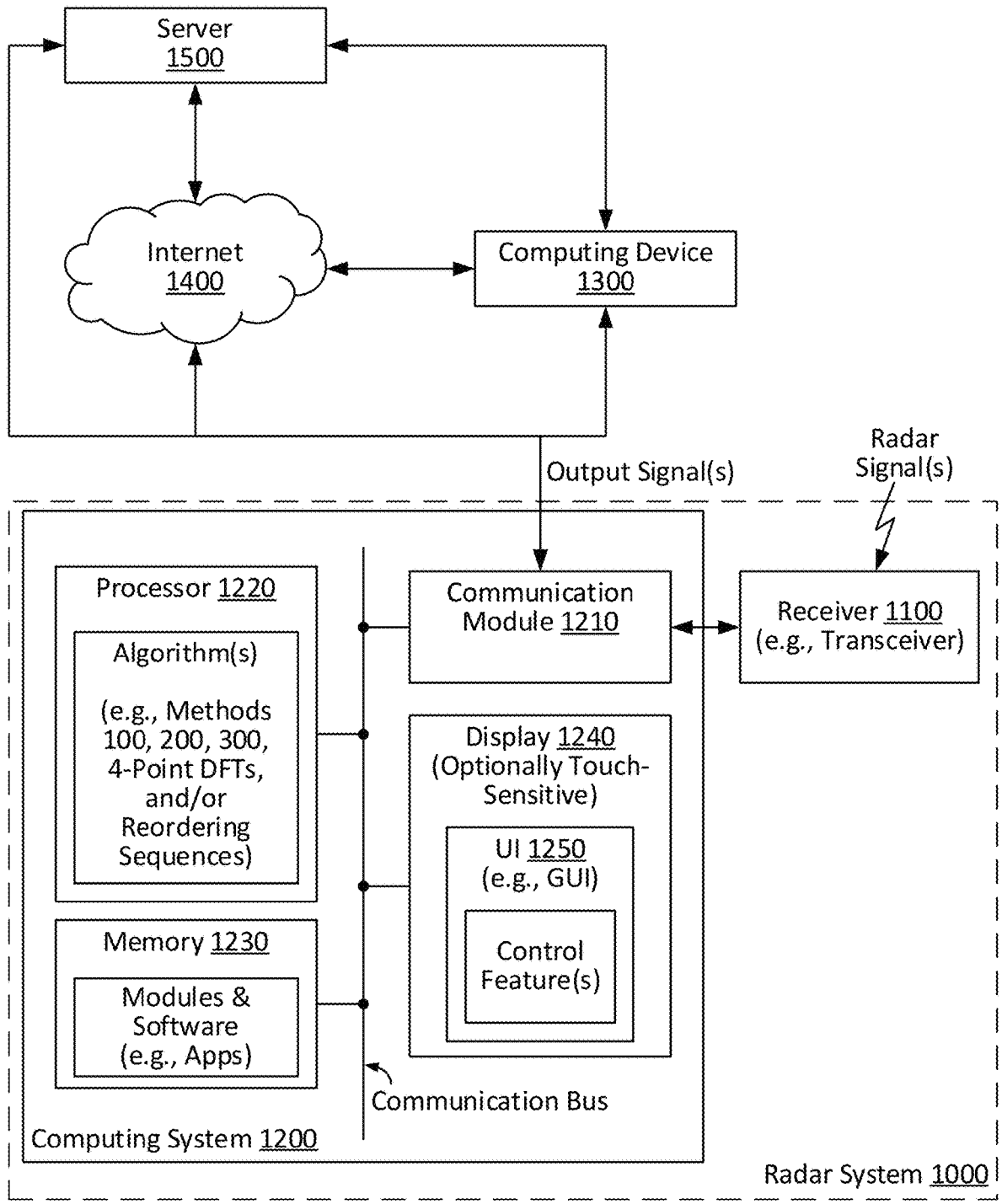
FIG. 87 is a block diagram of a radar system configured in accordance with an embodiment of the present disclosure.

FIG. 87 is a block diagram of a radar system 1000 configured in accordance with an embodiment of the present disclosure. As can be seen, radar system 1000 may include: (1) a receiver 1100; and (2) a computing system 1200. Moreover, in accordance with some embodiments, radar system 1000 may involve in its operation one or more computing devices 1300, the internet 1400, and/or one or more servers 1500. Each of these various elements is discussed in turn below. More generally, FIG. 87 illustrates communicative coupling of the various constituent elements of radar system 1000 and the overall flow of data therein/therefrom, in accordance with some embodiments. As will be appreciated in light of this disclosure, communication between elements may be provided, for example, by wired and/or wireless communication means, such as, for example, Universal Serial Bus (USB), Ethernet, FireWire, Wi-Fi, Bluetooth, cellular, or a combination of any thereof.

Receiver 1100 may be configured, in accordance with some embodiments, as either a dedicated receiver device provided with only receiving capabilities or a transceiver device provided with both receiving and transmitting capabilities. Receiver 1100 may be configured, in accordance with some embodiments, to receive (e.g., detect) one or more radar signals. Receiver 1100 further may be configured, in accordance with some embodiments, to deliver radar signal(s) (or at least data about such radar signal(s)) to computing system 1200 (e.g., to processor 1220, discussed below).

Also, as noted above, radar system 1000 may include a computing system 1200. Computing system 1200 may include: (1) a communication module 1210; (2) a processor 1220; (3) memory 1230; and (4) a display 1240. Each of these elements is discussed in turn below.

Communication module 1210 may be configured, in accordance with some embodiments, to provide communication between receiver 1100 and processor 1220 (discussed below). Communication module 1210 may be configured, in accordance with some embodiments, to provide communication between computing system 1200 and one or more external elements (e.g., computing device 1300, internet 1400, and/or server 1500, each discussed below). To such ends, communication module 1210 may be configured for communication utilizing any one (or combination) of suitable wired and/or wireless communication means, such as Universal Serial Bus (USB), Ethernet, FireWire, Wi-Fi, Bluetooth, wireless local area network (WLAN), and cellular data service, among others. Communication module 1210 may be configured, in accordance with some embodiments, as a transmitter, a receiver, or both (i.e., a transceiver).

Processor 1220 may be configured, in accordance with some embodiments, to perform or otherwise facilitate a given operation or function associated with computing system 1200 (or radar system 1000 more generally). To that end, processor 1220 may be, for example, a central processing unit (CPU), a microcontroller unit (MCU), or any other suitable processing element, as will be apparent in light of this disclosure. Moreover, processor 1220 may be configured, in accordance with some embodiments, to communicate with any one (or combination) of the other various components of computing system 1200 via a communication bus, a serial interface, one or more control signals, or other suitable interconnection means. Processor 1220 may be configured, in accordance with some embodiments, to access data stored at memory 1230 (discussed below) or otherwise accessible to computing system 1200 (e.g., from server 1500, discussed below). Processor 1220 may be configured, in accordance with some embodiments, to communicate with communication module 1210 to operate on one or more radar signals received by receiver 1100. Processor 1220 may be configured, in accordance with some embodiments, to process or otherwise interpret input (e.g., from a user or other source) received, for example, through a user interface (UI) 1250 provided at display 1240 and/or an application stored in memory 1230, each discussed below.

Processor 1220 may be configured, in accordance with some embodiments, to operate on a given radar signal received by receiver 1100. More specifically, processor 1220 may be configured, in accordance with some embodiments, to perform, in part or in whole, any one (or combination) of methods 100, 200, and 300 or other method or algorithm described herein, such as one or more four-point DFTs and one or more Reordering Sequences. In so processing radar signal(s), processor 1220 may be configured to output one or more output signals including data obtained from processing the radar signal(s), the data pertaining to at least one characteristic of the radar signal(s). In a general sense, processor 1220 may be configured, in accordance with some embodiments, to transform a received radar signal into one or more output signals including data pertaining to said radar signal.

Memory 1230 may be implemented with any one (or combination) of volatile and non-volatile memory and may be of any type and size, as desired for a given target application or end-use. Memory 1230 may be configured, in accordance with some embodiments, for use as program and/or data memory. Memory 1230 may be configured, in accordance with some embodiments, for use as processor workspace for processor 1220. Memory 1230 may be configured, in accordance with some embodiments, to store programs and applications for computing system 1200 on a temporary or permanent basis. Memory 1230 may be configured, in accordance with some embodiments, for use in storing data, on a temporary or permanent basis, whether that data is native to computing system 1200 or received from another source (e.g., such as server 1500, discussed below). As will be appreciated in light of this disclosure, memory 1230 may be benefit from any of the various techniques described herein which minimize (or otherwise reduce) the total amount of memory (M) required to perform multi-pass computation and/or the total amount of data transfer activity ($\Delta M$) required to perform multi-pass computation, in accordance with some embodiments.

Memory 1230 may include one or more modules stored therein that can be accessed and executed, for example, by processor 1220. For instance, memory 1230 may include an operating system (OS) module, which may be configured, in accordance with some embodiments, to aid in processing radar signal(s) received by radar system 1000. The OS module may be implemented with any suitable OS, mobile or otherwise. Memory 1230 may include a user interface (UI) module configured to provide, in part or in whole, a UI 1250 via a display 1240 (each discussed below). To that end, the UI module may include known, custom, proprietary, or after-developed UI construction code (or instruction sets) that are generally well-defined and operable to present one or more control features via UI 1250 for selection and/or manipulation by a user (or other controller). Although the UI module is described primarily as being implemented in memory 1230, the present disclosure is not intended to be so limited. For instance, in some cases, the UI module may be implemented in a combination of locations (e.g., memory 1230 and display 1240), thereby providing a UI module that is, in a general sense, functionally distributed. A given module of memory 1230 may be implemented in any one (or combination) of suitable programming languages, such as C, C++, objective C, JavaScript, or custom or proprietary instruction sets, to name a few options. Memory 1230 also may include one or more applications (colloquially, apps) stored therein, and one or more of such applications may be configured to facilitate presentation and/or operation of UI 1250.

In accordance with some embodiments, memory 1230 may be (or otherwise include) a computer-readable medium that, when executed by a processor (e.g., such as processor 1220), carries out (in part or in whole) any one or more of the operations and functions described herein. The computer-readable medium may be, for example, a hard drive, a compact disk, a memory stick, a server, or any other suitable non-transitory computer or computing device memory that includes executable instructions, or a plurality or combination of such memories. Other embodiments may be implemented, for instance, with gate-level logic or an application-specific integrated circuit (ASIC) or chip set, or other such purpose-built logic. Some embodiments may be implemented with a microcontroller having input/output (I/O) capability (e.g., inputs for receiving user inputs; outputs for directing other components) and one or more embedded routines for carrying out device functionality. In a more general sense, memory 1230 may be implemented in hardware, software, firmware, or a combination thereof, as desired for a given target application or end-use.

Display 1240 may be configured, in accordance with some embodiments, to display images, video, text, or any other desired content, including any of the elements of a UI 1250 (discussed below), as variously described herein. In some cases, display 1240 may be integrated with computing system 1200, whereas in some other cases, it may be a stand-alone component configured to communicate with computing system 1200 (e.g., via communication module 1210) using any suitable wired and/or wireless communications techniques.

In accordance with some embodiments, computing system 1200 may be configured to receive input via one or more touch-sensitive elements. For instance, in some embodiments, display 1240 optionally may be touch-sensitive, in part or in whole. In some other embodiments, computing system 1200 additionally (or alternatively) may include (or otherwise be configured to be communicatively coupled with) an external touch-sensitive surface. A given touch-sensitive element may be configured to translate input into an electronic signal that may be processed by computing system 1200 (e.g., by processor 1220 thereof) and manipulated or otherwise used to trigger a UI 1250 action, such as any of those discussed herein.

Display 1240 may be configured, in accordance with some embodiments, to display a UI 1250 (e.g., such as a graphical user interface (GUI)). UI 1250 may provide one or more control features that may be utilized by a user (or other controller) to control the operation of computing system 1200 (or radar system 1000 more generally). A given control feature may be (or otherwise may include) a physical element or a virtual element (e.g., a non-physical, light-based icon associated with a given actuator operation). Selection and manipulation of a given control feature may be made, for example, with a user's digit(s), a stylus, or any other suitable implement, as will be apparent in light of this disclosure.

A given control feature provided by UI 1250 may be configured, in accordance with some embodiments to allow selection from and operation of any of the various module(s) and/or application(s) accessible to computing system 1200 to perform any of a wide variety of operations associated with receiving and processing a radar signal via radar system 1000. In accordance with some embodiments, a given control feature may be utilized to cause computing system 1200 to output one or more output signals that may include data pertaining to radar signal(s) received by radar system 1000.

Computing system 1200 may be configured, in accordance with some embodiments, to output (e.g., transmit via wired and/or wireless means) one or more output signals. As noted above, processor 1220 may be involved with performing (or instructing another element to perform) a given operation or function associated with computing system 1200 (or radar system 1000 more generally). For instance, processor 1220 may be configured to output a signal to communication module 1210 to output one or more output signals, in accordance with some embodiments. In accordance with some embodiments, output (e.g., transmission) of such output signal(s) by communication module 1210 may occur upon instruction from processor 1220. The output signal(s) may be a radio frequency (RF) signal (e.g., a cellular signal, a Wi-Fi signal, a Bluetooth signal, etc.) or an optical signal, to name a few options.

The output signal(s) of computing system 1200 may include any of a wide range of data pertaining to at least one characteristic of radar signal(s) received by receiver 1100. For example, in some instances, the output signal(s) may include data pertaining to the location and/or velocity of a target being tracked with the radar signal(s). In some cases, the output signal(s) may include data pertaining to a time stamp. Other data which may be present in a given output signal will depend on a given target application or end-use and will be apparent in light of this disclosure.

As will be appreciated in light of this disclosure, a given sub-group or combination of elements of computing system 1200 (or radar system 1000 more generally) may be integrated or otherwise combined with one another as a single element (e.g., a single circuit or chip) configured to serve their multiple respective functions, in accordance with some embodiments. For instance, in some cases, processor 1220 and memory 1230 may be integrated together. In some cases, receiver 1100 and computing system 1200 may be integrated together. Other suitable combinations and integrations of the constituent components of radar system 1000 will be apparent in light of this disclosure.

As can be seen further from FIG. 87, radar system 1000 may be configured for communicative coupling with one or more computing devices 1300. More specifically, radar system 1000 may be configured, in accordance with some embodiments, to communicate output signal(s) to one or more computing devices 1300, which may be mobile or otherwise. In some cases, radar system 1000 may communicate directly with computing device 1300, whereas in some other cases, radar system 1000 may communicate with computing device 1300 through the internet 1400.

A given computing device 1300 may be any one (or combination) of a mobile phone, a smartphone, a tablet computer, a laptop/notebook computer, a sub-notebook computer, a desktop computer, a personal digital assistant (PDA), and a cellular handset. In some cases, computing device 1300 may be yet another computing system 1200, as described herein. In some cases, a given computing device 1300 may be a dedicated device configured specifically to communicate with radar system 1000, whereas in some other cases, a given computing device 1300 may be a general computing device configured for use to such ends. In accordance with some embodiments, a given computing device 1300 may host a browser or other software application configured to facilitate review of information pertinent to computing system 1200 (or radar system 1000 more generally) and radar signal(s) received thereby.

Also, as can be seen from FIG. 87, radar system 1000 may be configured for communicative coupling with one or more servers 1500. In some cases, radar system 1000 may communicate directly with server 1500, whereas in some other cases, radar system 1000 may communicate with server 1500 through the internet 1400. In some cases, server 1500 may be cloud-based, in part or in whole. As a means of data storage, server 1500 may be (or otherwise may include) a database configured to store information saved thereat, for instance, by computing system 1200 and/or computing device 1300.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description. Future-filed applications claiming priority to this application may claim the disclosed subject matter in a different manner and generally may include any set of one or more limitations as variously disclosed or otherwise demonstrated herein.

What is claimed is:

1. A method of processing a radar signal, the method comprising:
    detecting at least one characteristic of a radar signal received via a receiver or a transceiver;
    processing the radar signal via a processor of a computing system communicatively coupled with the receiver or the transceiver, wherein the processing comprises:
        a two-bit reordering approach defined as a first multi-pass binary index representation;
        a standard in-place fast Fourier transform (FFT) approach defined as a second multi-pass binary index representation;
        a third multi-pass binary index representation comprising a first fusion of the two-bit reordering approach and a Radix-4 FFT representation; and
        a multi-level loop structure configured utilizing the third multi-pass binary index representation, wherein the multi-level loop structure is configured to control execution of a computational group comprising:
            two Radix-4 butterflies; and
            self-sorting or reordering output logic for bit reversal; and
    providing an output signal including data obtained from the processing of the radar signal, the data pertaining to the at least one characteristic of the radar signal;
    wherein the data comprises at least one of:
        a location of a target being tracked with the radar signal;
        a velocity of the target being tracked with the radar signal; and
        a time stamp; and
    wherein at least one of:
        the providing of the output signal comprises transmitting the output signal via at least one of wired communication and wireless communication; and
        the method further comprises displaying the data via a graphical user interface (GUI) on a display of the computing system.

2. The method of claim 1, wherein the processing of the radar signal further comprises:
    a FFT approach with a fourth multi-pass binary index representation produced from a second fusion of an odd-even reordering pattern with the Radix-4 FFT representation.

3. A radar system configured to perform the method of claim 1, the radar system comprising:
    the receiver or the transceiver; and
    the computing system communicatively coupled with the receiver or the transceiver and comprising:
        the processor; and
        memory communicatively coupled with the processor.

4. The radar system of claim 3, wherein the computing system further comprises the display communicatively coupled with at least one of the processor and the computing system.

5. A method of processing a radar signal, the method comprising:
    detecting at least one characteristic of a radar signal received via a receiver or a transceiver;
    processing the radar signal via a processor of a computing system communicatively coupled with the receiver or the transceiver, wherein the processing comprises:
        a four-bit reordering approach defined as a first multi-pass binary index representation;
        a second multi-pass binary index representation comprising a fusion of the four-bit reordering approach and a first Radix-4 fast Fourier transform (FFT) representation;
        a multi-level loop structure configured utilizing the second multi-pass binary index representation, wherein the multi-level loop structure is configured to control a computational group comprising:
            four Radix-4 butterflies; and
            self-sorting or reordering output logic for bit reversal; and
        a hybrid reordering FFT defined as a third multi-pass binary index representation; and
    providing an output signal including data obtained from the processing of the radar signal, the data pertaining to the at least one characteristic of the radar signal;
    wherein the data comprises at least one of:
        a location of a target being tracked with the radar signal;
        a velocity of the target being tracked with the radar signal; and
        a time stamp; and
    wherein at least one of:
        the providing of the output signal comprises transmitting the output signal via at least one of wired communication and wireless communication; and
        the method further comprises displaying the data via a graphical user interface (GUI) on a display of the computing system.

6. The method of claim 5, wherein in the hybrid reordering FFT defined as the third multi-pass binary index representation, the processing of the radar signal further comprises:
    a standard in-place FFT defined as a fourth multi-pass binary index representation; and
    execution of the standard in-place FFT with no reordering.

7. The method of claim 5, wherein in the hybrid reordering FFT defined as the third multi-pass binary index representation, the processing of the radar signal further comprises:
    a two-bit reordering approach defined as a fourth multi-pass binary index representation;
    a standard in-place FFT approach defined as a fifth multi-pass binary index representation; and
    a sixth multi-pass binary index representation comprising a fusion of the two-bit reordering approach and a second Radix-4 FFT representation.

8. The method of claim 5, wherein in the hybrid reordering FFT defined as the third multi-pass binary index representation, the processing of the radar signal further comprises:
    execution of a four-bit reordering butterfly group of the multi-level loop structure.

9. A radar system configured to perform the method of claim 5, the radar system comprising:
- the receiver or the transceiver; and
- the computing system communicatively coupled with the receiver or the transceiver and comprising:
  - the processor; and
  - memory communicatively coupled with the processor.

10. The radar system of claim 9, wherein the computing system further comprises the display communicatively coupled with at least one of the processor and the computing system.

11. A method of processing a radar signal, the method comprising:
- detecting at least one characteristic of a radar signal received via a receiver or a transceiver;
- processing the radar signal via a processor of a computing system communicatively coupled with the receiver or the transceiver, wherein the processing comprises:
  - a hybrid reordering tile-based fast Fourier transform (FFT) approach defined as a first multi-pass binary index representation; and
  - execution of residual reordering via a tile-based table-driven last pass butterfly function; and
- providing an output signal including data obtained from the processing of the radar signal, the data pertaining to the at least one characteristic of the radar signal;
- wherein the data comprises at least one of:
  - a location of a target being tracked with the radar signal;
  - a velocity of the target being tracked with the radar signal; and
  - a time stamp; and
- wherein at least one of:
  - the providing of the output signal comprises transmitting the output signal via at least one of wired communication and wireless communication; and
  - the method further comprises displaying the data via a graphical user interface (GUI) on a display of the computing system.

12. The method of claim 11, wherein in the hybrid reordering tile-based FFT defined as the first multi-pass binary index representation, the processing of the radar signal further comprises:
- a standard in-place FFT defined as a second multi-pass binary index representation; and
- execution of the standard in-place FFT with no reordering.

13. The method of claim 11, wherein in the hybrid reordering tile-based FFT defined as the first multi-pass binary index representation, the processing of the radar signal further comprises:
- a four-bit reordering approach defined as a second multi-pass binary index representation;
- a third multi-pass binary index representation comprising a fusion of the four-bit reordering approach and a Radix-4 FFT representation;
- a multi-level loop structure configured utilizing the third multi-pass binary index representation, wherein the multi-level loop structure is configured to control a computational group comprising:
  - four Radix-4 butterflies; and
  - self-sorting or reordering output logic for bit reversal; and
- execution of a four-bit reordering butterfly group of the multi-level loop structure.

14. A radar system configured to perform the method of claim 11, the radar system comprising:
- the receiver or the transceiver; and
- the computing system communicatively coupled with the receiver or the transceiver and comprising:
  - the processor; and
  - memory communicatively coupled with the processor.

15. The radar system of claim 14, wherein the computing system further comprises the display communicatively coupled with at least one of the processor and the computing system.

\* \* \* \* \*